United States Patent
Kita et al.

(10) Patent No.: US 9,630,544 B2
(45) Date of Patent: Apr. 25, 2017

(54) DUMP TRUCK AND LOAD TRANSMISSION STRUCTURE FOR SAME

(71) Applicant: Hitachi Construction Machinery Co., Ltd., Bunkyo-ku, Tokyo (JP)

(72) Inventors: Yasuki Kita, Tokyo (JP); Atsushi Kitaguchi, Tsuchiura (JP); Takayuki Satou, Tsuchiura (JP); Kazunori Ishihara, Tsuchiura (JP); Takashi Sasaki, Tsuchiura (JP); Takeshi Iwaki, Tsuchiura (JP); Jun Ikeda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 93 days.

(21) Appl. No.: 14/422,758

(22) PCT Filed: Aug. 6, 2013

(86) PCT No.: PCT/JP2013/071257
§ 371 (c)(1),
(2) Date: Feb. 20, 2015

(87) PCT Pub. No.: WO2014/050317
PCT Pub. Date: Apr. 3, 2014

(65) Prior Publication Data
US 2015/0217668 A1    Aug. 6, 2015

(30) Foreign Application Priority Data

Sep. 28, 2012 (JP) .................................. 2012-217542

(51) Int. Cl.
*B60P 1/04* (2006.01)
*B60P 1/28* (2006.01)
(Continued)

(52) U.S. Cl.
CPC .................. *B60P 1/04* (2013.01); *B60P 1/283* (2013.01); *B60P 1/286* (2013.01); *F16F 1/36* (2013.01); *F16F 1/44* (2013.01)

(58) Field of Classification Search
CPC ............... B62D 25/2054; B62D 33/04; A61M 16/0003; A61M 16/0066; A61M 16/0069;
(Continued)

(56) References Cited

U.S. PATENT DOCUMENTS 2,756,095 A * 7/1956 Schneil .................. B62D 29/00
                                                     296/181.6
4,273,381 A * 6/1981 Bibeau .................. B62D 33/02
                                                     296/183.2
(Continued)

FOREIGN PATENT DOCUMENTS

JP    53-70019 U    6/1978
JP    57-918 A     1/1982
(Continued)

OTHER PUBLICATIONS

International Search Report dated Oct. 15, 2013 with English translation (five (5) pages).

*Primary Examiner* — Glenn Dayoan
*Assistant Examiner* — Sunsurraye Westbrook
(74) *Attorney, Agent, or Firm* — Crowell & Moring LLP

(57) ABSTRACT

Stresses are decreased at joints of a support structure disposed on a body of a dump truck. The dump truck includes a body frame (2), a body (2), a support structure (12) disposed on the body and supported by the body frame, and load transmission structures configured to transmit a load from the support structure to the body frame and, to transmit a reaction force from the body frame to the support structure. The support structure has a plurality of vertical plates (12a, 12b) and a bottom plate (12c). The vertical plates are arranged along a direction in which the reaction force is
(Continued)

received from the body frame, and the bottom plate is maintained in upward contact with these vertical plates. The bottom plate is divided into first areas and a second area. The first areas include areas where the bottom plate is in contact with the vertical plates, and the second area is an area other than the first areas. The load transmission structures are configured to transmit the reaction force from the body frame such that a reaction force to be transmitted to each of the first areas becomes greater than a reaction force to be transmitted to the second area.

11 Claims, 44 Drawing Sheets

(51) Int. Cl.
*F16F 1/36* (2006.01)
*F16F 1/44* (2006.01)

(58) Field of Classification Search
CPC .............. A61M 16/06; A61M 16/0622; A61M 16/0633; F16F 1/36; F16F 1/40; F16F 1/44; F16F 2230/007
USPC ................. 52/668, 799.13, 801.11; 298/17 R
See application file for complete search history.

(56) References Cited

U.S. PATENT DOCUMENTS

| | | | | |
|---|---|---|---|---|
| 5,555,699 | A | | 9/1996 | Borthick et al. |
| 5,560,684 | A | * | 10/1996 | Gilmore .................... B60P 1/16 298/19 B |
| 6,178,894 | B1 | * | 1/2001 | Leingang ................ B61F 5/305 105/218.1 |
| 6,267,448 | B1 | * | 7/2001 | Hendry .................... B60P 1/16 298/22 R |
| 9,205,770 | B2 | * | 12/2015 | Kitaguchi ............... B60P 1/286 |
| 2013/0094936 | A1 | * | 4/2013 | Hagenbuch ............ B60P 1/286 414/809 |

FOREIGN PATENT DOCUMENTS

| | | |
|---|---|---|
| JP | 57-919 A | 1/1982 |
| JP | 58-111676 U | 7/1983 |
| JP | 1-91644 U | 6/1989 |
| JP | 1-132440 U | 9/1989 |
| JP | 11-99941 A | 4/1999 |
| JP | 2006-183278 A | 7/2006 |
| JP | 2007-176251 A | 7/2007 |
| JP | 2007-176269 A | 7/2007 |
| JP | 2011-143849 A | 7/2011 |
| JP | 2012-96725 A | 5/2012 |
| JP | 2013-164396 A | 8/2013 |
| WO | WO 2013/172277 A1 | 11/2013 |

* cited by examiner

MODF. EX.1

MODF. EX.2

MODF. EX.3

MODF. EX.4

MODF. EX.5

FURTHER MODF. EX.

MODF. EX.1

MODF. EX.2

MODF. EX.3

MODF. EX.4

MODF. EX.5

(c)

DUMP TRUCK AND LOAD TRANSMISSION STRUCTURE FOR SAME

TECHNICAL FIELD

This invention relates to a dump truck for hauling an object such as earth or sand, and also to a load transmission structure for transmitting a load and its reaction force between a body and a body frame of the dump truck

BACKGROUND ART

A dump truck is generally provided with a body frame having four wheels disposed thereon. Above a front section of the body frame, a cab and a control box are arranged. On the body frame, a body is mounted extending over the body frame from a middle to a rear of the body frame.

Via hinge pins attached to the rear of the body frame and hoist cylinders attached on the body frame at locations forward of the hinge pins, the body is connected to the body frame. In association with an extension or contraction of the hoist cylinders, the body pivots in an upward or downward direction (rises or lowers) about the hinge pins.

On the body of the dump truck, an object to be hauled, such as earth, sand or crushed stone, is loaded in a heap, for example, by a hydraulic excavator or the like. The dump truck is configured such that by changing the body from a lowered position to a raised position, the object loaded on the body can be unloaded (see, for example, see Patent Documents 1 and 2).

The body is configured including a floor board forming a floor, a front board located on a front side of the floor board and forming a front wall, and a pair of side boards located on opposite sides of the floor board, and the inside of the body is used as a payload section. To an upper part of the front board of the body, a canopy is connected extending forward such that the canopy covers the cab and control box.

Attached to a lower surface of the floor board of the body is a pair of rails, which are arranged extending in a front-to-back direction (longitudinal direction). Each rail is a hollow box-shaped structure configured having two side rail plates and a bottom rail plate. The two side rail plates extend downwardly from the floor board of the body, and the bottom rail plate is in contact with respective lower end surfaces of the two side rail plates. It is to be noted that the bottom rail plate is often provided with rubber pads as cushioning members. These rubber pads serve to prevent vibrations of the body during running, and also to absorb impacts to the body frame upon loading earth or sand on the body.

On the lower surface of the floor board of the body, a plurality of laterally-extending stiffeners (reinforcing members) are also attached at intervals in the front-and-rear direction such that these plural stiffeners intersect the paired rails. It is to be noted that each stiffener is a structure member comprised of a channel steel. The floor board, front board, paired side boards, canopy, paired rails and individual stiffeners of the body have been joined together by welding. The rigidity of the floor board of the body is assured by the paired rails and the plural stiffeners.

When an object to be hauled is loaded in a heap in the payload section of the body, a high load is applied to the body from the object to be hauled. The load applied to the body is received via the floor board of the body at parts connected to the rails and parts connected to the hinge pins, specifically hinge pin brackets. The load applied to the rails is borne by the body frame which supports the rails. On the other hand, the load applied to the hinge pin brackets of the body is borne by the body frame via the hinge pins.

Upon raising the body to unload the hauled object, a high load is applied to the hinge pin brackets, and therefore, relatively thick plates are used for the hinge pin brackets to assure high rigidity for them. On the other hand, the rails are arranged on the lower surface of the floor board of the body over a wide range extending in the front-and-rear direction, and therefore, relatively thin plates are assembled into box structures to assure rigidity for the rails.

Dump trucks of the construction that the positions of contact between a body and a body frame are also known. Disclosed, for example, in Patent Document 3 is a configuration that brackets are arranged on a front board of a body instead of its floor board, seatings are arranged on a front part of a body frame, and seats of the brackets come into contact with seats of the seatings to bear a load from the body.

PRIOR ART DOCUMENTS

Patent Documents

Patent Document 1: JP-A-2007-176269
Patent Document 2: U.S. Pat. No. 5,555,699
Patent Document 3: JP-A-2007-176251

DISCLOSURE OF THE INVENTION

Problem to be Solved by the Invention

In a position that the body rests on the body frame (in the position of a lowered posture), on the other hand, each rail receives a reaction force from the body frame (via the corresponding rubber pads), and therefore, forces are applied to the rail as if it would be collapsed in an up-and-down direction. As illustrated in FIG. 52, with joints between each bottom rail plate and its associated side rail plates serving as supports, the bottom rail plate is hence deformed such that its center becomes a top part. A large bending moment, therefore, acts on the center (an upwardly-convex top) of the bottom rail plate. As a consequence, a large bending stress occurs, leading to a potential problem that a crack may occur in a central part of the bottom rail plate. In addition, a large deflection angle occurs at each of the joints of the bottom rail plate and the side rail plates so that a large stress also occurs at each joint. The joints of the bottom rail plate and the side rail plates are, therefore, positions where breakage is likely to occur. Further, the body frame also undergoes similar deformations (see, FIG. 53).

Even in the structure of Patent Document 3 that the points of contact between the body and the body frame are located at the front of the body, a similar problem may also arise provided that the structure of each part, where a reaction force is received from the body frame, is a hollow box structure. Described specifically, the reaction force from each seating is also received at the seat of the corresponding bracket in Patent Document 3. The structure of Patent Document 3 is, therefore, similar to the foregoing in that a large stress occurs at the joint between the bracket and the seat and the joint is a location prone to breakage. This problem also similarly applies to a body frame having a similar configuration as the rails.

To prevent the occurrence of such breakage at the joints, the joints may be increased in plate thickness to lower the stress. This approach, however, leads to an increase in the mass of the body, thereby raising problems such as a decrease in authorized payload weight, a deterioration in travel fuel economy, a reduction in the life of tires, and the like. Such an approach is, therefore, not expedient.

With the above-mentioned actual situation of the conventional technologies in view, an object of the present invention is to reduce a stress at each support structure disposed on a body of a dump truck.

Means for Solving the Problem

To achieve the above-described object, a dump truck according to the present invention includes a body frame, a body mounted tiltably in an up-and-down direction on the body frame, a support structure disposed on the body and supported by the body frame, and load transmission structures held between the support structure and the body frame when the body is in a state of resting on the body frame, whereby the load transmission structures transmit a load from the support structure to the body frame and at the same time, transmit a reaction force from the body frame to the support structure. The support structure has a plurality of vertical plates, which are arranged along a direction in which the reaction force is received from the body frame, and a bottom plate maintained in upward contact with the plurality of vertical plates. The bottom plate is divided into first areas, which include areas where the bottom plate is in contact with the plurality of vertical plates, and a second area that is an area other than the first areas. The load transmission structures transmit the reaction force from the body frame such that a reaction force to be transmitted to each of the first areas becomes greater than a reaction force to be transmitted to the second area.

Advantageous Effects of the Invention

According to the present invention, it is possible to reduce a stress at a joint of the support structure disposed on the body of the dump truck. It is to be noted that problems, configurations and advantageous effects other than those described above will become apparent from the description of the following embodiments.

MODES FOR CARRYING OUT THE INVENTION

Embodiments for carrying out the dump truck according to the present invention will hereinafter be described based on the drawings. It is to be noted that unless otherwise specifically indicated, the expression "lateral direction" in the following description means the left-and-right direction when a dump truck is viewed from its front side (the side of its cab).

First Embodiment

Figure 1:
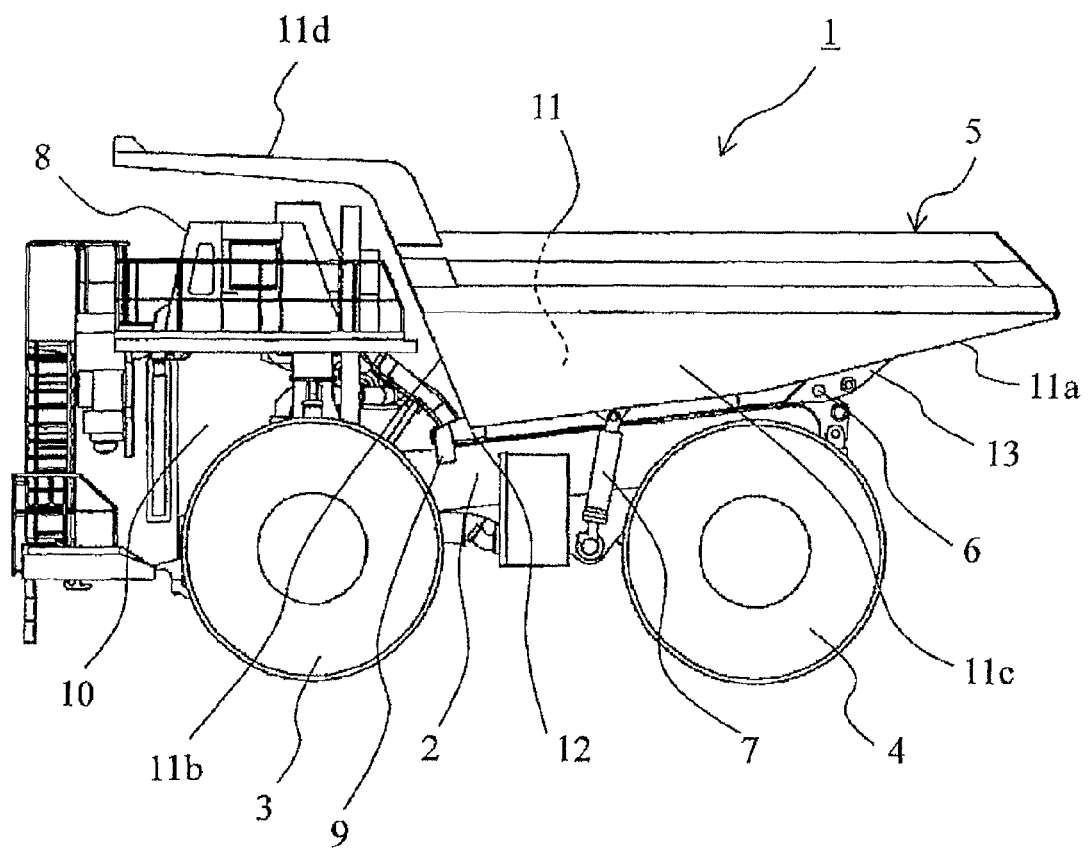
FIG. 1 is a side view of a dump truck according to a first embodiment of the present invention.
Figure 2:
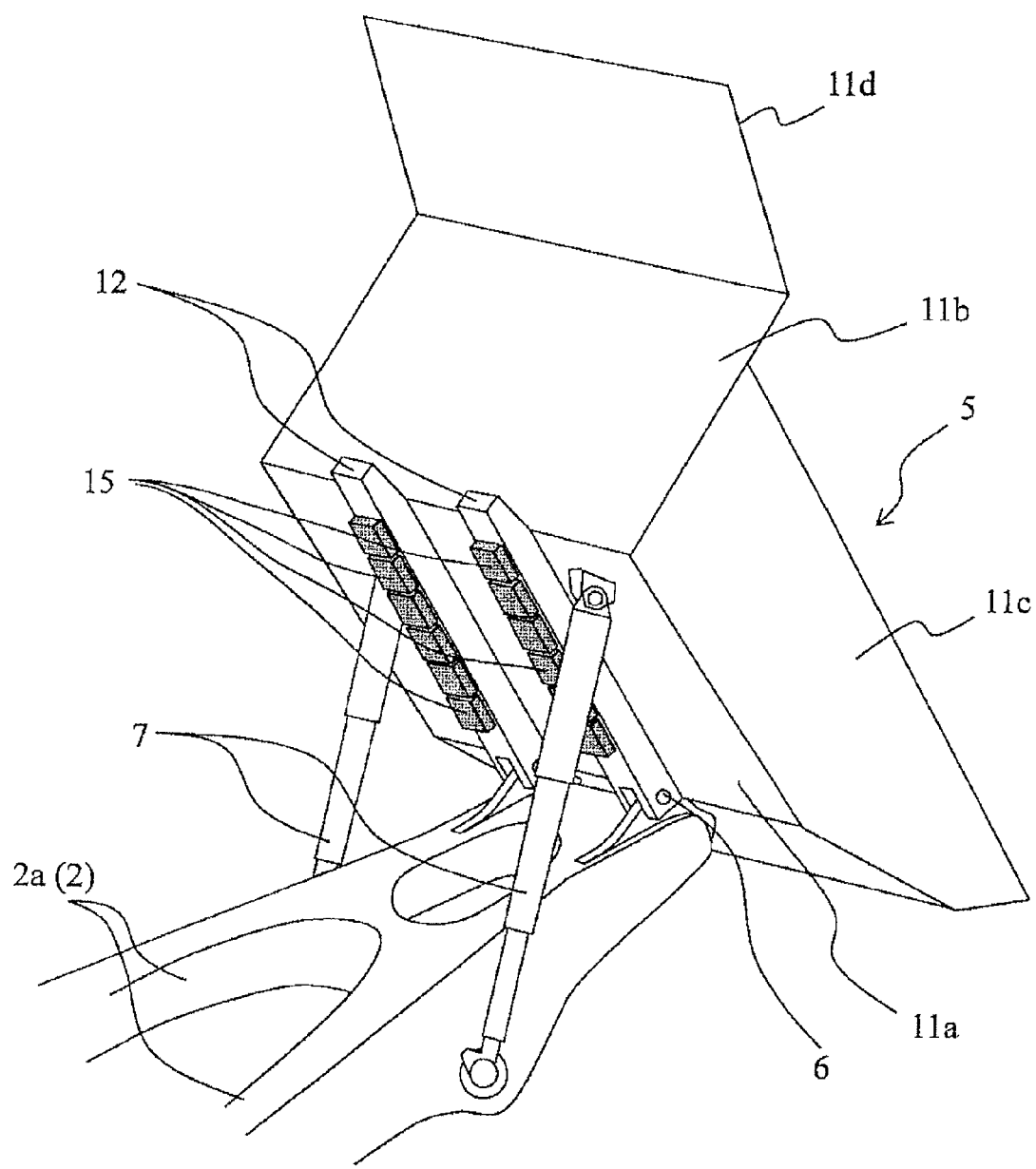
FIG. 2 is a perspective view illustrating the outline of an essential part of the dump truck shown in FIG. 1, with a body being in a raised position.

FIG. 1 is a side view of a dump truck according to a first embodiment of the present invention. FIG. 2 is a perspective view illustrating the outline of an essential part of the dump truck shown in FIG. 1, with a body being in a raised position. As illustrated in FIG. 1, the dump truck 1 according to the first embodiment is provided with a body frame 2, a pair of front wheels 3, a pair of rear wheels 4, and a body 5. The paired front wheels 3 are rotatably attached to lateral opposite ends of a front part of the body frame 2, respectively. On the other hand, the paired rear wheels 4 are rotatably attached to lateral opposite ends of a rear part of the body frame 2, respectively. Further, the body 5 is a section in which an object to be hauled, such as earth, sand or crushed stone, is to be loaded, and is mounted on the body frame 2 such that it can be raised or lowered.

The body frame 2 is a so-called chassis, and as illustrated in FIG. 2, is configured of a pair of frame members 2a. These paired frame members 2a are each in the form of a frame extending in a longitudinal direction, and are configured such that a pair of rails 12 of the body 5 are exactly mounted on the paired frame members 2a, respectively, when the body 5 is in a state of resting on the body frame 2.

On the rear part of the body frame 2, hinge pins 6 are attached. These hinge pins 6 act as a center of rotation upon raising and lowering the body 5 (pivoting the body 5 in the up-and-down direction). At locations forward of the hinge pins 6 on the body frame 2, a pair of hoist cylinders 7 are attached as hydraulic cylinders that connect the body frame 2 and the body 5 with each other. These paired hoist cylinders 7 are attached to an approximately middle part of the body frame 2 as viewed in the longitudinal direction. Above the front wheel on a left side of the body frame 2, a cab 8 is arranged as a compartment that houses an operator. On the front part of the body frame 2, a power unit 10 is arranged with hydraulic equipment accommodated therein.

When the operator drives the hoist cylinders 7 from the cab 8, the body 5 therefore pivots downwardly about the hinge pins 6 in association with a retraction of the hoist cylinders 7, and then assumes a lowered posture to rest on the body frame 2. In association with an extension of the hoist cylinders 7, on the other hand, the body 5 pivots upwardly about the hinge pins 6, and then assumes a raised posture (see FIG. 2) to dump out the hauled object.

It is to be noted that designated at numeral 9 in FIG. 1 are guides which come into contact with side parts of the body frame 2 for preventing the body 5 from moving in the lateral direction.

A description will next be made about the structure of the body 5. The body 5 has a substantially box-like shape, which is configured by a floor board (floor) 11a, front board (front wall) 11b and two side boards (sidewalls) 11c, is open at a top and rear thereof, and defines therein a payload section 11 for loading therein the object to be hauled. It is to be noted that the floor board 11a, front board 11b and side walls 11c have been joined together by welding. The body 5 rests on the body frame 2, with its floor board 11a being in a state of sloping forward and a little downward (see FIG. 1).

To an upper part of the front board 11b, a substantially board-shaped canopy (canopy) 11d is attached. This canopy 11d is attached extending forward from the upper part of the front board 11b such that the canopy 11d covers the upper front section of the dump truck 1. Therefore, this canopy 11d is arranged to avoid damage to the cab 8, power unit 10 and the like, which would otherwise occur by falling of the object under hauling from the body 5 in the lowered position that the body 5 rests on the body frame 2.

A description will next be made about details of the rails 12 that correspond to "the support structure" in the present invention. In the first embodiment, as illustrated in FIG. 2, the paired rails 12 are attached to the bottom board 11a of the body 5 such that they extend along the longitudinal direction of the body (the front-and-rear direction of the body frame 2). The paired rails 12 are arranged substantially in parallel to each other. With the body 5 resting on the body frame 2, the paired rails 12 rest on upper surfaces of the respective frame members 2a of the body frame 2. In other words, the rails 12 are supported by the body frame 2. At this time, the paired rails 12 receive a reaction force from the body frame 2. The direction in which the rails 12 receive the reaction force from the body frame 2 is primarily upward in the up-and-down direction (see FIG. 6) although details will be mentioned subsequently herein.

Figure 3:
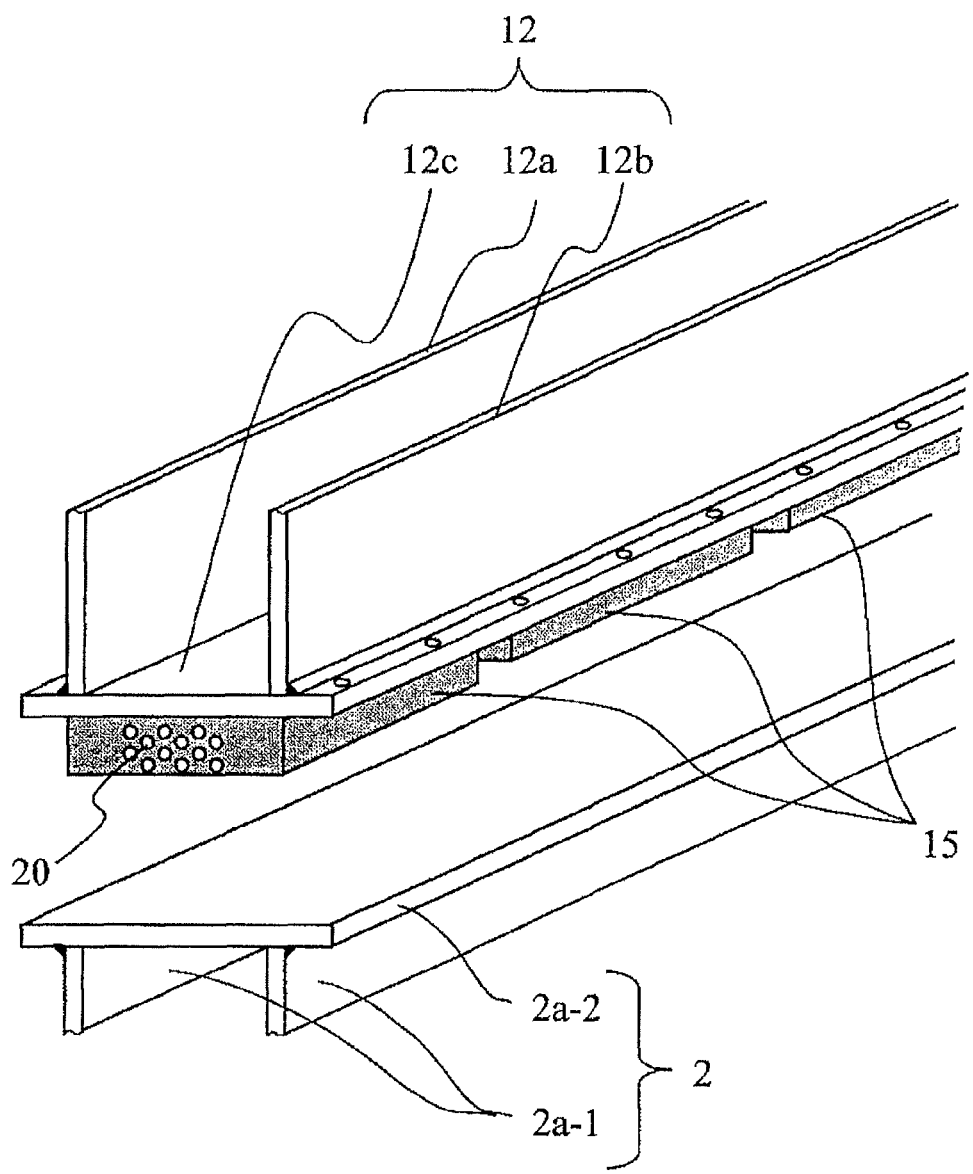
FIG. 3 is a perspective view illustrating parts of a rail, rubber pads and a body frame of the dump truck shown in FIG. 1.

About the shape of each rail 12, a description will be made specifically with reference to FIGS. 3 and 4. About the shape of the body frame 2, a description will also be made specifically with reference to FIGS. 3 and 4. FIG. 3 is a perspective view illustrating parts of the rail 12, rubber pads 15 and body frame 2, FIG. 4 is a vertical cross-sectional view of the rail 12, rubber pad 15 and body frame 2 illustrated in FIG. 3 as taken in a vertical direction, and FIG. 5 is a vertical cross-sectional view of the rail 12, rubber pad 15 and body frame 2 as taken in a vertical direction in a state that the body 5 rests on the body frame 2.

Figure 4:
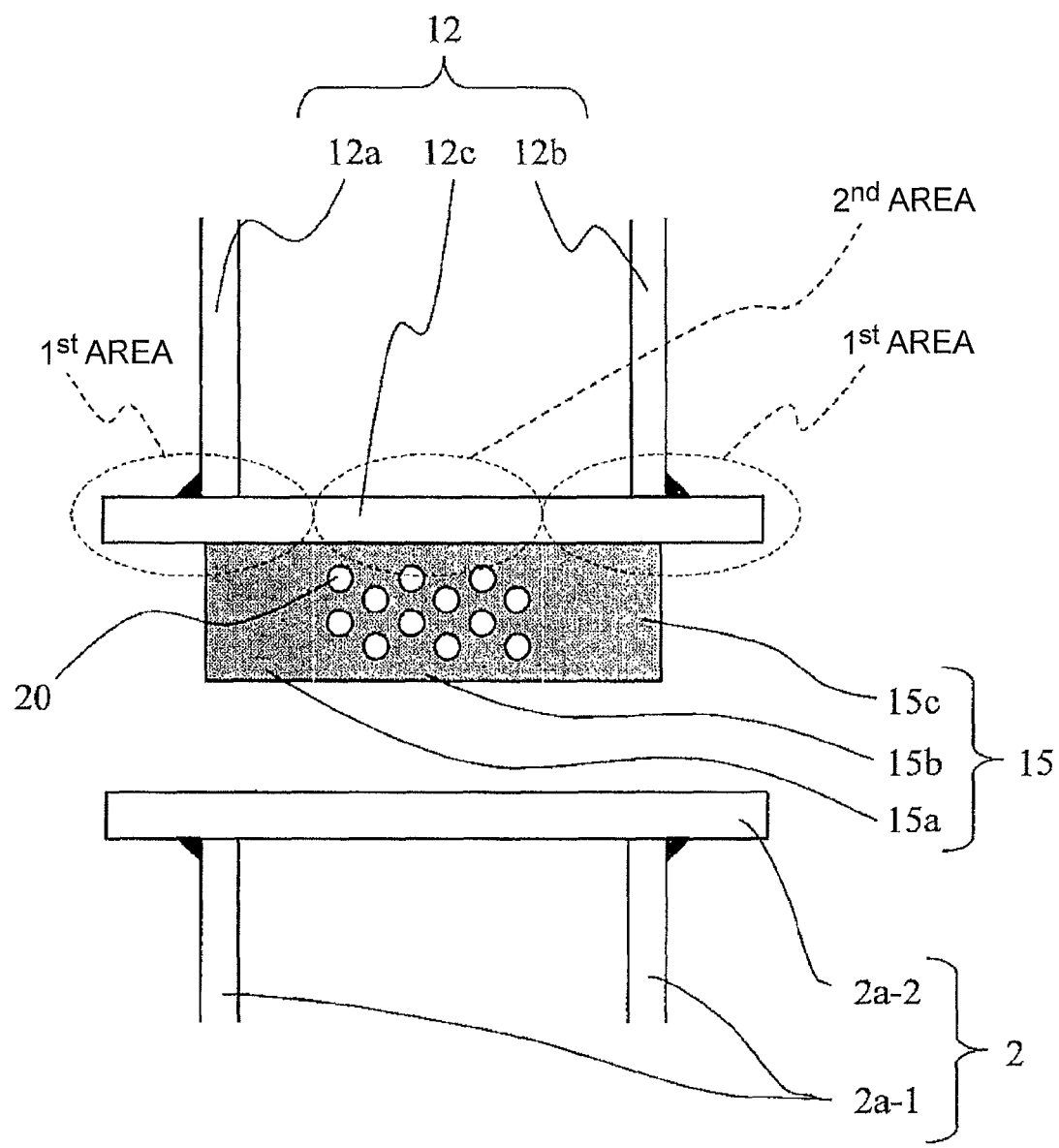
FIG. 4 is a cross-sectional view of the rail, rubber pad and body frame illustrated in FIG. 3 as taken in a vertical direction.

As illustrated in FIGS. 3 and 4, the rail 12 has two side rail plates (vertical plates) 12a,12b and a bottom rail plate (bottom plate) 12c. The side rail plates 12a, 12b extend downwardly, with an interval being maintained in the lateral direction, from the floorboard 11a of the body 5 (see FIG. 2). The bottom rail plate 12c is in upward contact with lower end surfaces of the side rail plates 12a, 12b. The rail 12 has a hollow box structure with a space internally defined by the floor board 11a of the body 5, the side rail plates 12a,12b and the bottom rail plate 12c. It is to be noted that the side rail plates 12a, 12b and the bottom rail plate 12c are integrated together by welding.

As illustrated in FIG. 4, the bottom rail plate 12c has a first area formed at a left-side part including an area where the bottom rail plate 12c is in contact with a lower end surface of the side rail plate 12a, another first area formed at a right-side part including an area where the bottom rail plate 12c is in contact with a lower end surface of the side rail plate 12b, and a second area at a central part flanked by these two first areas (an area other than the first areas). In other words, the lateral opposite sides of the bottom rail plate 12c are the first areas, and the central part of the bottom rail plate 12c is the second area.

Figure 5:
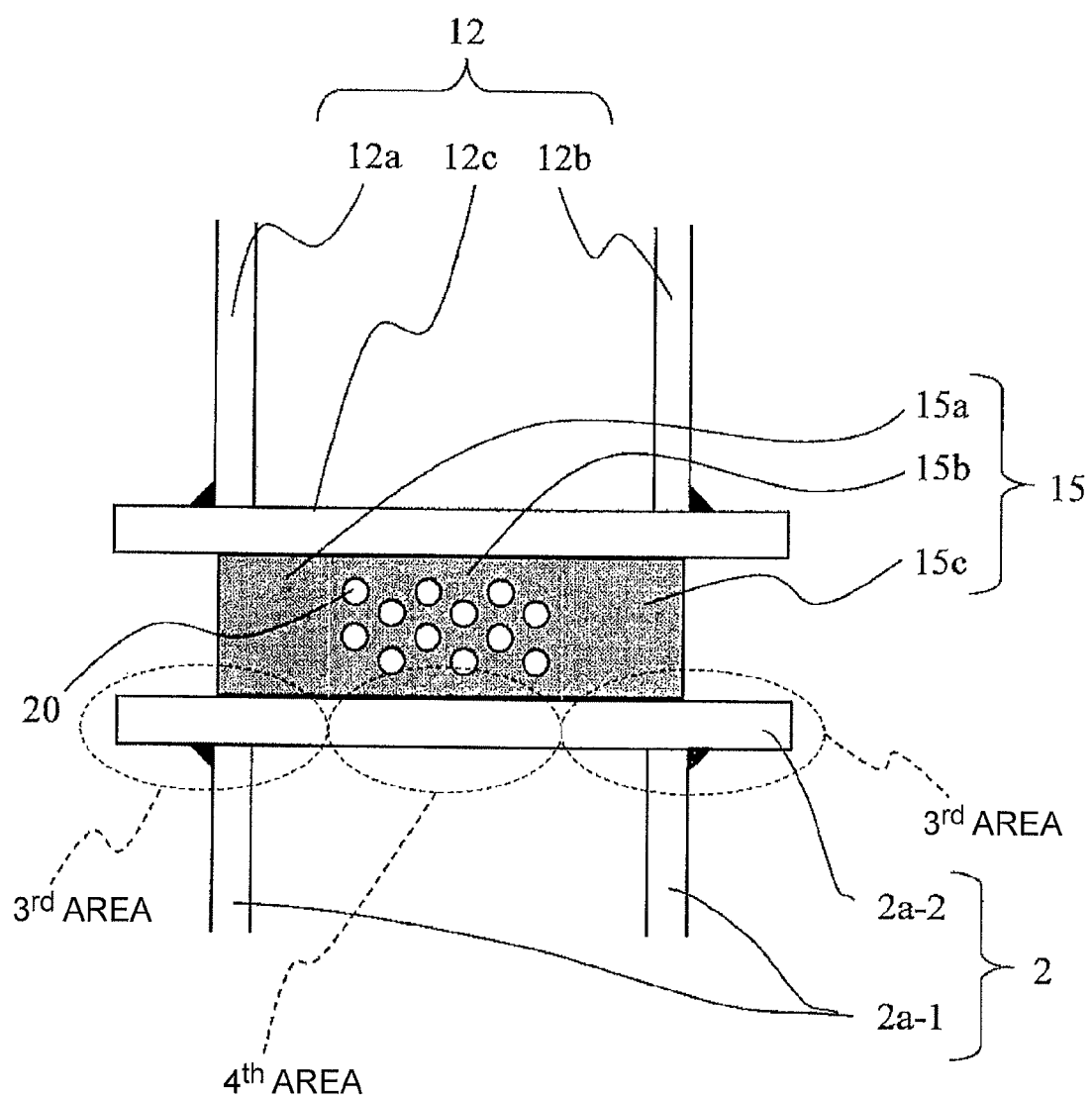
FIG. 5 is a cross-sectional view of the rail, rubber pad and body frame illustrated in FIG. 3 as taken in a vertical direction in a state that the body rests on the body frame.

As illustrated in FIGS. 3 and 5, the body frame 2, on the other hand, has been formed by welding and joining a pair of side frame plates (vertical frame plates) 2a-1, which are arranged with a lateral interval maintained therebetween, with a top frame plate 2a-2 that is in downward contact with upper end surfaces of the paired side frame plates 2a-1. As illustrated in FIG. 5, in the state that the body 5 rests on the body frame 2, the bottom rail plate 12c is supported by the top frame plate 2a-2 via rubber pads 15 to be described subsequently herein.

Because the direction in which the body frame 2 receives a load from the body 5 is primarily downward in the up-and-down direction (see FIG. 6) although details will be described subsequently herein, each side frame plate 2a-1 is arranged along the direction in which the side frame plate 2a-1 receives a load from the body 5. In more detail, side walls of each side frame plate 2a-1 are directed substantially in parallel to the up-and-down direction.

As illustrated in FIG. 5, the top frame plate 2a-2 has third areas formed at left and right sides thereof, respectively, and including areas where the top frame plate 2a-2 is in contact with upper end surfaces of the respective side frame plates 2a-1, and a fourth area at a central part thereof (an area other than the third areas). In other words, the lateral opposite sides of the top frame plate 2a-2 are the third areas, and the central part of the top frame plate 2a-2 is the fourth area.

Hinge brackets 13 are attached to the rails 12 at positions somewhat rearward of longitudinally middle parts thereof, respectively. Through these hinge brackets 13, the hinge pins 6 are rotatably inserted. These hinge brackets 13, therefore, rotatably support the corresponding hinge pins 6.

With reference to FIGS. 3 and 4, a description will next be made about details of the rubber pads (pads) 15 that correspond to "the load transmission structures" in the present invention. Each rubber pad 15 is made of rubber as one example of an elastic material, and is in the form of a rectangular parallelepiped having a rectangular cross-section. As illustrated in FIG. 4, the rubber pad 15 has a structure that side pads (first pads) 15a,15c on lateral opposite sides and a center pad (second pad) 15b at a central part are integrated together. In this embodiment, the side pads 15a,15c and center pad 15b are formed of the same material, but may be formed of different materials.

It is to be noted that in FIG. 4, white, dashed-dotted lines shown on the rubber pad 15 are virtual lines which indicate boundaries between the side pads 15a,15c and the center pad 15b and that such lines do not exist on the actual rubber pad.

In the rubber pad 15, the side pads 15a, 15c on the opposite left and right sides are solid elastomeric members, while the center pad 15b is provided with a plurality of hollow bores 20 extending in a longitudinal direction therethrough. In the rubber pad 15, the side pads 15a, 15c are higher in rigidity than the center pad 15b accordingly.

As illustrated in FIG. 4, the rubber pad 15 is firmly bonded on the lower surface of the bottom rail plate 12c such that the side pad 15a is in contact with the first area on the left side of the bottom rail plate 12c, the side pad 15c is in contact with the first area on the right side of the bottom rail plate 12c, and the center pad 15b is in contact with the second area at the central part of the bottom rail plate 12c.

It is to be noted that as the number of the rubber pads 15, each rail 12 is provided with several rubber pads (see FIG. 2). These rubber pads can cushion an impact when the body 5 comes to rest on the body frame 2, and also allow the body 5 to rest in a stable posture under a friction force between the rubber pads 15 and the body frame 2. However, the reaction force which the bottom rail plate 12c receives from the body frame 2 has different magnitudes at the first areas and the second area due to the different rigidities in each rubber pad 15.

Figure 6:
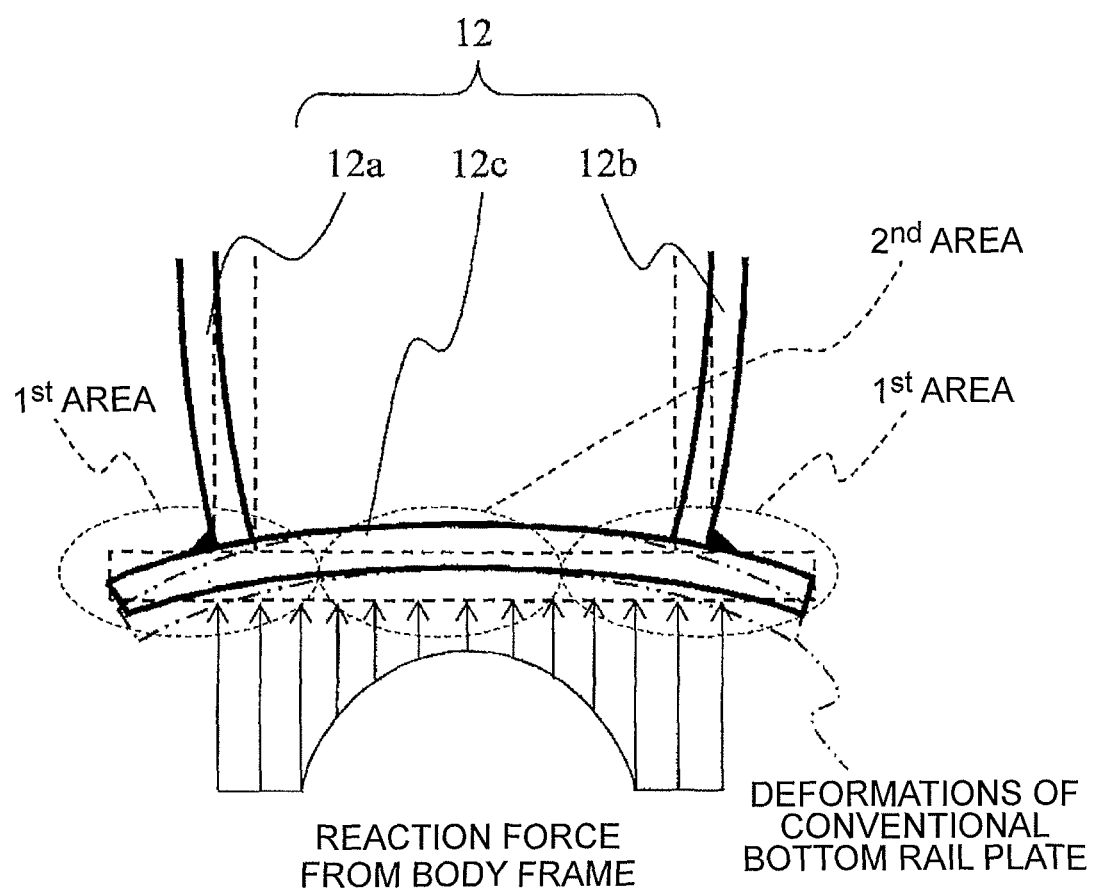
FIG. 6 is a view illustrating how the rail deforms under a reaction force from the body frame in the first embodiment.

This will be described in detail with reference to FIG. 6. FIG. 6 is a view illustrating how each rail 12 deforms under a reaction force from the body frame 2. As mentioned above, each rubber pad 15 has higher rigidity at the side pads 15a,15c than at the center pad 15b. When the reaction force from the body frame 2 is transmitted to the bottom rail plate 12c via the rubber pads 15, a reaction force to be transmitted from the part of each of the side pads 15a,15c to the corresponding first area of the bottom rail plate 12c, therefore, becomes greater than a reaction force to be transmitted from the part of the center pad 15b to the second area of the bottom rail plate 12c as apparent from the distribution of the reaction force illustrated in FIG. 6.

As illustrated in FIG. 6, a bending moment on the bottom rail plate 12c (a total bending moment between the side rail plates 12a,12b) is, therefore, reduced as appreciated from a comparison with deformations of a conventional bottom rail plate, leading to a decrease in the quantity of bending deformations of the bottom rail plate 12c and also to a decrease in the bending deflection angle at each of the joints between the bottom rail plate 12c and the side rail plates 12a,12b. This configuration has made it possible to reduce a bending stress to be applied to the central part of the bottom rail plate 12c and bending stresses to be applied to the joints between the bottom rail plate 12c and the side rail plates 12a,12b.

Figure 7:
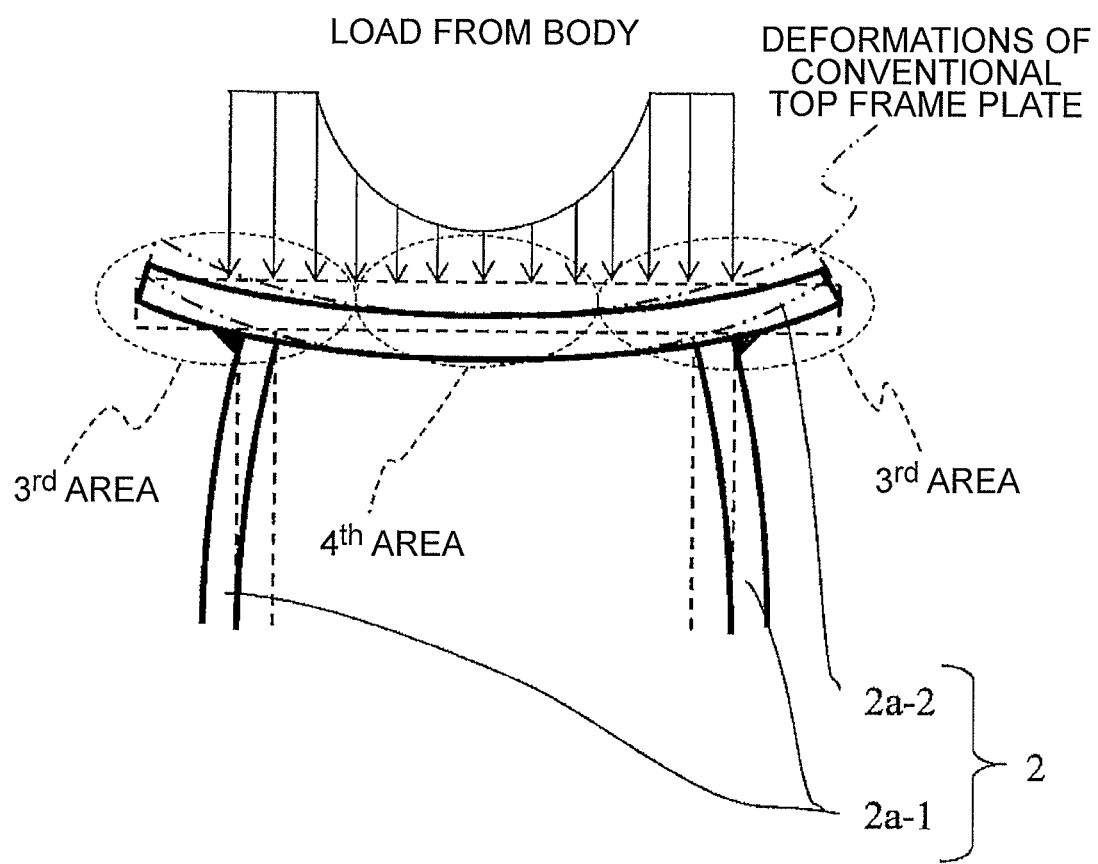
FIG. 7 is a view illustrating how the body frame deforms under a load from the body in the first embodiment.

The foregoing also applies likewise to the body frame 2. Referring now to FIG. 7, a description will then be made about deformations of the body frame 2. FIG. 7 is a view illustrating how the body frame 2 deforms under a load from the body 5. As mentioned above, the side pads 15a, 15c are higher in rigidity than the center pad 15b. When the load from the body 5 is transmitted to the top frame plate 2a-2 via the rubber pads 15, a load to be transmitted from the part of each of the side pads 15a,15c to the third area of the top frame plate 2a-2, therefore, becomes greater than a load to be transmitted from the part of the center pad 15b to the fourth area of the top frame plate 2a-2 as apparent from the distribution of the reaction force illustrated in FIG. 7.

As illustrated in FIG. 7, a bending moment on the top frame plate 2a-2 (a total bending moment between the side frame plates 2a-1) is, therefore, reduced as appreciated from a comparison with deformations of a conventional top frame plate, leading to a decrease in the quantity of bending deformations of the top frame plate 2a-2 and also to a decrease in the bending deflection angle at each of the joints between the top frame plate 2a-2 and the side frame plates 2a-1. As a consequence, it is possible to reduce a bending stress to be applied to the central part of the top frame plate 2a-2 and bending stresses to be applied to the joints between the top frame plate 2a-2 and the side frame plates 2a-1.

Figure 8A:
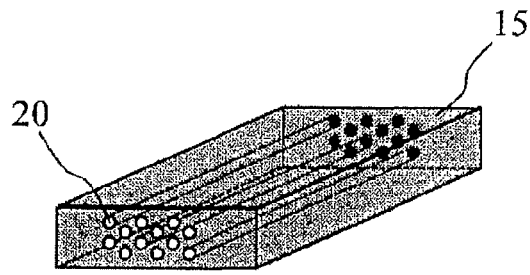
FIGS. 8A through 8G are views illustrating various modification examples of the rubber pads applied to the first embodiment.

It is to be noted that the rubber pads for use in the first embodiment are not limited to the above-described configurations and can be modified in various ways. A description will hereinafter be made about modification examples of the rubber pads. FIGS. 8A through 8G illustrate the modification examples of the rubber pads. FIG. 8A illustrates the rubber pad 15 used in the above-described first embodiment. As mentioned above, the rubber pad 15 illustrated in FIG. 8A includes, through the central part thereof, the plural hollow bores 20 extending in the longitudinal direction, so that the part (which corresponds to the second pad) of the rubber pad 15, said part being provided with the hollow bores 20, is set lower in rigidity than the remaining parts (which correspond to the first pads). This configuration has made it possible to reduce stresses to be applied to high-stress areas of the rail 12 and body frame 2.

Figure 8B:
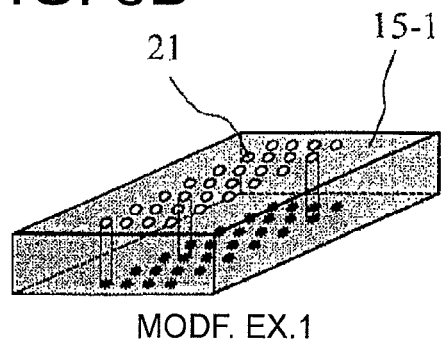

A rubber pad 15-1 according to Modification Example 1 as illustrated in FIG. 8B includes plural hollow bores 21 extending in the thickness direction (height direction) of the rubber pad 15-1, so that the part (which corresponds to the second pad) provided with the hollow bores 21 is set lower in rigidity than the remaining parts (which correspond to the first pads).

By the configuration of Modification Example 1, the reaction force to be transmitted to the bottom rail plate 12c from the body frame 2 can also be transmitted such that it preferably concentrates at the first areas maintained in contact with the side rail plates 12a,12b(see FIG. 6). It is, therefore, possible to reduce a bending stress to be applied to the central part of the bottom rail plate 12c and bending stresses to be applied to the joints between the bottom rail plate 12c and the side rail plates 12a,12b.

According to the configuration of Modification Example 1, the load to be transmitted to the top frame plate 2a-2 from the body 5 can also be transmitted such that it preferably concentrates at the third areas maintained in contact with the side frame plates 2a-1 (see FIG. 7). It is, therefore, possible to reduce a bending stress to be applied to the central part of the top frame plate 2a-2 and bending stresses to be applied to the joints between the top frame plate 2a-2 and the side frame plates 2a-1.

Figure 8C:
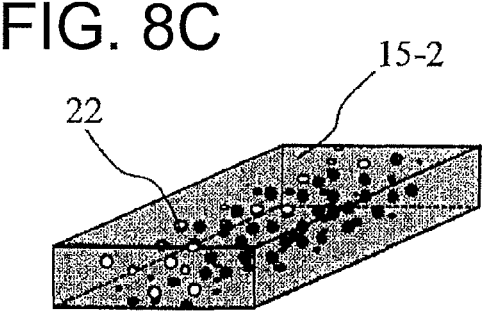

A rubber pad 15-2 according to Modification Example 2 as illustrated in FIG. 8C includes plural spherical hollow bores 22 in a central part thereof, so that the part (which corresponds to the second pad) provided with the hollow bores 22 is set lower in rigidity than the remaining parts (which correspond to the first pads).

By the configuration of Modification Example 2, similar to Modification Example 1 of FIG. 8B, the reaction force is also transmitted concentrating at the first areas formed in the bottom rail plate 12c, and the load is also transmitted concentrating at the third areas formed in the top frame plate 2a-2. It is, therefore, possible to reduce stresses to be applied to the high-stress parts of the rail 12 and body frame 2.

Although the shapes of the hollow bores 20,21,22 illustrated in FIGS. 8A to 8C are circular in cross-section, those of desired cross-sectional shapes such as oval, rectangular and triangular shapes can also be adopted in addition.

Figure 8D:
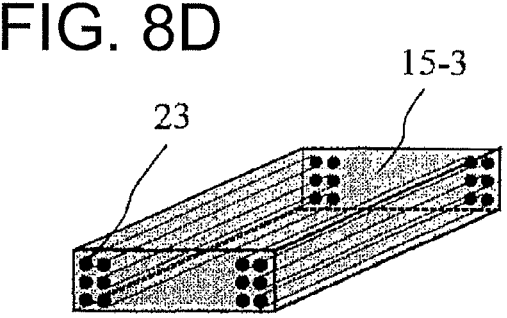

A rubber pad 15-3 according to Modification Example 3 as illustrated in FIG. 8D includes rod-shaped reinforcement members 23, which extend in a longitudinal direction through opposite side parts and have higher rigidity than the rubber pad, without providing a central part with bores or the like, so that the opposite side parts (which correspond to the first pads) with the reinforcement members 23 extending therethrough are set higher in rigidity than the central part (which corresponds to the second pad). The rubber pad 15-3 illustrated in FIG. 8D is, therefore, of the configuration that makes the rigidity higher by the reinforcement members 23 of higher rigidity than the material of the rubber pad, although the rubber pads illustrated in FIGS. 8A to 8C are of the configurations that make the rigidity lower by providing hollow bores.

By the configuration of Modification Example 3, similar to Modification Examples 1 and 2 of FIGS. 8B and 8C, the reaction force is also transmitted concentrating at the first areas formed in the bottom rail plate 12c, and the load is also transmitted concentrating at the third areas formed in the top frame plate 2a-2. It is, therefore, possible to reduce stresses to be applied to the high-stress parts of the rail 12 and body frame 2.

Figure 8E:
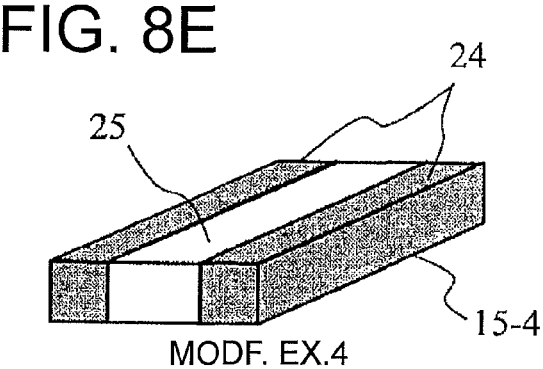

In a rubber pad 15-4 according to Modification Example 4 as illustrated in FIG. 8E, different rubber materials are used in opposite side parts 24 and in a central part 25, respectively. More specifically, the rubber of the opposite side parts (which correspond to the first pads) 24 is set higher in rigidity than the rubber of the central part (which corresponds to the second pad) 25.

By the configuration of Modification Example 4, similar to Modification Examples 1 to 3 of FIGS. 8B, 8C and 8D, the reaction force is also transmitted concentrating at the first areas formed in the bottom rail plate 12c, and the load is also transmitted concentrating at the third areas formed in the top frame plate 2a-2. It is, therefore, possible to reduce stresses to be applied to the high-stress parts of the rail 12 and body frame 2. It is to be noted that the central part 25 of the rubber pad 15-4 according to Modification Example 4 may be removed to provide a rubber pad of a configuration with only the opposite side parts 24 being arranged at an interval therebetween (see FIG. 8G).

Figure 8F:
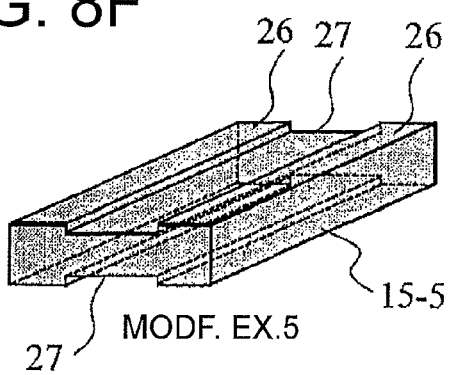
Figure 8G:
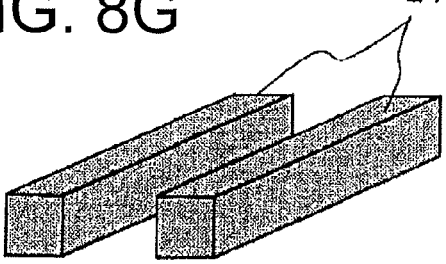

A rubber pad 15-5 according to Modification Example 5 as illustrated in FIG. 8F is in a form that concave/convex structures are formed at an upper surface and lower surface thereof. More specifically, the rubber pad 15-5 is provided, at a central part of its upper surface, with a recess 27 along a longitudinal direction, and as a consequence, flat lands 26 are formed along the longitudinal direction at opposite sides of the recess 27. The lower surface has a similar configuration.

Figure 9:
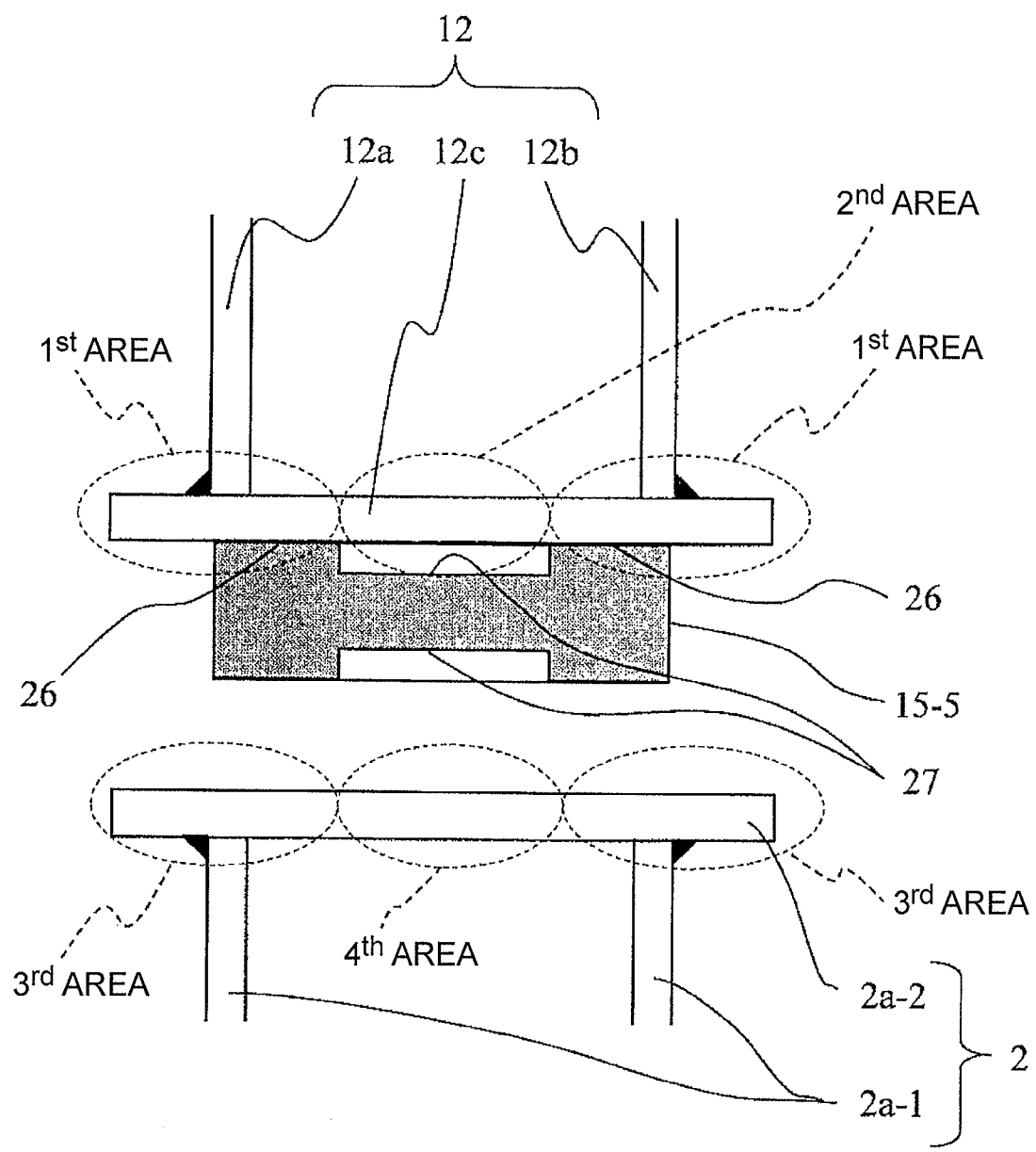
FIG. 9 is a cross-sectional view illustrating the state of the rubber pad, which is shown in FIG. 8F, as attached to the rail.

It is FIG. 9 that illustrates the state of the thus-formed rubber pad 15-5 as attached to the rail 12. As illustrated in FIG. 9, the rubber pad 15-5 is, at the lands 26 thereof, in contact with the first areas of the bottom rail plate 12c, but is, at the recess 27 thereof, out of contact with the second area of the bottom rail plate 12c. In other words, a clearance equivalent to the depth of the recess 27 is formed between the bottom rail plate 12c and the rubber pad 15-5. Therefore, the bottom rail plate 12c receives the reaction force from the body frame 2 via the rubber pads 15-5, but the reaction force concentrates at the first areas. In other words, the reaction force to each of the first area becomes greater than the reaction force to the second area, resulting in a similar pattern as in FIG. 6 when represented in terms of reaction force distribution.

Since the recess 27 is also formed in the lower surface of the rubber pad 15-5, it is only at the lands 26 that the lower surface of the rubber pad 15-5 comes into contact with the top frame plate 2a-2. In other words, the lower surface of the rubber pad 15-5 comes into contact with only the third areas of the top frame plate 2a-2. Therefore, the load to be transmitted to the top frame plate 2a-2 also concentrates at the third areas.

As appreciated from the foregoing, by the configuration of Modification Example 5, similar to Modification Examples 1 to 4 of FIGS. 8B, 8C, 8D and 8E, the reaction force is also transmitted concentrating at the first areas formed in the bottom rail plate 12c, and the load is also transmitted concentrating at the third areas formed in the top frame plate 2a-2. It is, therefore, possible to reduce stresses to be applied to the high-stress parts of the rail 12 and body frame 2.

Figure 10:
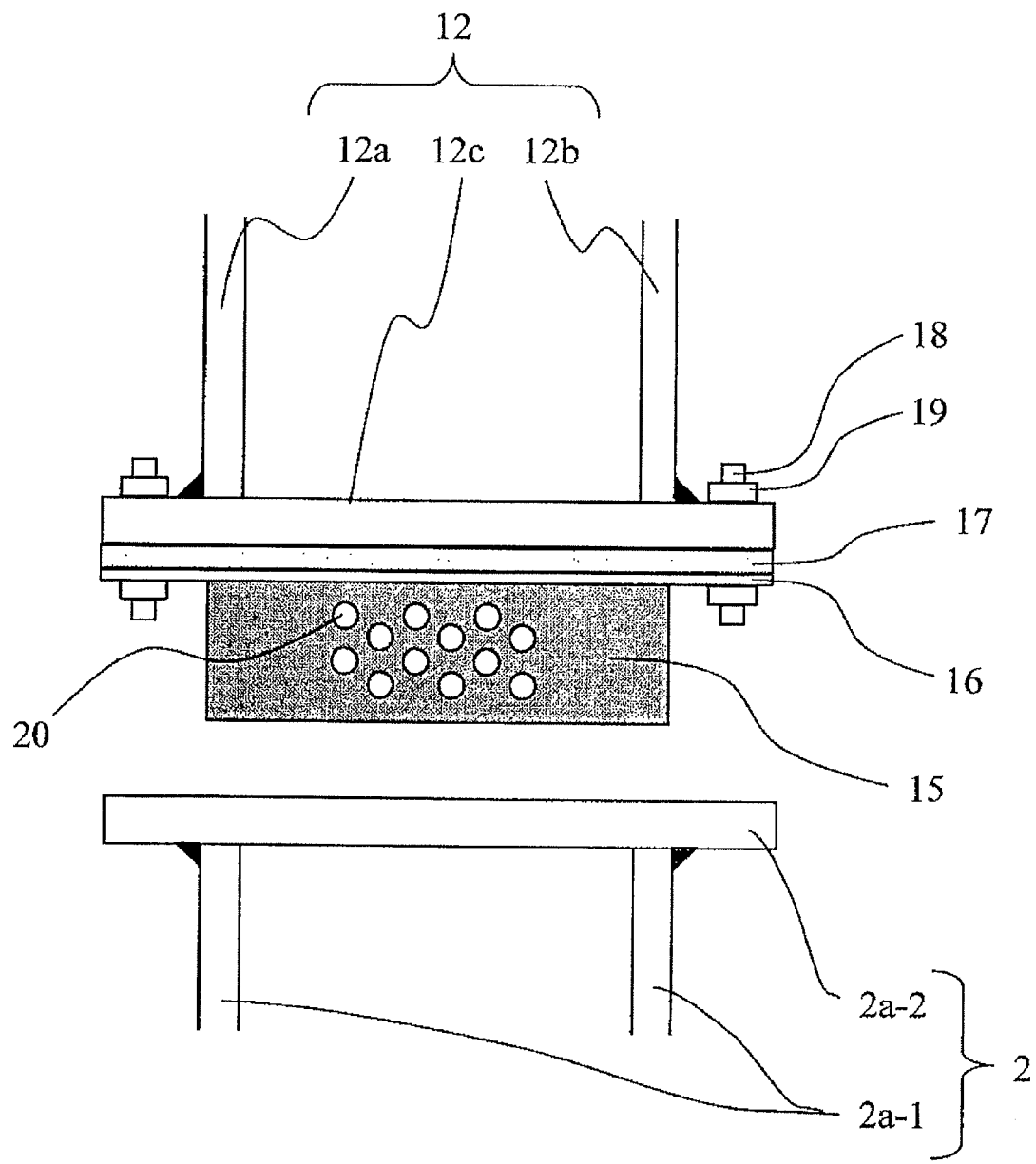
FIG. 10 is a view illustrating another example of the manner of attachment of the rubber pad to the rail in the first embodiment.

In the above-described first embodiment, the description is made about the example that the rubber pads 15 are directly bonded to the bottom rail plate 12c. However, the manner of attachment of the rubber pads 15 to the bottom rail plate 12c is not limited to this configuration. About another example of the manner of attachment of the rubber pads 15 to the bottom rail plate 12c, a description will be made with reference to FIG. 10. In the example illustrated in FIG. 10, the rubber pad 15 is bonded to a plate 16. The plate 16 with the rubber pads 15 bonded thereon is attached to the bottom rail plate 12c and is fixed with bolts 18 and nuts 19, whereby the rubber pads 15 are attached to the rail 12. According to this configuration, the replacement of the rubber pads 15 is facilitated. It is to be noted that the numeral 17 in FIG. 10 indicates an adjustment plate inserted between the bottom rail plate 12c and the plate 16 to adjust the attachment position (height) of the rubber pads 15. This adjustment plate 17 can be attached as needed.

Figure 11:
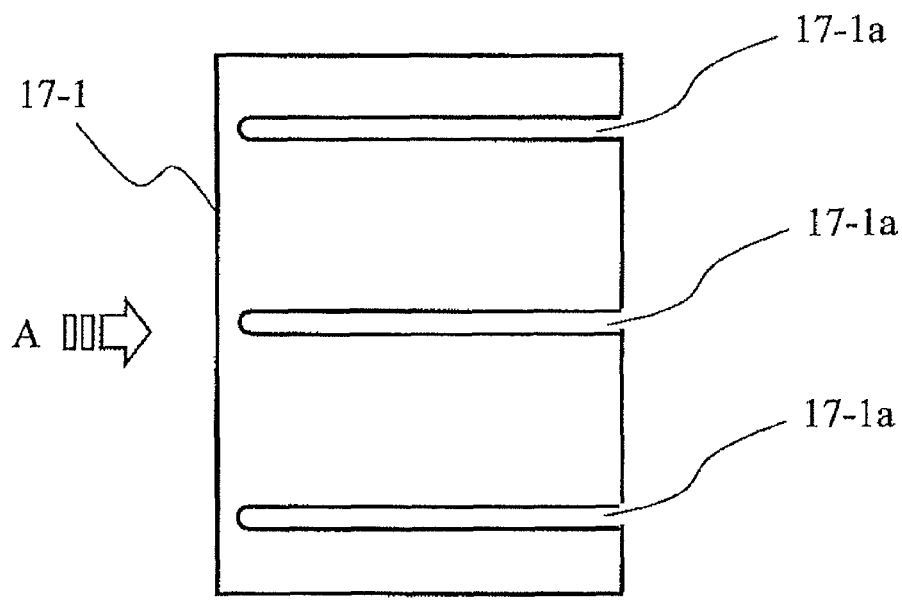
FIG. 11 is a plan view of an adjustment plate according to Modification Example 1-1 applicable in the first embodiment.

About preferred shapes (Modification Examples 1-1 to 1-6) of the adjustment plate 17, a description will next be made with reference to FIGS. 11 through 17. FIGS. 11 through 16 are plan views of adjustment plates according to Modification Examples 1-1 to 1-6 applicable in the first embodiment, and FIG. 17 is a perspective view of an external appearance illustrating a rail configuration in a state that the adjustment plate of FIG. 11 has been attached. The adjustment plate 17-1 according to Modification Example 1-1 as illustrated in FIG. 11 is inserted between the plate 16, to which the rubber pad 15 is attached, and the bottom rail plate 12c of the rail 12 as illustrated in FIG. 17. The inserting direction of the adjustment plate 17-1 is the direction of arrow A in FIG. 11. It is to be noted that the plate 16, to which the rubber pad 15 has been attached, are provided at opposite side edges thereof with three bolt-holes per side edge, and that the one plate 16 and the bottom rail plate 12c are fastened together with six bolts 18 and nuts 19.

As illustrated in FIG. 11, the adjustment plate 17-1 according to Modification Example 1-1 includes three slits 17-1a formed in a linear fashion along the direction of arrow A (first direction), which is the inserting direction, in a rectangular thin plate. These slits 17-1a are formed with a width slightly greater than the diameter of the bolts 18, and are configured to avoid interferences with the bolts 18 upon insertion of such adjustment plates 17-1 (see FIG. 17). For the insertion of the adjustment plates 17-1 between the plate 16 and the bottom rail plate 12c, the nuts 19 are loosened to provide a clearance between the plate 16 and the bottom rail plate 12c. When the adjustment plates 17 are inserted in the direction of arrow A into the clearance in the above-described state, the adjustment plates 17-1 can be set at a predetermined position. As appreciated from the foregoing, the use of the adjustment plates 17-1 has an advantage in that the efficiency of attachment work of the adjustment plates is improved compared with the case in which the adjustment plates are attached by completely removing the bolts 18 and nuts 19.

Figure 12:
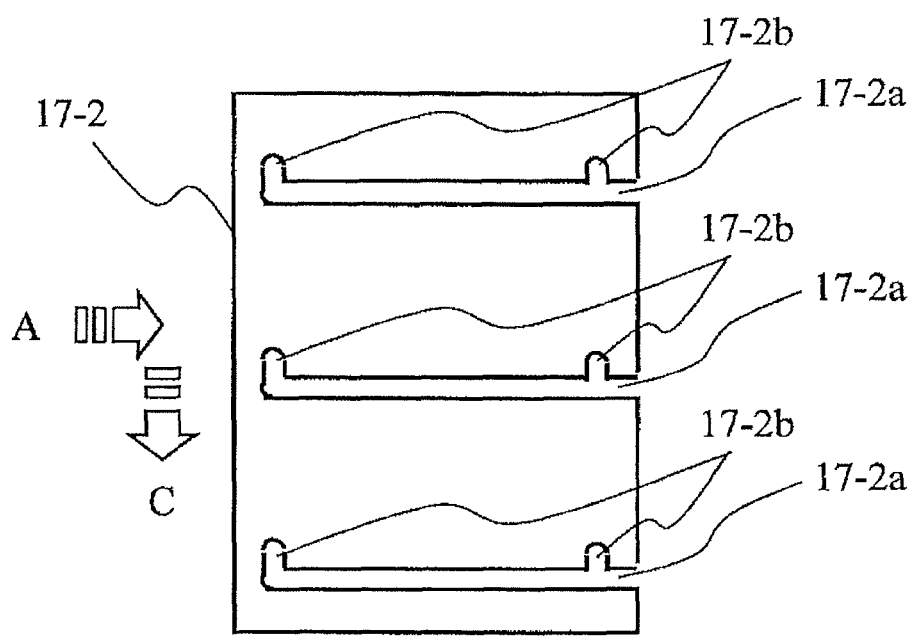
FIG. 12 is a plan view of an adjustment plate according to Modification Example 1-2 applicable in the first embodiment.

As illustrated in FIG. 12, the adjustment plate 17-2 according to Modification Example 1-2 includes three slits 17-2a formed in a linear fashion along the direction of arrow A (first direction), which is the inserting direction, in a rectangular thin plate, and in addition, two slots 17-2b formed from each slit 17-2a along the direction of arrow C (second direction) that intersects the direction of arrow A at right angles. For allowing the bolts 18 to enter the slots 17-2b without interferences, the slots 17-2b are formed with a width slightly greater than the diameter of the bolts 18. Obviously, the width of the slits 17-2a also has a dimension slightly greater than the diameter of the bolts 18.

For the insertion of such adjustment plates 17-2, which have been formed as described above, between the plate 16 and the bottom rail plate 12c, the nuts 19 are first loosened to provide a clearance between the plate 16 and the bottom rail plate 12c. The adjustment plates 17-2 are then inserted in the direction of arrow A. When the adjustment plates 17-2 are progressively inserted in the direction of arrow A, the bolts 18 eventually come into contact with end portions of the slits 17-2a. When the adjustment plates 17-2 are subsequently moved in the direction of arrow C, the bolts are received in the slots 17-2b. The nuts 19 are then tightened to complete the attachment of the adjustment plates 17-2.

With this configuration, the bolts 18 are received in the slots 17-2b, so that the adjustment plates 17-2 can be prevented from moving in a direction (detachment direction) opposite to the direction of arrow A even if the nuts 19 come loose due to vibrations that occur during running of the dump truck 1. The adjustment plates 17-2 according to Modification Example 1-2 are, therefore, excellent in that they are expected to make the attachment work efficient like the adjustment plates 17-1 according to Modification Example 1, and in addition, they can exhibit fall-off prevention effect.

Figure 13:
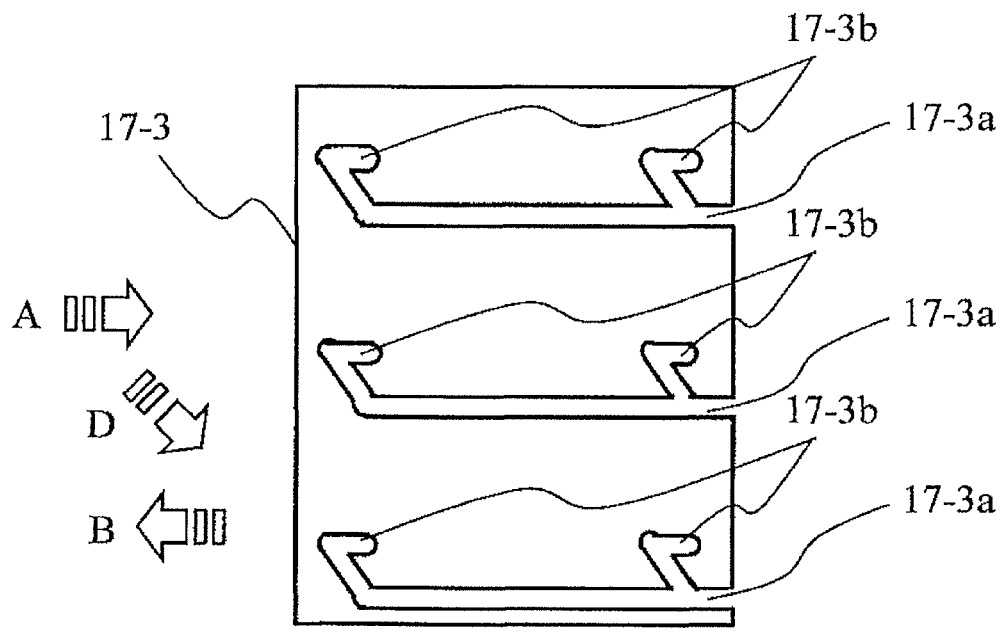
FIG. 13 is a plan view of an adjustment plate according to Modification Example 1-3 applicable in the first embodiment.

As illustrated in FIG. 13, the adjustment plate 17-3 according to Modification Example 1-3 includes three slits 17-3a formed in a linear fashion along the direction of arrow A (first direction), which is the inserting direction, in a rectangular thin plate, and in addition, two slots 17-3b formed from each slit 17-3a along the direction of arrow C (second direction) that obliquely intersects the direction of arrow A. For allowing the bolts 18 to enter the slots 17-3b without interferences, the slots 17-3b are formed in a bent shape with a width slightly greater than the diameter of the bolts 18. Obviously, the width of the slits 17-3a has a dimension slightly greater than the diameter of the bolts 18.

For the insertion of such adjustment plates 17-3, which have been formed as described above, between the plate 16 and the bottom rail plate 12c, the nuts 19 are first loosened to provide a clearance between the plate 16 and the bottom rail plate 12c. The adjustment plates 17-3 are then inserted in the direction of arrow A. When the adjustment plates 17-3 are progressively inserted in the direction of arrow A, the bolts 18 eventually come into contact with end portions of the slits 17-3a. Subsequently, the adjustment plates 17-3 are moved in the direction of arrow D, followed by further movement in the direction of arrow B. The bolts 18 are then received in the slots 17-3b. The nuts 19 are then tightened to complete the attachment of the adjustment plates 17-3. With this configuration, it is also possible to make the attachment work efficient and to exhibit fall-off prevention effect.

Figure 14:
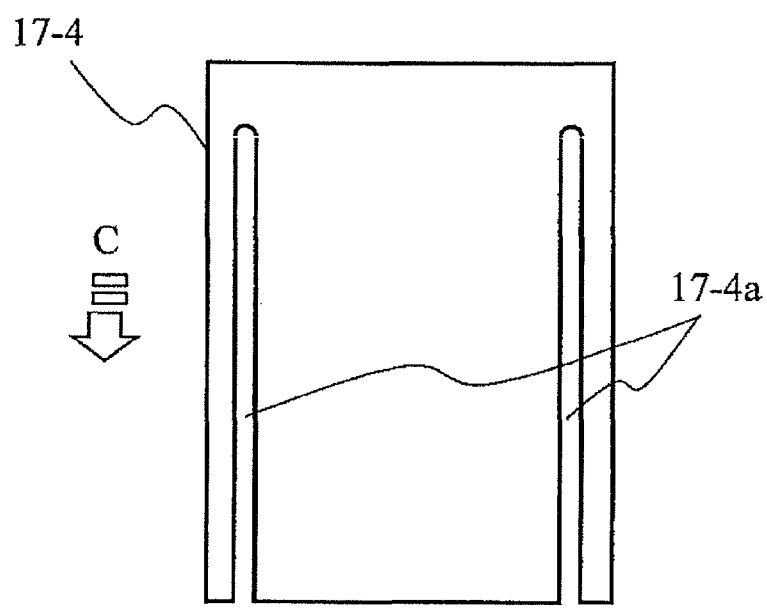
FIG. 14 is a plan view of an adjustment plate according to Modification Example 1-4 applicable in the first embodiment.

As illustrated in FIG. 14, the adjustment plate 17-4 according to Modification Example 1-4 includes two slits 17-4a formed in a linear fashion along the direction of arrow C (first direction), which is the inserting direction, in a rectangular thin plate. These slits 17-4a are formed with a width slightly greater than the diameter of the bolts 18, and are configured to avoid interferences upon insertion of the adjustment plate 17-4. When such adjustment plates 17-4 are used, the nuts 19 are loosened to provide a clearance between the plate 16 and the bottom rail plate 12c, and the adjustment plates 17-4 can then be inserted into the clearance. The adjustment plates 17-4, therefore, have an advantage in that the efficiency of attachment work of the adjustment plates is improved compared with the case in which the adjustment plates are attached by completely removing the bolts 18 and nuts 19.

Figure 15:
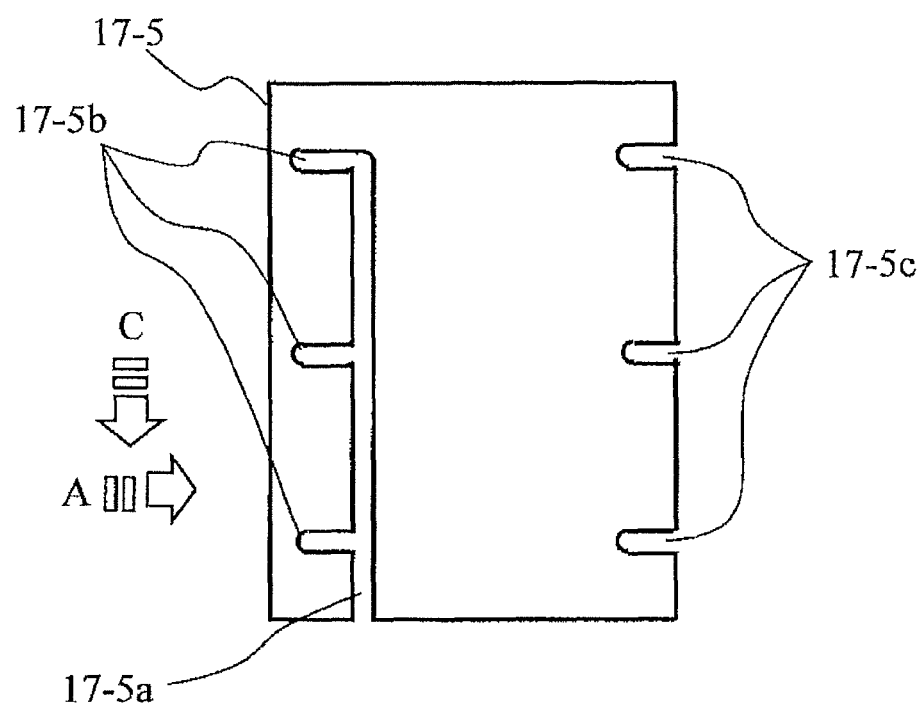
FIG. 15 is a plan view of an adjustment plate according to Modification Example 1-5 applicable in the first embodiment.

As illustrated in FIG. 15, the adjustment plate 17-5 according to Modification Example 1-5 includes one slit 17-5a formed in a linear fashion along the direction of arrow C (first direction), which is the inserting direction, on a left side of a rectangular thin plate, and in addition, three slots 17-5b formed from the slit 17-5a along the direction of arrow A (second direction) that intersects the direction of arrow C at right angles. On a right side of the thin plate, three slots 17-5c are also provided along the direction of arrow A. It is to be noted that the slots 17-5b and slots 17-5c are arranged on the same straight lines, respectively. For allowing the bolts 18 to enter the slots 17-5b and slots 17-5c without interferences, the slots 17-5b and slots 17-5c are formed with a width slightly greater than the diameter of the bolts 18. Obviously, the width of the slit 17-5a also has a dimension slightly greater than the diameter of the bolts 18.

For the insertion of such adjustment plates 17-5, which have been formed as described above, between the plate 16 and the bottom rail plate 12c, the nuts 19 are first loosened to provide a clearance between the plate 16 and the bottom rail plate 12c. The adjustment plates 17-5 are then inserted in the direction of arrow C. When the adjustment plates 17-5 are progressively inserted in the direction of arrow C, the bolt 18 eventually comes into contact with end portions of the slits 17-5a. When the adjustment plates 17-5 are then moved in the direction of arrow A, the bolts 18 are received in the slots 17-5b and slots 17-5c. The nuts 19 are then tightened to complete the attachment of the adjustment plates 17-5.

With this configuration, the bolts 18 are received in the slots 17-5b and slots 17-5c, so that the adjustment plates 17-5 can be prevented from moving in a direction (detachment direction) opposite to the direction of arrow C even if the nuts 19 come loose due to vibrations that occur during running of the dump truck 1. The adjustment plates 17-5 according to Modification Example 5, therefore, can assure to make the attachment work efficient and can also avoid fall-off.

Figure 16:
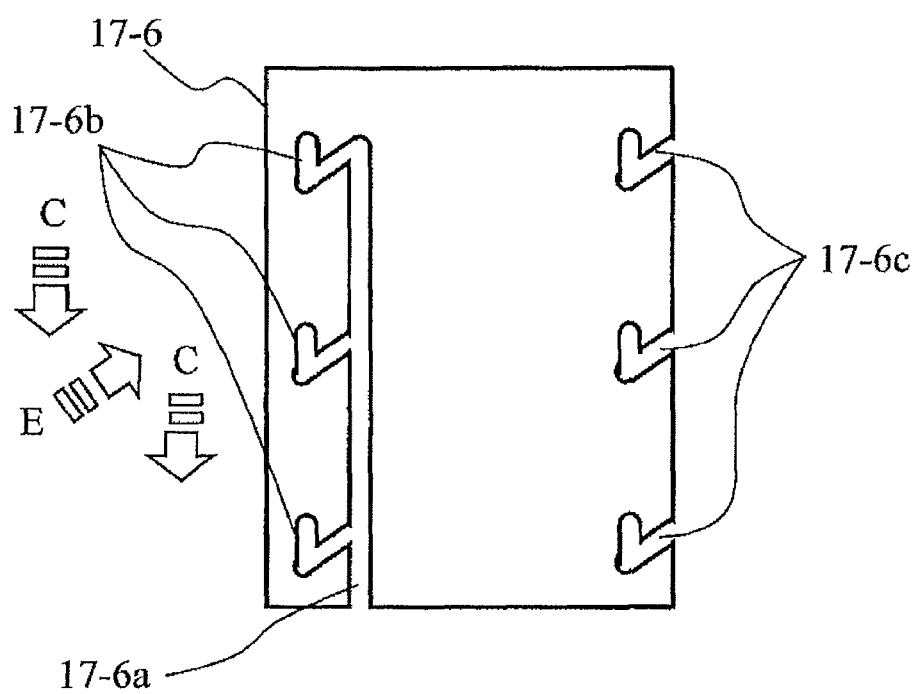
FIG. 16 is a plan view of an adjustment plate according to Modification Example 1-6 applicable in the first embodiment.
Figure 17:
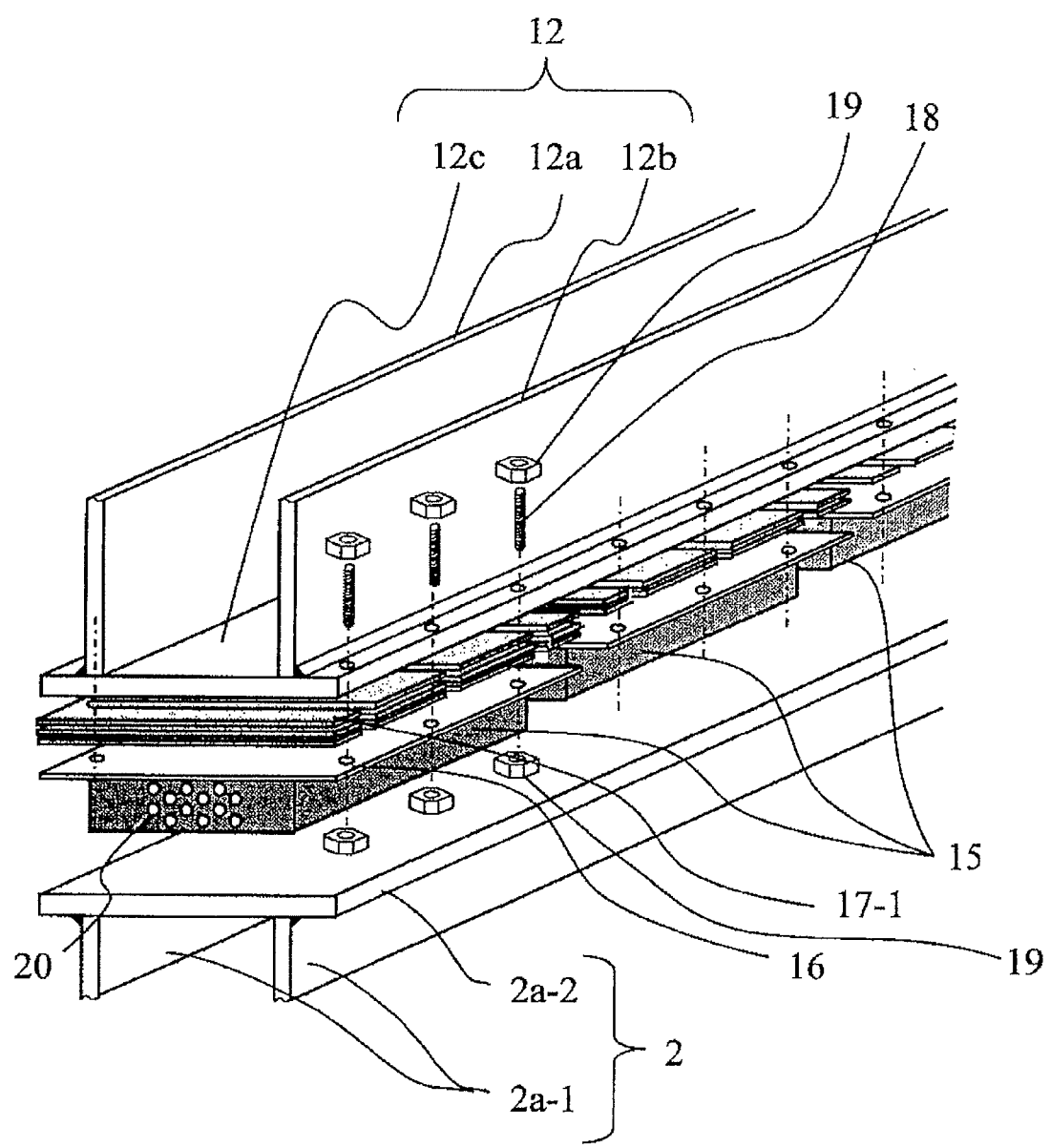
FIG. 17 is a perspective view illustrating parts of a rail, rubber pads, rubber pad attachment plates and a body frame, with adjustment plates according to Modification Example 1-1 being attached, in the first embodiment.

As illustrated in FIG. 16, the adjustment plate 17-6 according to Modification Example 1-6 includes one slit 17-6a formed in a linear fashion along the direction of arrow C (first direction), which is the inserting direction, on a left side of a rectangular thin plate, and in addition, three slots 17-6b formed from the slit 17-6a along the direction of arrow E (second direction) that obliquely intersects the direction of arrow C. On a right side of the thin plate, three slots 17-6c are provided along the direction of arrow E that obliquely intersects the direction of arrow C. Similar to the adjustment plate 17-3 according to Modification Example 1-3 (see FIG. 13), the slots 17-6b are in a bent form. The slots 17-6c are in the same form as the slots 17-6b, and the slots 17-6c and slots 17-6b are both arranged at equal intervals in the direction of arrow C. For allowing the bolts 18 to enter the slots 17-6b and slots 17-6c without interferences, the slots 17-6b and slots 17-6c are formed with a width slightly greater than the diameter of the bolts 18. Obviously, the width of the slit 17-6a has a dimension slightly greater than the diameter of the bolts 18.

For the insertion of such adjustment plates 17-6, which have been formed as described above, between the plate 16 and the bottom rail plate 12c, the nuts 19 are first loosened to provide a clearance between the plate 16 and the bottom rail plate 12c. The adjustment plates 17-6 are then inserted in the direction of arrow C. When the adjustment plates 17-6 are progressively inserted in the direction of arrow C, the bolt 18 eventually comes into contact with end portions of the slits 17-6a. After the adjustment plates 17-6 are moved in the direction of arrow E, the adjustment plates 17-6 are moved in the direction of arrow C. The bolts 18 are then received in the slots 17-6b and slots 17-6c. The nuts 19 are then tightened to complete the attachment of the adjustment plates 17-6. With this configuration, it is also possible to make the attachment work efficient and to exhibit fall-off prevention effect.

It is to be noted that the directions, widths and lengths of the slits and slots can obviously be designed as desired. Further, no limitation is imposed on the shape of each adjustment plate insofar as it can be inserted between the plate 16 and the bottom rail plate 12c.

In the above-described first embodiment, the description was made of the configuration that the rubber pads 15 were arranged on the bottom rail plate 12c. It is also possible to adopt the configuration that the rubber pads 15 are arranged on the top frame plate 2a-2 of the body frame 2.

Second Embodiment

With reference to drawings, a description will next be made about a dump truck according to a second embodiment. In the second embodiment, the elements corresponding to "the load transmission structures" in the present invention are different from those in the first embodiment. Therefore, a description will hereinafter be made centering around these differences, and elements which are the same as the corresponding elements in the first embodiment are designated by the same reference signs and their description is omitted herein.

Figure 18:
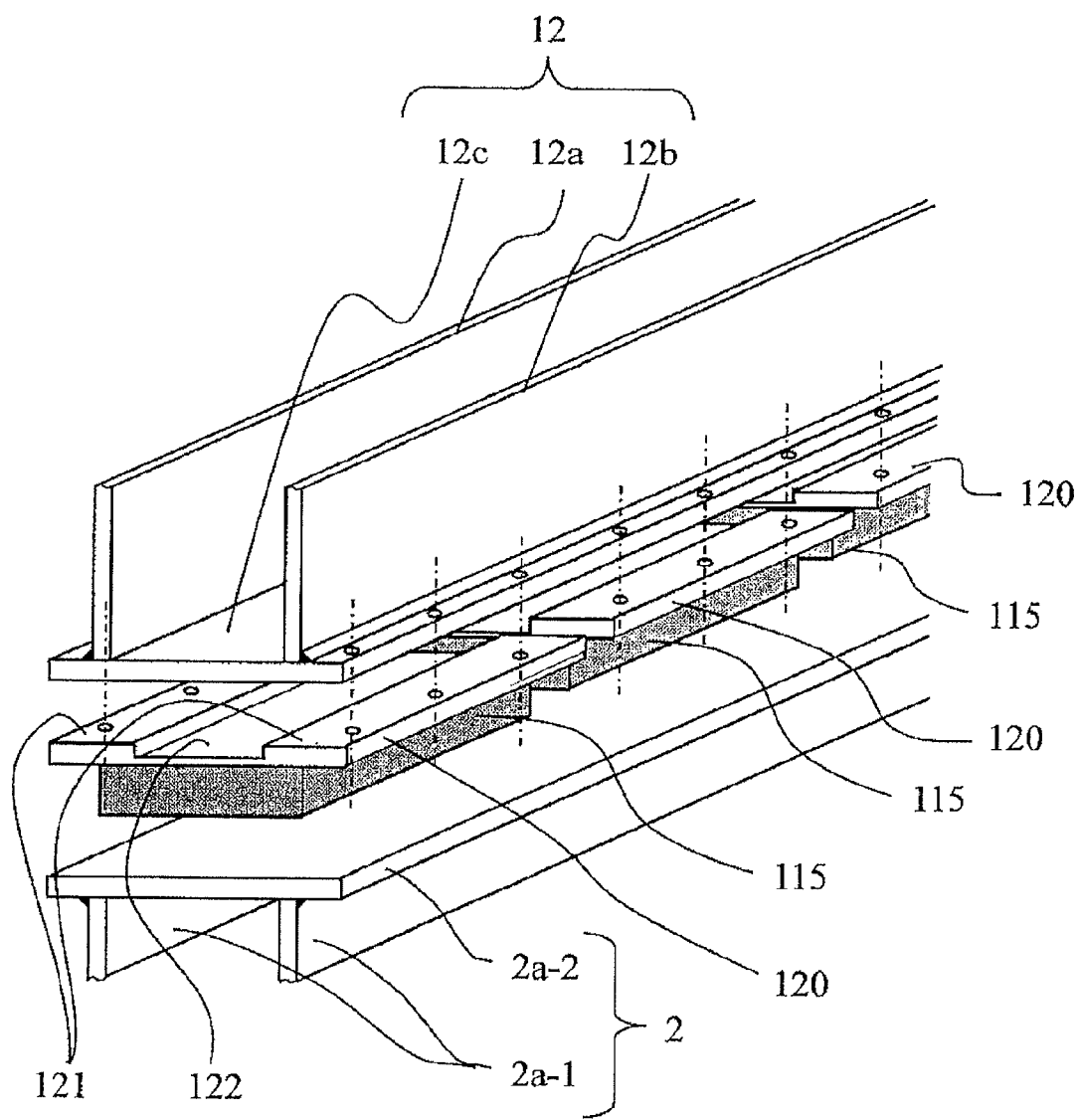
FIG. 18 is a perspective view illustrating parts of a rail, rubber pads, rubber pad attachment plates and a body frame of a dump truck according to a second embodiment of the present invention.
Figure 19:
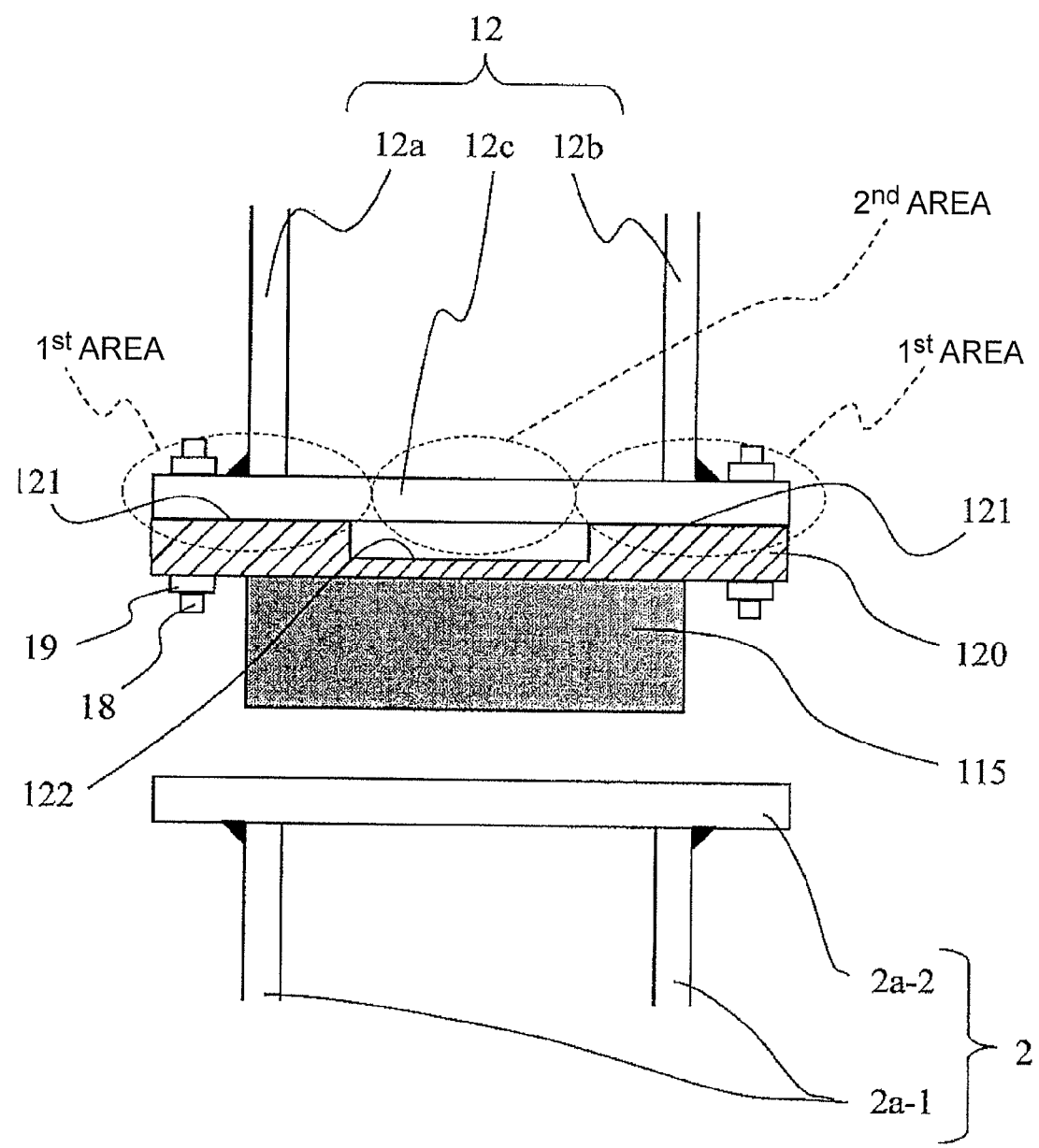
FIG. 19 is a cross-sectional view of the rail, rubber pad, rubber pad attachment plate and body frame illustrated in FIG. 18 as taken in a vertical direction.

In the second embodiment, the elements corresponding to "the load transmission structures" in the present invention are rubber pads (pads) 115 and rubber pad attachment plates (pad attachment plates) 120. These elements are shown in FIGS. 18 and 19. FIG. 18 is a perspective view illustrating parts of the rail 12, rubber pads 115, rubber pad attachment plates 120 and body frame 2, and FIG. 19 is a vertical cross-sectional view of the rail 12, rubber pad 115, rubber pad attachment plate 120 and body frame 2 illustrated in FIG. 18 as taken in a vertical direction.

As illustrated in FIGS. 18 and 19, each rubber pad 115 is made of rubber as one example of the elastic material, and is in the form of a solid rectangular parallelepiped having a rectangular cross-section. It is to be noted that the rubber pad 115 is not provided with such hollow bores or the like as described in the first embodiment. With an adhesive, the rubber pad 115 is firmly bonded at an upper surface thereof with the corresponding rubber pad attachment plate 120. It is to be noted that as the number of the rubber pads 115, each rail 12 is provided with several rubber pads. These rubber pads can cushion an impact when the body 5 comes to rest on the body frame 2, and also allow the body 5 to rest in a stable posture under a friction force between the rubber pads 115 and the body frame 2.

On the other hand, each rubber pad attachment plate 120 is formed of a steel plate having a predetermined thickness, and at its upper surface, a concave/convex structure is formed. Specifically, the rubber pad attachment plate 120 is provided, at a central part of its upper surface, with a flat-bottomed recess 122 along a longitudinal direction, and as a consequence, flat lands 121 are formed along the longitudinal direction at opposite sides of the recess 122. It is to be noted that plural holes provided in opposite side parts of the rubber pad attachment plate 120 are holes for the insertion of the bolts 18.

As illustrated in FIG. 19, the rubber pad 120 is, at the lands 121 thereof, in contact with the first areas of the bottom rail plate 12c, but is, at the recess 122 thereof, out of contact with the second area of the bottom rail plate 12c. In other words, a clearance equivalent to the depth of the recess 122 is formed between the bottom rail plate 12c and the rubber pad attachment plate 120. Therefore, the bottom rail plate 12c receives a reaction force from the body frame 2 via the rubber pads 115 and rubber pad attachment plates 120, but the reaction force concentrates at the first areas.

Figure 20:
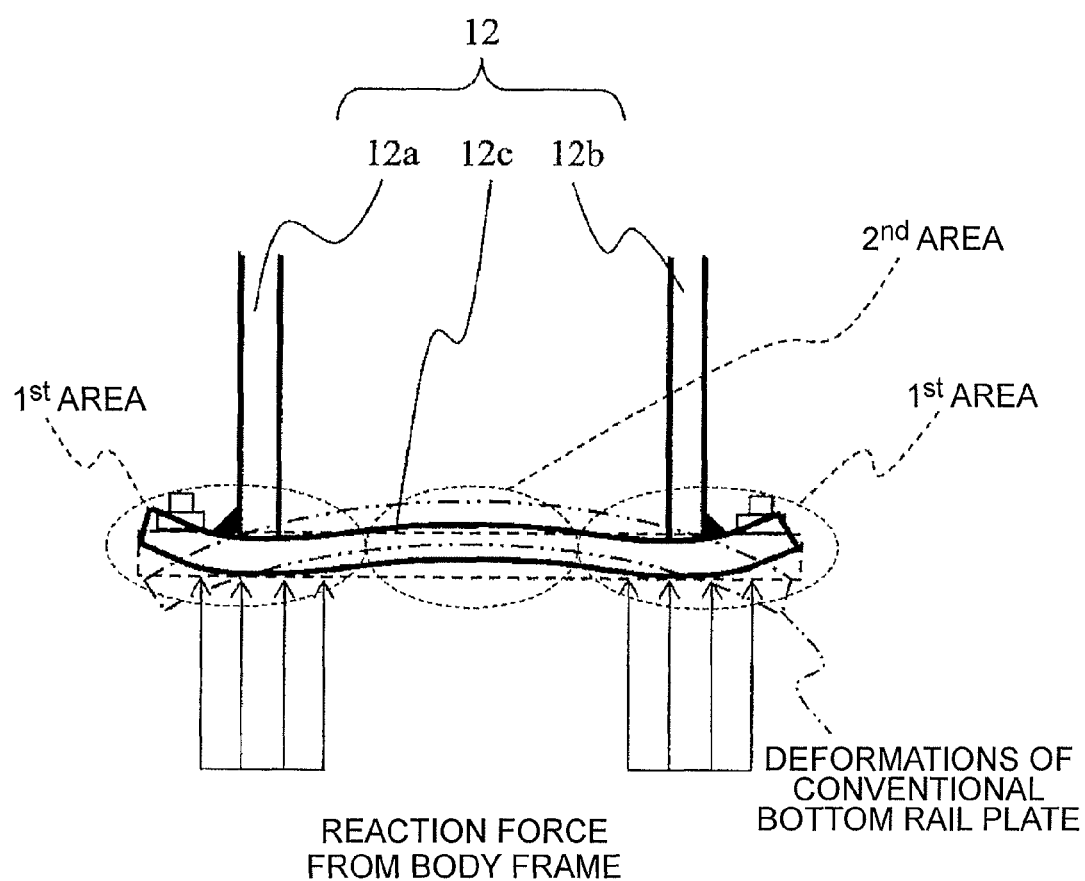
FIG. 20 is a view illustrating the distribution of a reaction force that a bottom rail plate receives from the body frame, and deformations of the bottom rail plate, in the second embodiment.

About this concentration of the reaction force, a description will be made with reference to FIG. 20. FIG. 20 illustrates the distribution of the reaction force that the bottom rail plate 12c receives from the body frame 2, and the state of deformations of the bottom rail plate 12c. As mentioned above, the bottom rail plate 12c receives the reaction force from the body frame 2 via the lands 121 of the rubber pad attachment plates 120. As illustrated in FIG. 20, the distribution of the reaction force concentrates at the first areas of the bottom rail plate 12c. In other words, the reaction force is transmitted, via the rubber pad attachment plate 120, concentrating at parts where the bottom rail plate 12c and the side rail plates 12a, 12b are in contact with each other.

As a result, as illustrated in FIG. 20, a bending moment on the bottom rail plate 12c (a total bending moment between the side rail plates 12a,12b) is, therefore, reduced as appreciated from a comparison with deformations of a conventional bottom rail plate, leading to a decrease in the quantity of bending deformations of the bottom rail plate 12c and also to a decrease in the bending deflection angle at each of the joints between the bottom rail plate 12c and the side rail plates 12a,12b. This configuration has made it possible to reduce a bending stress to be applied to the central part of the bottom rail plate 12c and bending stresses to be applied to the joints between the bottom rail plate 12c and the side rail plates 12a,12b.

Figure 21A:
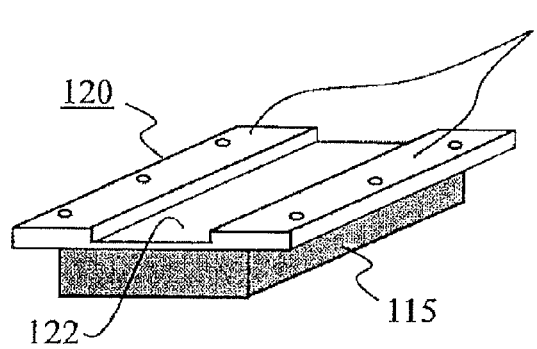
FIGS. 21A through 21F are views illustrating various modification examples of the rubber pad attachment plates and rubber pads applied to the second embodiment.

It is to be noted that the rubber pad attachment plates and rubber pads for use in the second embodiment are not limited to the above-described configurations and can be modified in various ways. A description will hereinafter be made about modification examples of the rubber pad attachment plates and rubber pads. FIGS. 21A through 21F illustrate the modification examples of the rubber pad attachment plates and rubber pads. FIG. 21A illustrates the rubber pad attachment plate 120 and rubber pad 115 used in the above-described second embodiment. As mentioned above, the rubber pad attachment plate 120 illustrated in FIG. 21A is in contact, at the lands 121 thereof, with the first areas of the bottom rail plate 12c, but is out of contact, at the recess 122 thereof, with the second area of the bottom rail plate 12c. As a reaction force which the bottom rail plate 12c receives can be concentrated at the first areas by the rubber pad attachment plate 120, it is hence possible to reduce stresses to be applied to high-stress areas of the rail 12.

Figure 21B:
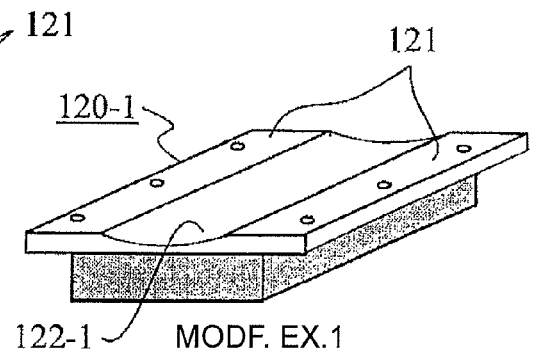

A rubber pad attachment plate 120-1 according to Modification Example 1 as illustrated in FIG. 21B is different in the shape of a bottom wall of a recess 122-1 from that illustrated in FIG. 21A. Specifically, in the configuration of Modification Example 1, the recess 122-1 of the rubber pad attachment plate 120-1 is formed by a curved wall like an inner peripheral wall of a pipe after the pipe has been cut in parallel to a central axis thereof.

With the configuration of Modification Example 1, a reaction force to be transmitted to the bottom rail plate 12c from the body frame 2 can be transmitted concentrating at the first areas where the bottom rail plate 12c is in contact with the side rail plates 12a, 12b (see FIG. 20). It is, therefore, possible to reduce a bending stress to be applied to the central part of the bottom rail plate 12c and bending stresses to be applied to the joints between the bottom rail plate 12c and the side rail plates 12a,12b.

Figure 21C:
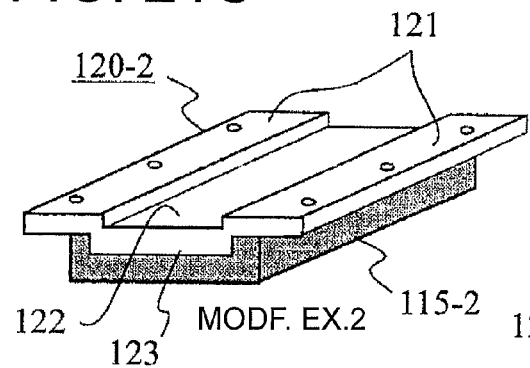

In a rubber pad attachment plate 120-2 according to Modification Example 2 as illustrated in FIG. 21C, a concave/convex structure is also formed at a surface (lower surface) on a side where a rubber pad 115-2 is attached. Specifically, a protruding part 123 that protrudes downwardly is formed on a bottom wall of the recess 122. On the other hand, the rubber pad 115-2 is provided with a depression in which the protruding part 123 is fitted. Owing to the fitting of the protruding part 123 in the depression of the rubber pad 115-2, the rubber pad 115-2 is still more firmly fixed on the rubber pad attachment plate 120-2.

With the configuration of Modification Example 2, similar to Modification Example 1 of FIG. 21, a reaction force is transmitted concentrating at the first areas formed on the bottom rail plate 12c. It is, therefore, possible to reduce stresses to be applied to the high-stress parts of the rail 12 and body frame 2. Further, the rubber pads 115-2 and rubber pad attachment plates 120-2 are concave-convex fitted in Modification Example 2. Modification Example 2, therefore, has the advantage that the rubber pads 115-2 hardly separate from the rubber pad attachment plates 120-2 even when a force is applied in the lateral direction.

Figure 21D:
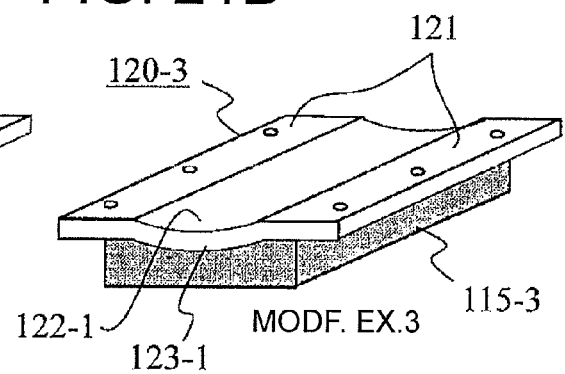

A rubber pad attachment plate 120-3 according to Modification Example 3 as illustrated in FIG. 21D is provided, at an upper surface thereof, with a recess 122-1 formed by a similar curved wall as in Modification Example 1. Further, a bulging part 123-1 formed by a curved wall is also formed at a wall (lower wall) of the rubber pad attachment plate 120-3 on a side where a rubber pad 115-3 is attached. On the other hand, the rubber pad 115-3 is provided with a depression in which the bulging part 123-1 is fitted. Owing to the fitting of the bulging part 123-1 in the depression of the rubber pad 115-3, the rubber pad 115-3 is still more firmly fixed on the rubber pad attachment plate 120-3.

With the configuration of Modification Example 3, similar to Modification Examples 1 and 2 of FIGS. 21B and 21C, a reaction force is transmitted concentrating at the first areas formed on the bottom rail plate 12c. It is, therefore, possible to reduce stresses to be applied to the high-stress parts of the rail 12 and body frame 2. Further, the rubber pads 115-3 and rubber pad attachment plates 120-3 are concave-convex fitted in Modification Example 3. Modification Example 3, therefore, has the advantage that the rubber pads 115-3 hardly separate from rubber pad attachment plates 120-3 even when a force is applied in the lateral direction.

Figure 21E:
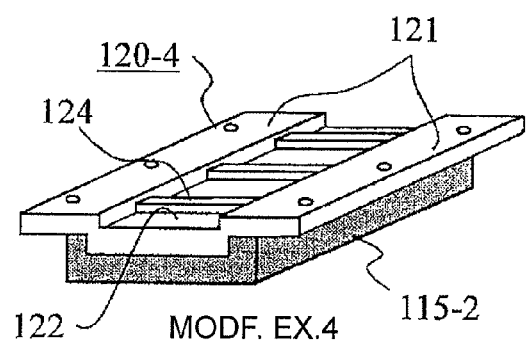

A rubber pad attachment plate 120-4 according to Modification Example 4 as illustrated in FIG. 21E has been configured by providing the configuration of the rubber pad attachment plate 120-2 according to Modification Example 2 of FIG. 21C with a plurality of reinforcement ribs 124 that extend in the lateral direction. These reinforcement ribs 124 are formed with a height smaller than the depth of the recess 122 so that the reinforcement ribs 124 do not come into contact with the second area of the bottom rail plate 12c when the rubber pad attachment plate 120-4 is attached to the bottom rail plate 12c. The configuration of Modification Example 4 exhibits similar effects as Modification Example 2 of FIG. 21. In addition, the configuration of Modification Example 4 enhances the rigidity of the rubber pad attachment plate 120-4 by the reinforcement ribs 124 so that the rubber pad attachment plate 120-4 is resistant to breakage.

Figure 21F:
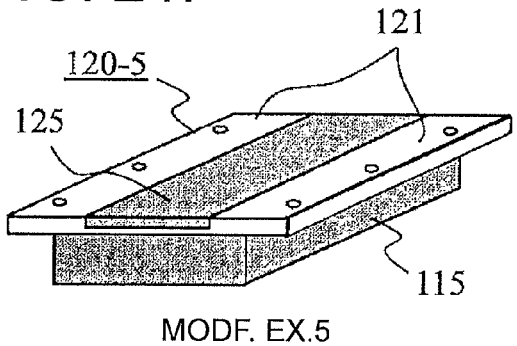

A rubber pad attachment plate 120-5 according to Modification Example 5 as illustrated in FIG. 21F has been configured by placing an insert 125 in the recess of the rubber plate attachment plate illustrated in any one of FIGS. 21A through 21E such that the insert 125 and the lands 121 become flush with each other. Employed as the insert 125 is one having lower rigidity compared with the lands 121 of the rubber attachment plate. According to the configuration of Modification Example 5, a reaction force which the bottom rail plate 12c receives can be preferably concentrated at the first areas, and therefore, stresses to be applied to the high-stress parts of the rail 12 can be reduced as in Modification Examples 1 to 4 of FIGS. 21B to 21E. It is to be noted that the part of the rubber pad attachment plate 120-5, where the insert 125 is placed, corresponds to "the second pad attachment plate" in the present invention, and that the parts of the lands 121 correspond to "the first pad attachment plates" in the present invention.

Figure 22:
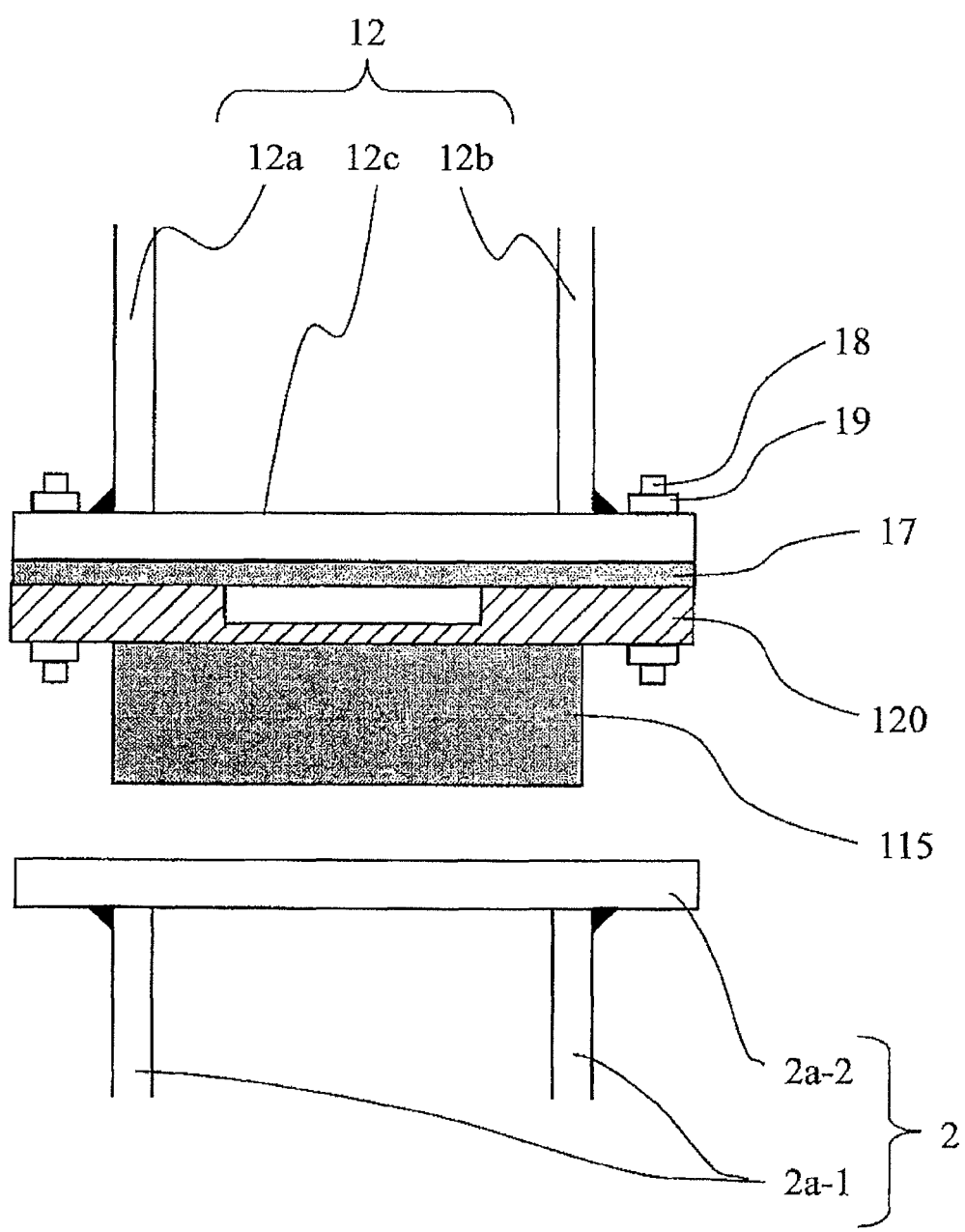
FIG. 22 is a view illustrating another example of the manner of attachment of the rubber pad attachment plate to the bottom rail plate in the second embodiment.

In the above-described second embodiment, the description is made about the example that the rubber pad attachment plate 120 is directly attached to the bottom rail plate 12c. However, the manner of attachment of the rubber pad attachment plate 120 to the bottom rail plate 12c is not limited to this configuration. About another example of the manner of attachment of the rubber pad attachment plate 120 to the bottom rail plate 12c, a description will be made with reference to FIG. 22. In the example illustrated in FIG. 22, the rubber pad attachment plate 120 with the rubber pad 115 bonded thereon is attached to the bottom rail plate 12c via the adjustment plate 17. According to this configuration, the attachment position (height) of the rubber pad 115 to the bottom rail plate 12c can be adjusted. Obviously, this adjustment plate 17 can be attached as needed. When needed, anyone of the above-described adjustment plates 17-1 to 17-6 (see FIGS. 11 through 16) can be obviously used as the adjustment plate 17.

Figure 23:
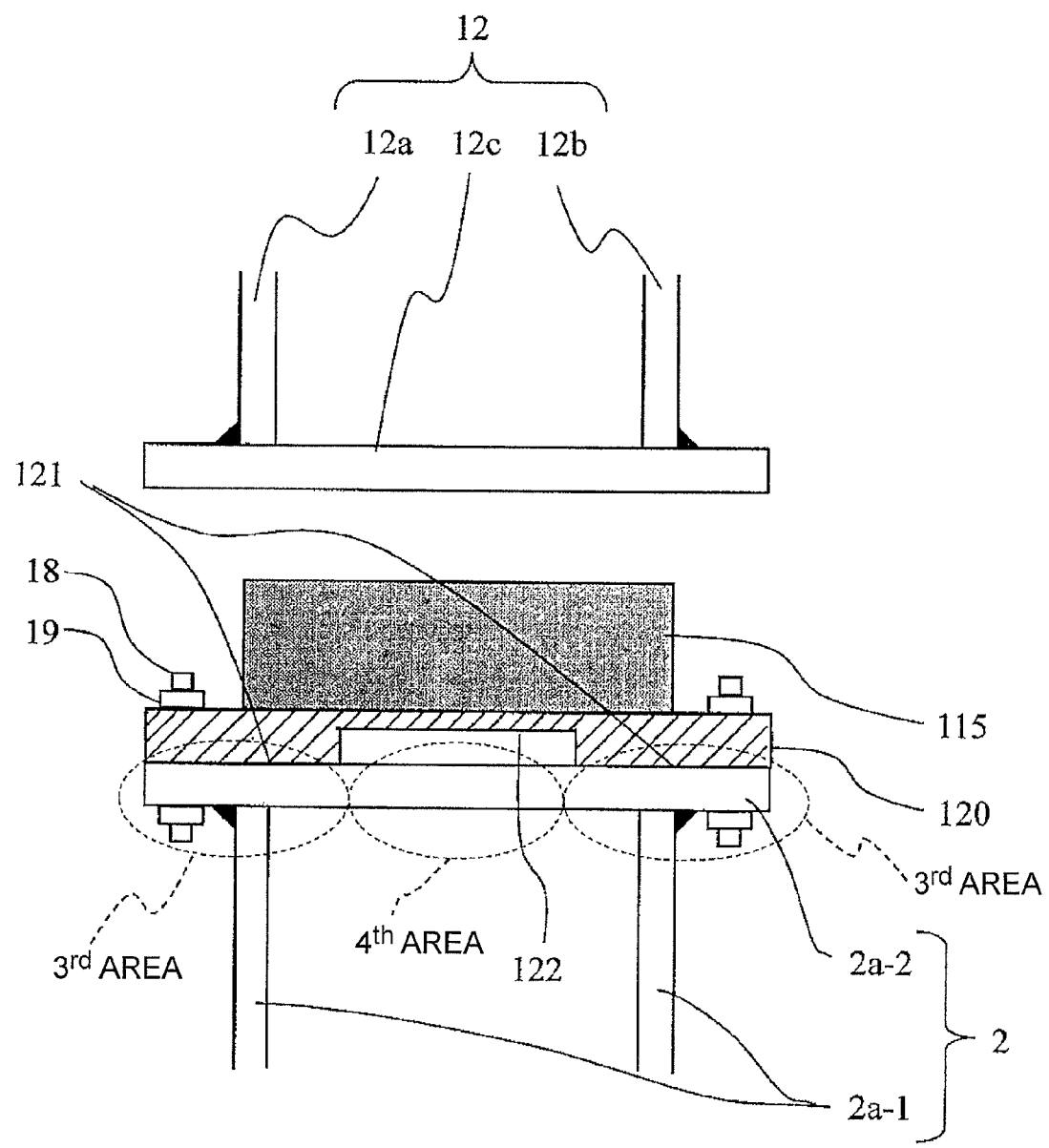
FIG. 23 is a view illustrating an attachment example of the rubber pad attachment plate to the body frame in the second embodiment.
Figure 24:
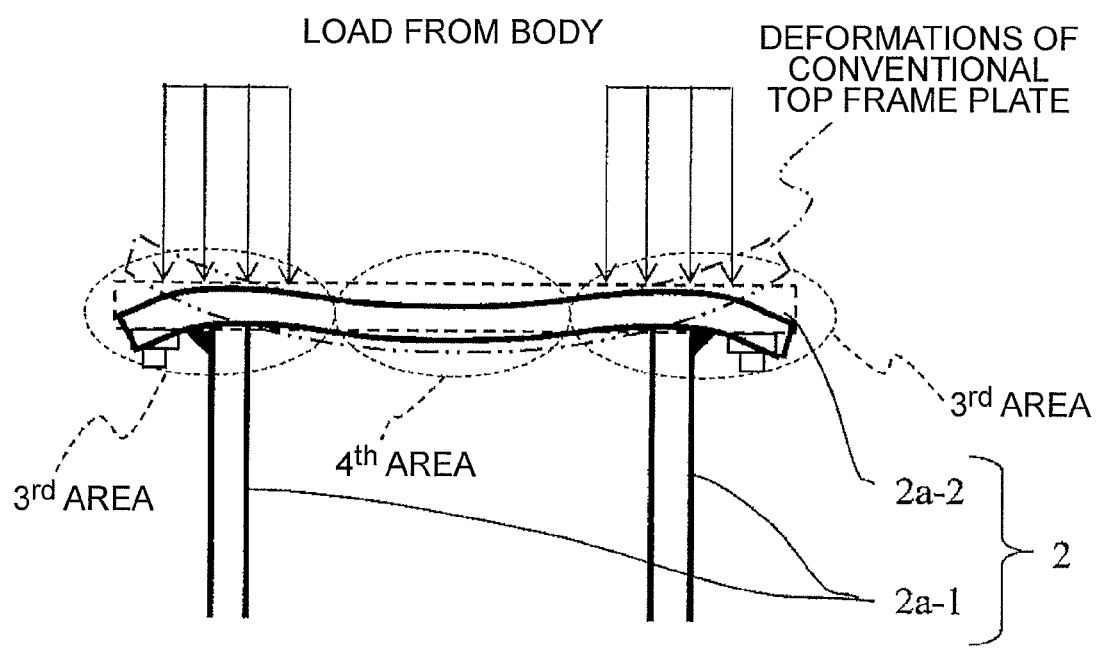
FIG. 24 is a view illustrating deformations of a top frame plate shown in FIG. 23.

When it is desired to reduce stresses to be applied to the high-stress parts of the top frame plate 2a-2 of the body frame 2, the rubber pad attachment plate 120 with the rubber pad 115 attached thereto can be turned upside down from the position illustrated in FIG. 19 and can then be attached to the body frame 2. FIG. 23 illustrates an example that the rubber pad attachment plate 120 is attached to the body frame 2. FIG. 24 illustrates a modification of the top frame plate 2a-2 in FIG. 23. As illustrated in FIG. 23, the rubber pad attachment plate 120 is in contact, at only the lands 121 thereof, with the third areas of the top frame plate 2a-2. Accordingly, a load applied from the body 5 concentrates at only the third areas of the top frame plate 2a-2 as illustrated in FIG. 24.

As illustrated in FIG. 24, a bending moment on the top frame plate 2a-2 (a total bending moment between the side frame plates 2a-1) is, therefore, reduced as appreciated from a comparison with deformations of a conventional top frame plate, leading to a decrease in the quantity of bending deformations of the top frame plate 2a-2 and also to a decrease in the bending deflection angle at each of the joints between the top frame plate 2a-2 and the side frame plates 2a-1. As a consequence, it is possible to reduce a bending stress to be applied to the central part of the top frame plate 2a-2 and bending stresses to be applied to the joints between the top frame plate 2a-2 and the side frame plates 2a-1.

Third Embodiment

With reference to drawings, a description will next be made about a dump truck according to a third embodiment. In the third embodiment, the elements corresponding to "the load transmission structures" in the present invention are different from the corresponding ones in the first and second embodiments. Therefore, a description will hereinafter be made centering around these differences, and elements which are the same as the corresponding elements in the first or second embodiment are designated by the same reference signs and their description is omitted herein.

Figure 25:
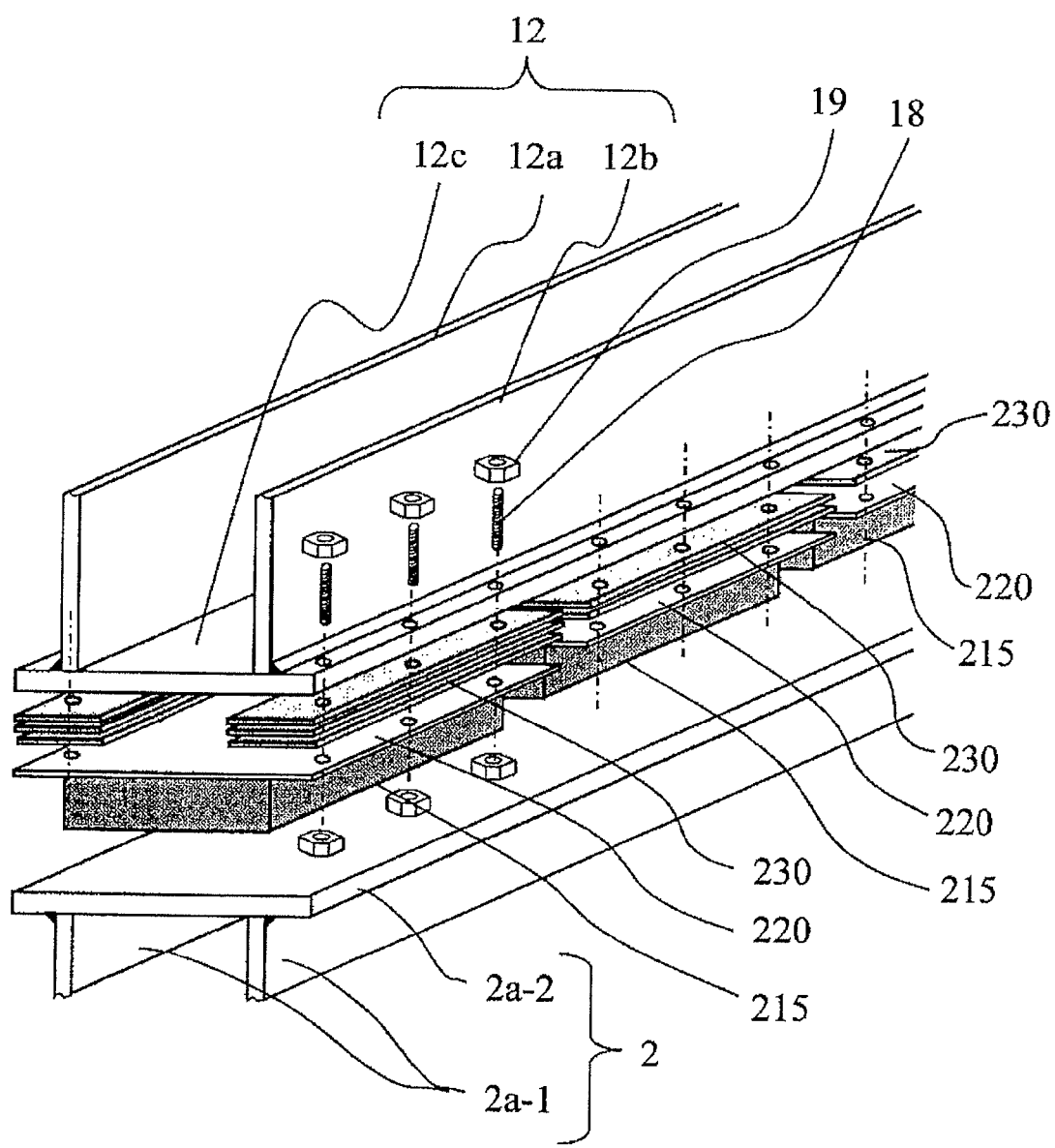
FIG. 25 is a perspective view illustrating parts of a rail, rubber pads, rubber pad attachment plates, flat plates and a body frame of a dump truck according to a third embodiment of the present invention.
Figure 26:
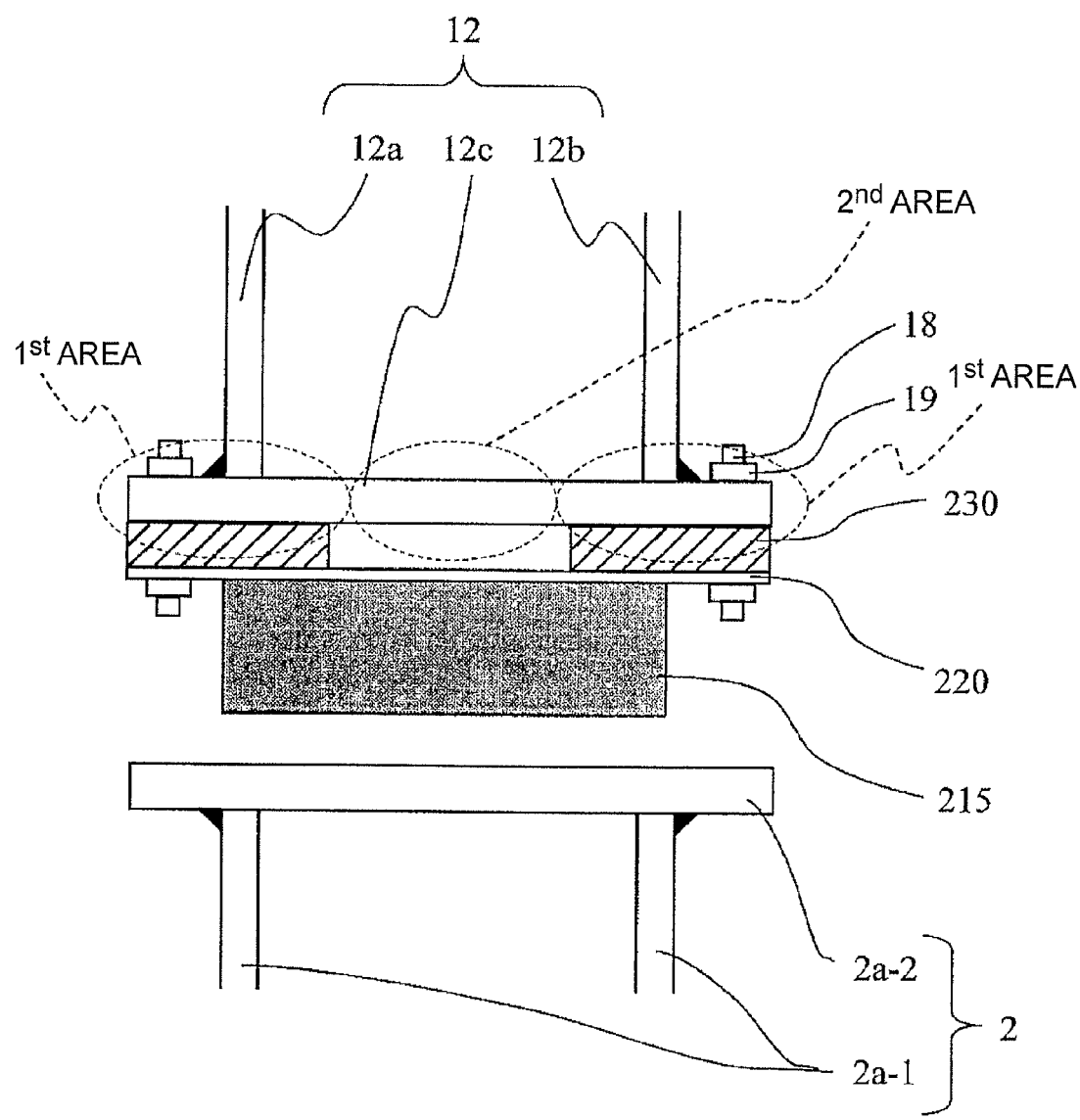
FIG. 26 is a cross-sectional view of the rail, rubber pad, rubber pad attachment plate, flat plates and body frame illustrated in FIG. 25 as taken in a vertical direction.

In the third embodiment, the elements corresponding to "the load transmission structures" in the present invention are rubber pads (pads) 215, rubber pad attachment plates (pad attachment plates) 220, and flat plates (230). These elements are shown in FIGS. 25 and 26. FIG. 25 is a perspective view illustrating parts of the rail 12, rubber pads 215, rubber pad attachment plates 220, flat plates 230 and body frame 2, and FIG. 26 is a vertical cross-sectional view of the rail 12, rubber pad 215, rubber pad attachment plate 220, flat plates 230 and body frame 2 illustrated in FIG. 25 as taken in a vertical direction.

As illustrated in FIGS. 25 and 26, each rubber pad 215 is made of rubber as one example of the elastic material, and is in the form of a solid rectangular parallelepiped having a rectangular cross-section. It is to be noted that the rubber pad 215 is not provided with such hollow bores or the like as described in the first embodiment. With an adhesive, the rubber pad 215 is firmly bonded at an upper surface thereof to the corresponding rubber pad attachment plate 220. It is to be noted that as the number of the rubber pads 215, each rail 12 is provided with several rubber pads. These rubber pads can cushion an impact when the body 5 comes to rest on the body frame 2, and also allow the body 5 to rest in a stable posture under a friction force between the rubber pads 215 and the body frame 2.

On the other hand, each rubber pad attachment plate 220 is formed of a steel plate which has a predetermined thickness and is flat at both front and back surfaces thereof, and the corresponding rubber pad 215 is attached to the back surface of the rubber pad attachment plate. It is to be noted that plural holes provided in opposite side parts of the rubber pad attachment plate 220 are holes for the insertion of the bolts 18.

In the third embodiment, plural flat plates 230 are inserted between the rubber pad attachment plate 220 and the bottom rail plate 12c. The flat plates 230 have been formed by cutting steel plates into rectangular strips. As illustrated in FIG. 26, the flat plates 230 have substantially the same width as the first areas of the bottom rail plate 12c. As illustrated in FIG. 26, in the state that the rubber pad 215, rubber pad attachment plate 220 and flat plates 230 have been attached to the bottom rail plate 12c, the first areas are in contact with the top flat plates 230 but the second area is not in contact with the top flat plates 230, and a clearance is formed as much as the total thickness of the flat plates 230. Therefore, the bottom rail plate 12c receives a reaction force from the body frame 2 via the rubber pads 215, rubber pad attachment plates 220 and flat plates 230, but the reaction force concentrates at the first areas.

Figure 27:
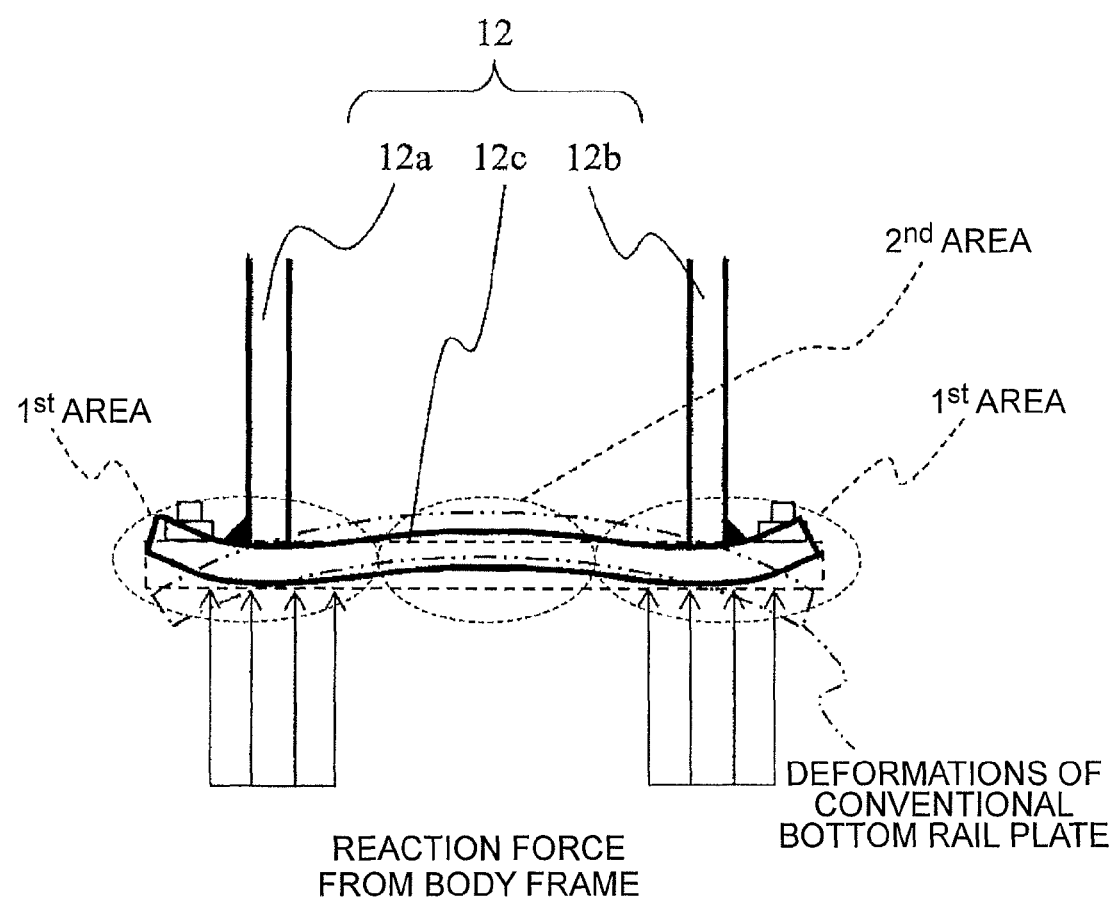
FIG. 27 is a view illustrating the distribution of a reaction force that a bottom rail plate receives from the body frame, and deformations of the bottom rail plate, in the third embodiment.

About this concentration of the reaction force, a description will be made with reference to FIG. 27. FIG. 27 illustrates the distribution of the reaction force that the bottom rail plate 12c receives from the body frame 2, and the state of deformations of the bottom rail plate 12c. As mentioned above, the bottom rail plate 12c receives the reaction force from the body frame 2 via the flat plates 230. As illustrated in FIG. 27, the distribution of the reaction force concentrates at the first areas of the bottom rail plate 12c. In other words, the reaction force is transmitted, via the flat plates 230, concentrating at parts where the bottom rail plate 12c and the side rail plates 12a, 12b are in contact with each other.

As a result, as illustrated in FIG. 27, a bending moment on the bottom rail plate 12c (a total bending moment between the side rail plates 12a,12b) is, therefore, reduced as appreciated from a comparison with deformations of a conventional bottom rail plate, leading to a decrease in the quantity of bending deformations of the bottom rail plate 12c and also to a decrease in the bending deflection angle at each of the joints between the bottom rail plate 12c and the side rail plates 12a,12b.

Figure 28A:
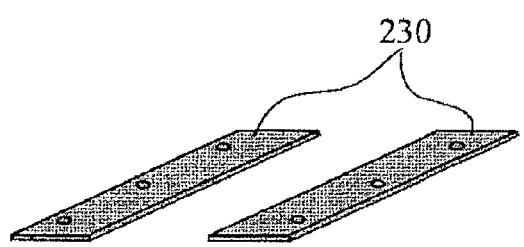
FIGS. 28A through 28F are views illustrating use examples of flat plates as applicable to the third embodiment.
Figure 28B:
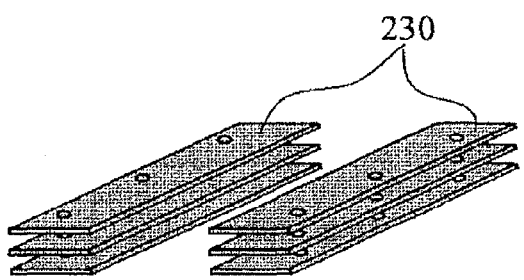
Figure 28C:
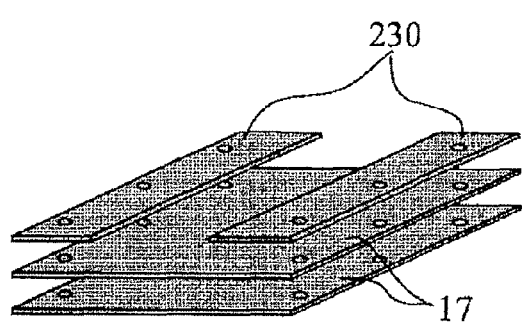
Figure 28D:
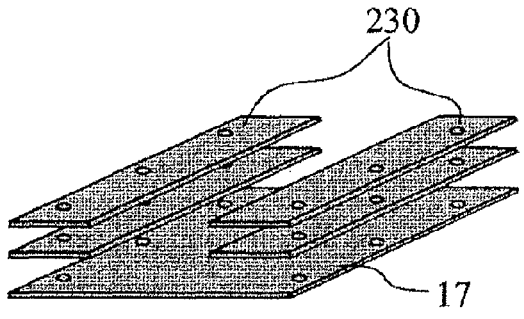
Figure 28E:
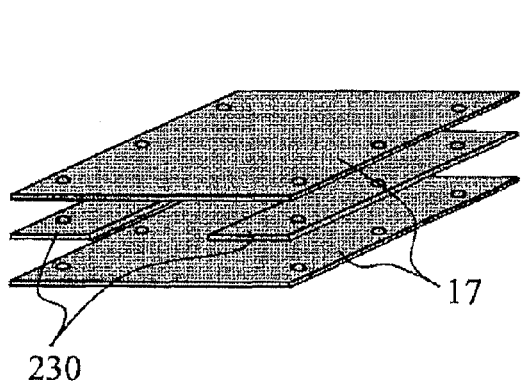
Figure 28F:
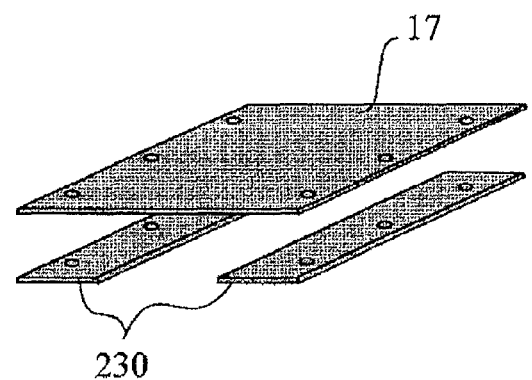

FIGS. 28A through 28F illustrate use examples of flat plates 230. As illustrated in FIGS. 28A through 28F, the number of the flat plates 230 for use in the third embodiment can be optional. For example, as illustrated in FIG. 28A, flat plates 230 may be inserted, one on either side, between the bottom rail plate 12c and the rubber pad attachment plate 220, or as in FIG. 28B, three flat plates 230 may be inserted on each side. Further, as illustrated in FIGS. 28C through 28F, plural flat plates 230 may be combined with one or more height-adjusting adjustment plates 17. In these configurations, the adjustment plate or plates 17 may preferably have an approximately equal shape as the rubber pad attachment plate 220, because the rubber pad attachment plate 220 and the adjustment plate or plates 17 can be readily stacked together.

When it is desired to reduce stresses to be applied to the high-stress parts of the top frame plate 2a-2 of the body frame 2, the rubber pad 215, rubber pad attachment plate 220 and flat plate 230 illustrated in FIG. 26 can be turned upside down and can then be attached to the body frame 2 although not illustrated in detail in any figure.

About preferred shapes (Modification Examples 3-1 to 3-4) of the flat plates 230, a description will next be made with reference to FIGS. 29 through 32. FIGS. 29 to 32 are plan views of flat plates according to Modification Examples 3-1 to 3-4 applicable in the third embodiment. The flat plates 230-1,2, flat plates 230-3,4, flat plates 230-5,6 and flat plates 230-7,8 illustrated in FIGS. 29 to 32 can be used in place of the flat plates 230 illustrated in FIG. 25.

Figure 29:
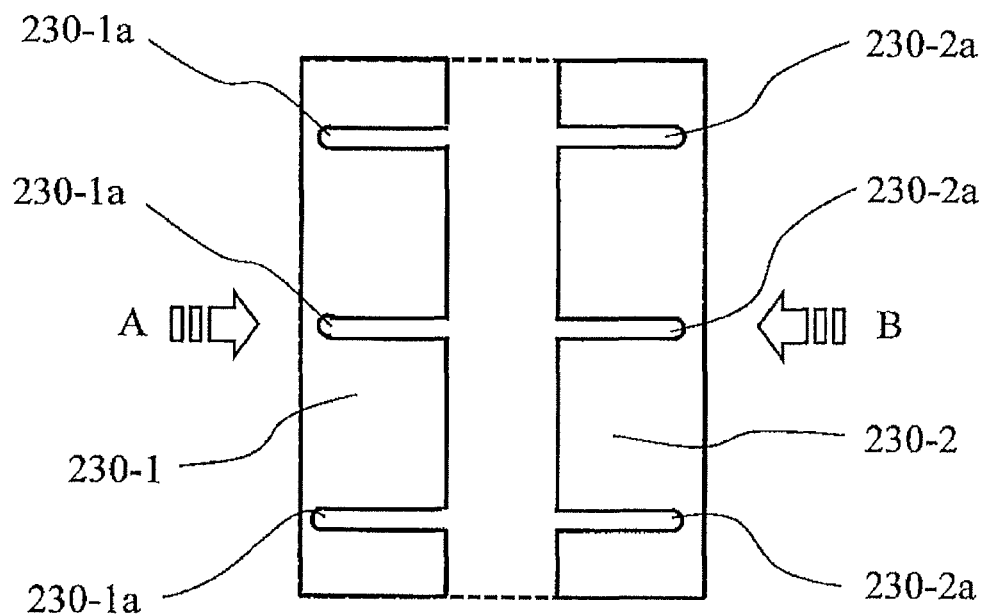
FIG. 29 is a plan view of flat plates according to Modification Example 3-1 applicable in the third embodiment.

As illustrated in FIG. 29, the flat plate 230-1 according to Modification Example 3-1 includes three slits 230-1a formed in a linear fashion along the direction of arrow A (first direction), which is the inserting direction, in a rectangular thin plate. These slits 230-1a are formed with a width slightly greater than the diameter of the bolts 18, and are configured to avoid interferences with the bolts 18 upon insertion of the flat plate 230-1. On the other hand, the flat plate 230-2 is also configured including three slits 230-2a like the flat plate 230-1.

When such flat plates 230-1,2 are used, the nuts 19 are loosened to provide a clearance between the rubber pad attachment plate 220 and the bottom rail plate 12c. In this state, the flat plates 230-1 can be inserted from the side of the side rail plate 12a in the direction of arrow A into the clearance, while the flat plates 230-2 can be inserted from the side of the side rail plate 12b in the direction of arrow B into the clearance. Accordingly, there is an advantage that the efficiency of attachment work of flat plates is improved compared with the case in which flat plates are attached by completely removing the bolts 18 and nuts 19.

Figure 30:
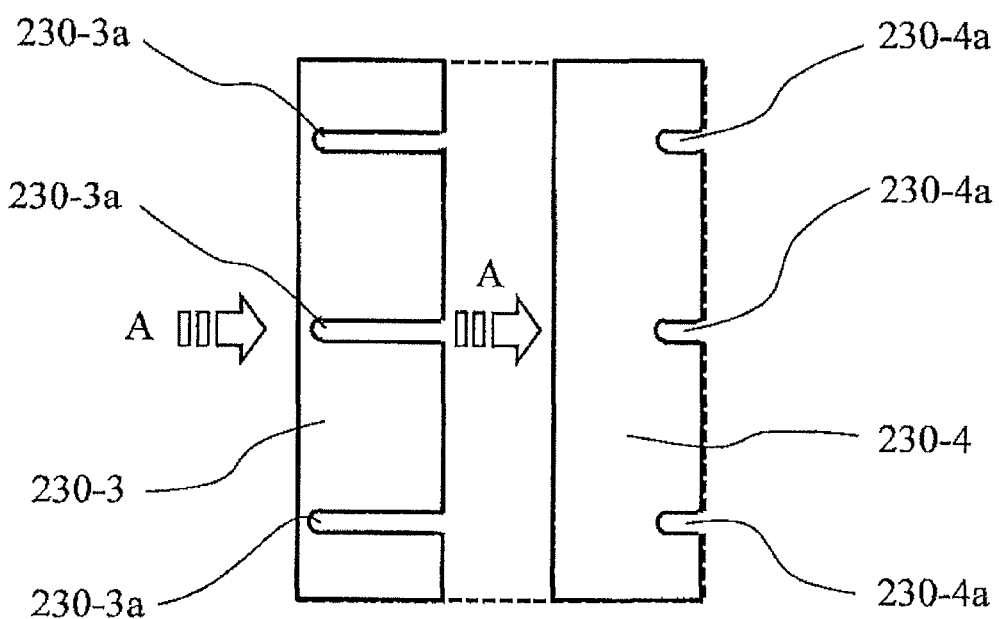
FIG. 30 is a plan view of flat plates according to Modification Example 3-2 applicable in the third embodiment.

As illustrated in FIG. 30, the flat plate 230-3 according to Modification Example 3-2 includes three slits 230-3a formed in a linear fashion along the direction of arrow A (first direction), which is the inserting direction, in a rectangular thin plate. These slits 230-3a are formed with a width slightly greater than the diameter of the bolts 18, and are configured to avoid interferences with the bolts 18 upon insertion of the flat plate 230-3. Further, the flat plate 230-4 is also configured including three slits 230-4a like the flat plate 230-3, but the slits are formed with a length shorter than the flat plate 230-3.

For the insertion of such flat plates 230-3, the nuts 19 are loosened to provide a clearance between the rubber pad attachment plate 220 and the bottom rail plate 12c. When the flat plates 230-3 are inserted from the side of the side rail plate 12a in the direction of arrow A into the clearance in this state, the flat plates 230-3 are set at a position substantially right below the side rail plate 12a. On the other hand, such flat plates 230-4 are set at a position substantially right below the side rail plate 12b by inserting them from the front or rear of the rail 12 into the clearance and then moving them in the direction of arrow A. As appreciated from the foregoing, it is unnecessary to completely remove the bolts 18 and nuts 19 upon attachment of the flat plates 230-3,4 underneath the bottom rail plate 12c. Accordingly, the efficiency of attachment work of flat plates is improved.

Figure 31:
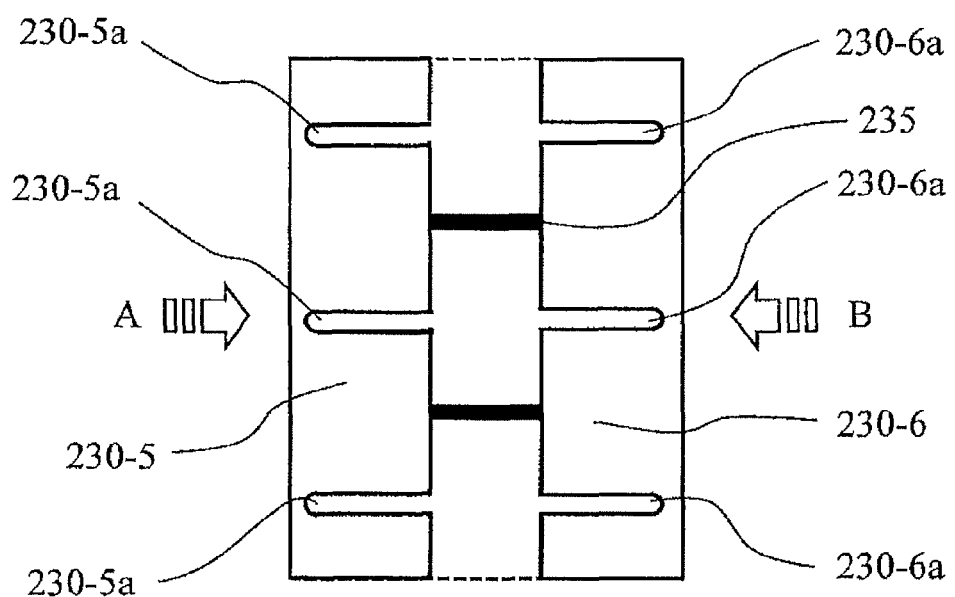
FIG. 31 is a plan view of flat plates according to Modification Example 3-3 applicable in the third embodiment.

As illustrated in FIG. 31, the flat plate 230-5 according to Modification Example 3-3 includes three slits 230-5a formed in a linear fashion along the direction of arrow A (first direction), which is the inserting direction, in a rectangular thin plate. These slits 230-5a are formed with a width slightly greater than the diameter of the bolts 18, and are configured to avoid interferences with the bolts 18 upon insertion of the flat plate 230-5. Further, the flat plate 230-6 is also configured including three slits 230-6a like the flat plate 230-5. Moreover, in Modification Example 3-3, the flat plate 230-5 and flat plate 230-6 are connected together via connecting members 235. These connecting members 235 are made of members such as, for example, rubber cords or springs, and are detachable from the flat plate 230-5 and flat plate 230-6.

When such flat plates 230-5,6 are used, the nuts 19 are loosened to provide a clearance between the rubber pad attachment plate 220 and the bottom rail plate 12c. In this state, the flat plates 230-5 are inserted from the side of the side rail plate 12a in the direction of arrow A into the clearance, and the flat plates 230-6 are inserted from the side of the side rail plate 12b in the direction of arrow B into the clearance. The flat plates 230-5 and flat plate 230-6 are then connected together using the connecting members 235. According to this configuration, there is an advantage that the efficiency of attachment work of flat plates is improved compared with the case in which flat plates are attached by completely removing the bolts 18 and nuts 19. In addition, the flat plates 230-5 and flat plate 230-6 are connected together by the connecting members 235. It is, therefore, possible to avoid fall-off of the flat plates 230-5,230-6, which would otherwise occur due to vibrations occurring during running of the dump truck 1.

Figure 32:
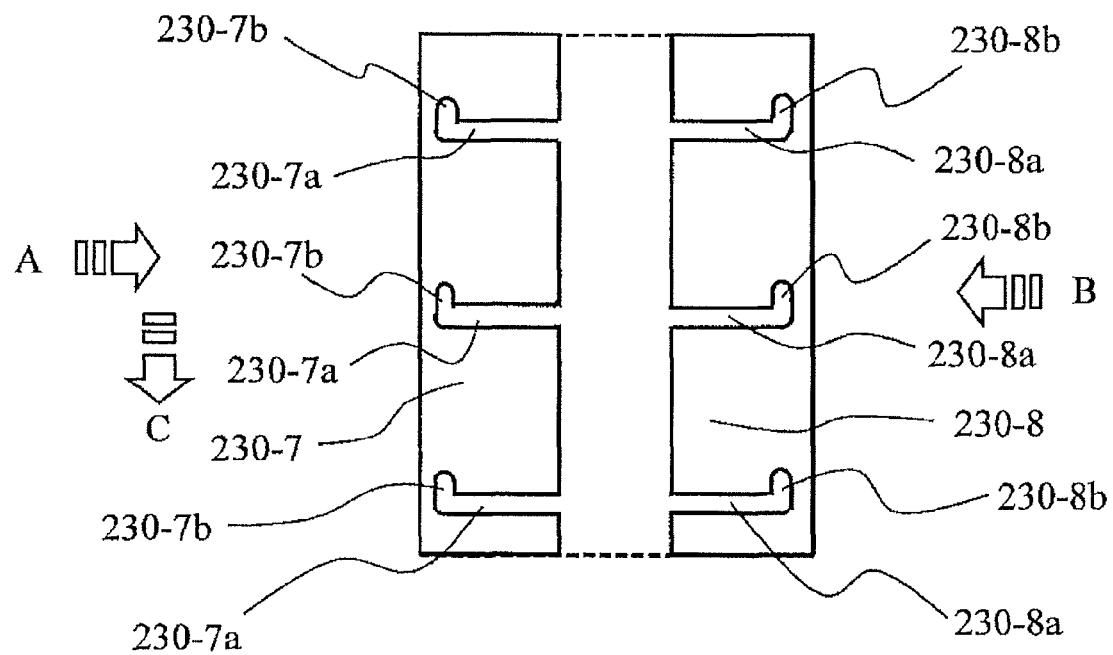
FIG. 32 is a plan view of flat plates according to Modification Example 3-4 applicable in the third embodiment.

As illustrated in FIG. 32, the flat plate 230-7 according to Modification Example 3-4 includes three slits 230-7a formed in a linear fashion along the direction of arrow A (first direction), which is the inserting direction, in a rectangular thin plate, and in addition, slots 230-7b provided from end portions of the respective slits 230-7a along the direction of arrow C (second direction) that intersects the direction of arrow A at right angles. These slots 230-7b are formed with a width slightly greater than the diameter of the bolts 18 so that the bolts 18 can enter the slots 230-7b without interferences. Obviously, the width of the slits 230-7a has a dimension slightly greater than the diameter of the bolts 18.

For the insertion of such flat plates 230-7, which have been formed as described above, between the rubber pad attachment plate 220 and the bottom rail plate 12c, the nuts 19 are first loosened to provide a clearance between the rubber pad attachment plate 220 and the bottom rail plate 12c. The flat plates 230-7 are then inserted in the direction of arrow A. When the flat plates 230-7 are progressively inserted in the direction of arrow A, the bolts 18 eventually come into contact with end portions of the slits 230-7a. When the flat plates 230-7 are then moved in the direction of arrow C, the bolts 18 are received in the slots 230-7b. Subsequently, the nuts 19 are tightened to complete the attachment of the flat plates 230-7. It is to be noted that the flat plates 230-8 are configured each including three slits 230-8a and three slots 230-8b like the flat plates 230-7 and are attached in a similar manner as the above-mentioned flat plates 230-7.

With this configuration, the bolts 18 are received in the slots 230-7b,230-8b so that the flat plates 230-7,230-8 can be prevented from moving in a direction (detachment direction) opposite to the direction of arrow A even if the nuts 19 come loose due to vibrations that occur during running of the dump truck 1. The flat plates 230-7,230-8 according to Modification Example 3-4 are, therefore, excellent in that they are expected to make the attachment work efficient like the flat plates 230-1,230-2 according to Modification Example 3-1, and in addition, they can also exhibit fall-off prevention effect.

Figure 33A:
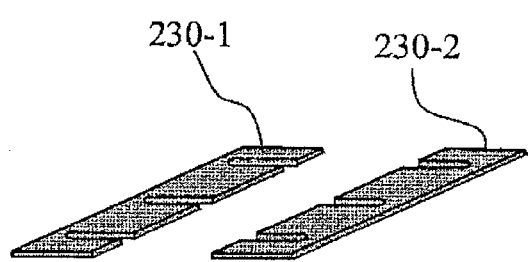
FIG. 33A through 33D are views illustrating use examples when the flat plates of the modification examples as applicable in the third embodiment are employed.
Figure 33B:
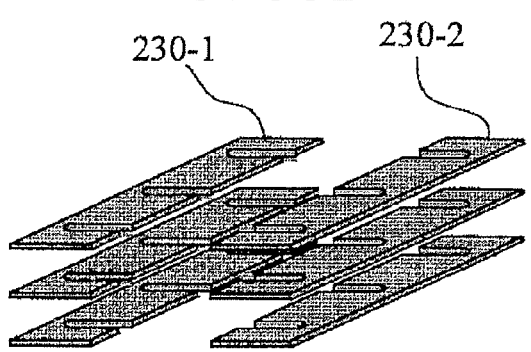
Figure 33C:
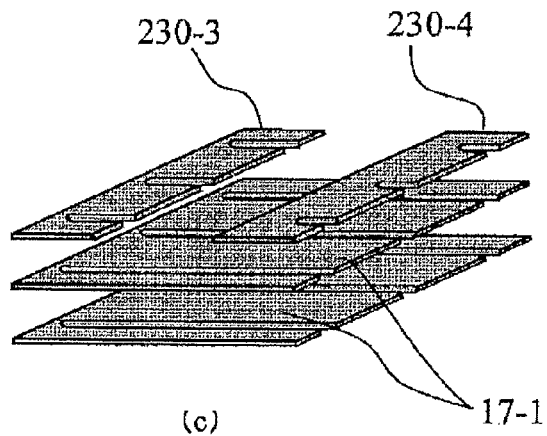
Figure 33D:
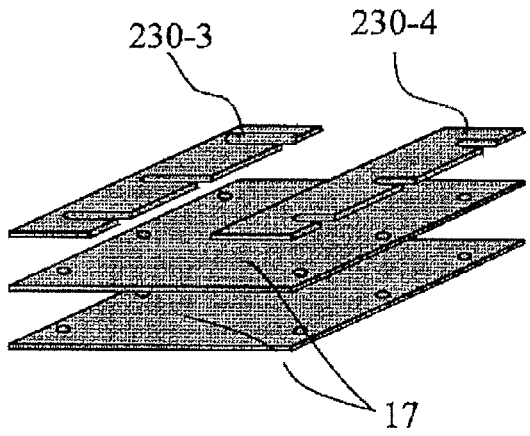

With reference to FIGS. 33A to 33D, a description will next be made about illustrative modes of use of these flat plates. FIG. 33A illustrates an example in which a combination of flat plates 230-1,230-2 is used. As illustrated in FIG. 3B, three combinations of flat plates 230-1 and flat plates 230-2 may be used in a stacked configuration. As illustrated in FIG. 33C, a combination of flat plates 230-3, 230-4 and two combinations of adjustment plates 17-1 (see FIG. 11) may also be used in combination. As illustrated in FIG. 33D, a combination of flat plates 230-3,230-4 and two adjustment plates 17 (see FIG. 28) may also be used in a stacked configuration. Further, such flat plates may also be used in combinations other than the illustrative modes of use illustrated in FIGS. 33A to 33D.

It is to be noted that the directions, widths and lengths of the slits and slots can obviously be designed as desired. Further, no limitation is imposed on the shape of each flat plate insofar as it can be inserted between the rubber pad attachment plate 220 and the bottom rail plate 12c.

Fourth Embodiment

With reference to drawings, a description will next be made about a dump truck according to a fourth embodiment. In the fourth embodiment, the elements corresponding to "the support structure" in the present invention are different from those in the first to third embodiments. Correspondingly, the shapes of rubber pads, rubber pad attachment plates and flat plates are different from those illustrated in the drawings of the first to third embodiments. Therefore, a description will hereinafter be made centering around these differences, and elements which are the same as the corresponding elements in the first to third embodiments are designated by the same reference signs and their description is omitted herein.

Figure 34:
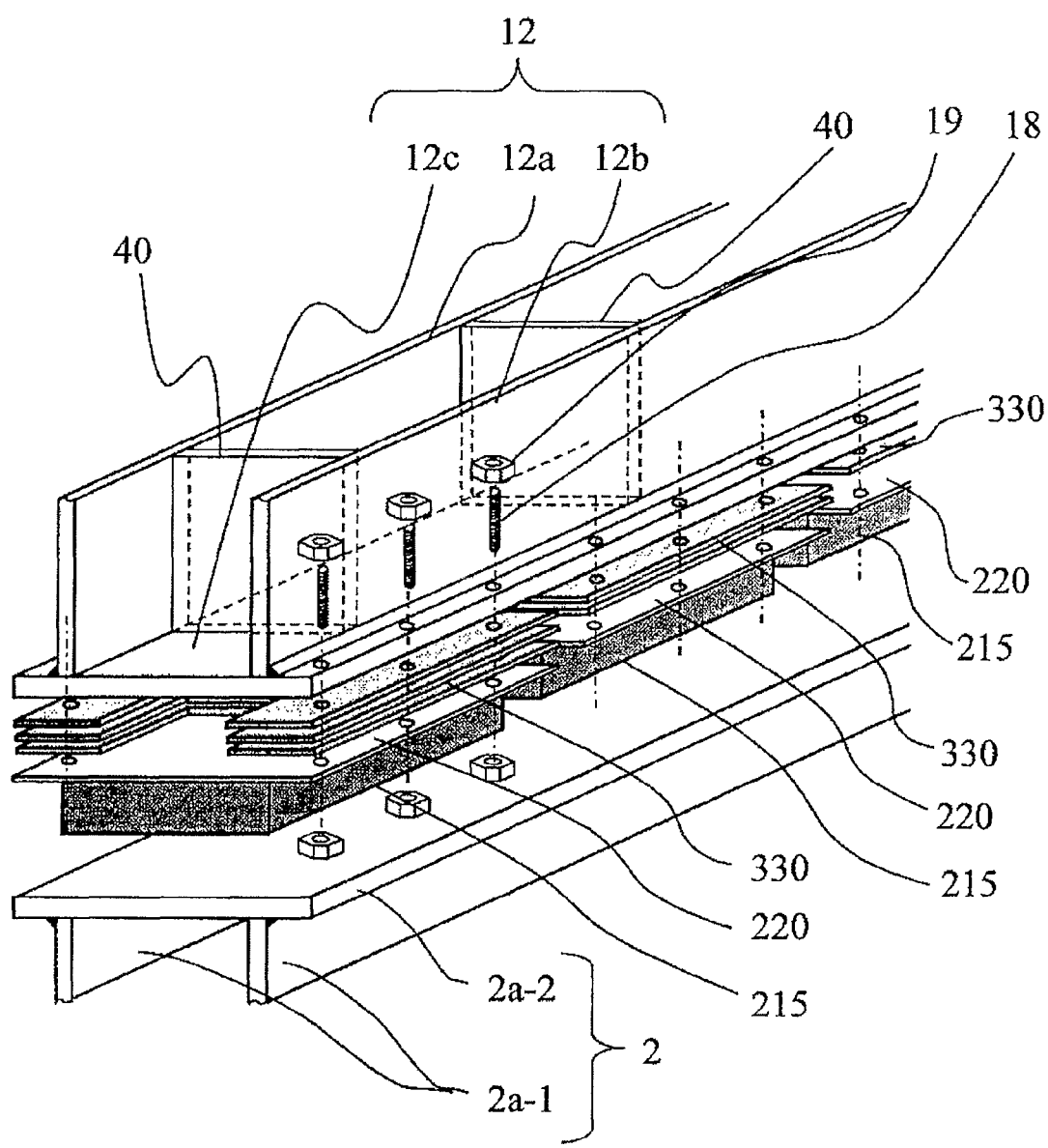
FIG. 34 is a perspective view illustrating parts of a rail, rubber pads, rubber pad attachment plates, flat plates and a body frame of a dump truck according to a fourth embodiment of the present invention.

FIG. 34 is a perspective view illustrating parts of a rail, rubber pads, rubber pad attachment plates, flat plates and a body frame according to a fourth embodiment of the present invention. In the fourth embodiment, ribs 40 are arranged at predetermined intervals in the longitudinal direction of the rail 12 such that the ribs 40 are in contact with three walls, that is, inner walls of both the side rail plates 12a, 12b and the upper wall of the bottom rail plate 12c. These ribs 40 are arranged to enhance the rigidity of the rail 12. In the fourth embodiment, the configuration that the rail 12 used in the first to third embodiments is provided with the ribs 40 is, therefore, adopted as "the support structure" in the present invention to enhance the rigidity. In the fourth embodiment, the ribs 40 also receive a reaction force from the body frame 2 accordingly. It is to be noted that the ribs 40 correspond to "the vertical plates" in the present invention because they are directed in the direction in which the reaction force is received from the body frame 2.

Figure 35:
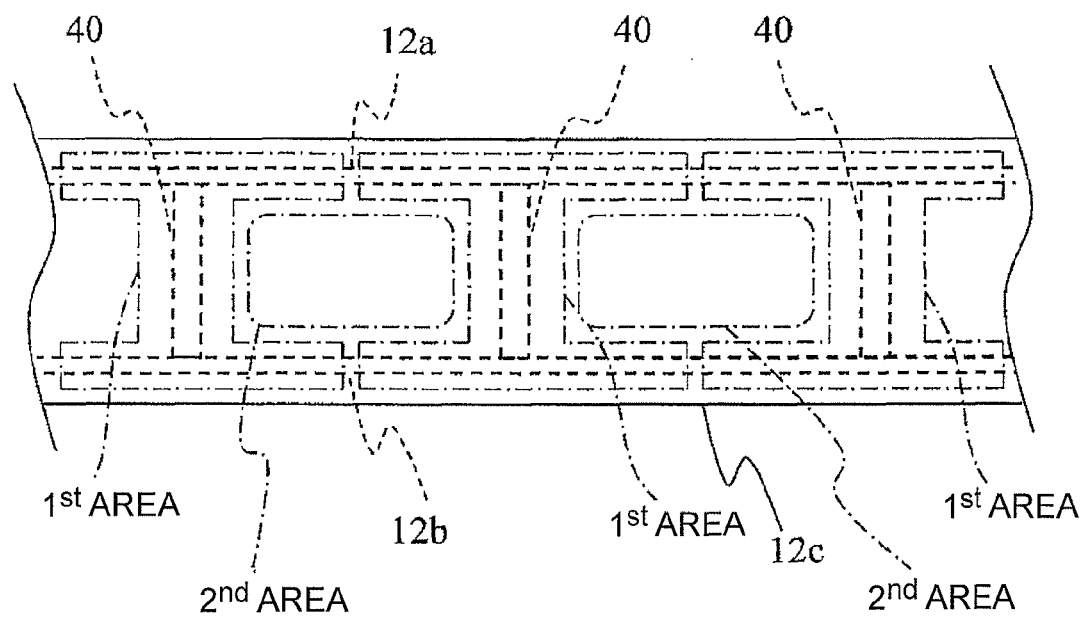
FIG. 35 is a bottom view of a bottom rail plate shown in FIG. 34 as viewed from below, and is a view illustrating, on a bottom surface of the bottom rail plate, the division of first areas and second areas in the fourth embodiment.

In the fourth embodiment, for the arrangement of the ribs 40 inside the rail 12, the division of the bottom rail plate 12c into first areas and second areas are different from the divisions in the first to third embodiments. FIG. 35 is a view of the bottom rail plate 12c as viewed from below, and the division into the first areas and second areas in the fourth embodiment is illustrated on the bottom surface of the bottom rail plate 12c. As illustrated in FIG. 35, formed on the bottom surface of the bottom rail plate 12c are the first areas, which are areas including parts in contact with the ribs 40, respectively, and parts in contact with the side rail plates 12a,12b, respectively, and the second areas, which are parts excluding the first areas. It is to be noted that each first area is an area divided out in an approximately H shape.

Figure 36A:
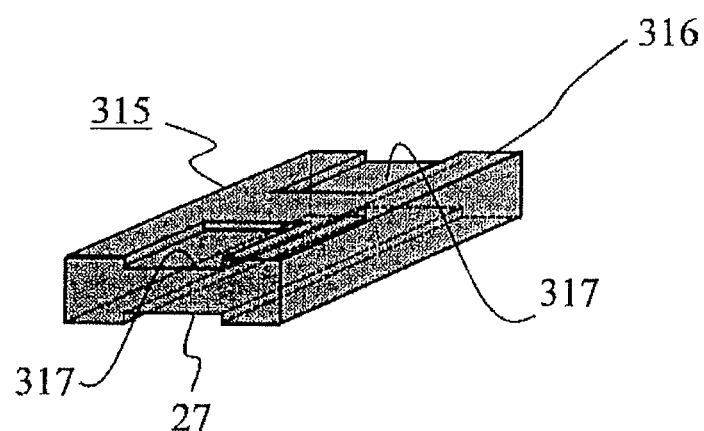
FIGS. 36A to 36C are views illustrating the respective configurations of the rubber pad, rubber pad attachment plate and flat plates applied to the fourth embodiment.
Figure 36B:
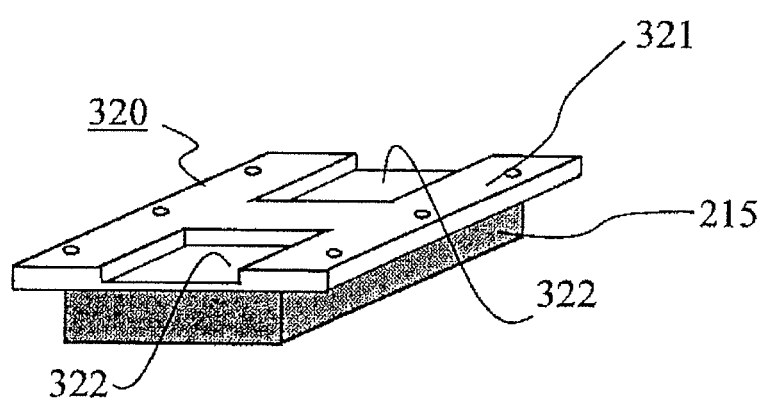
Figure 36C:
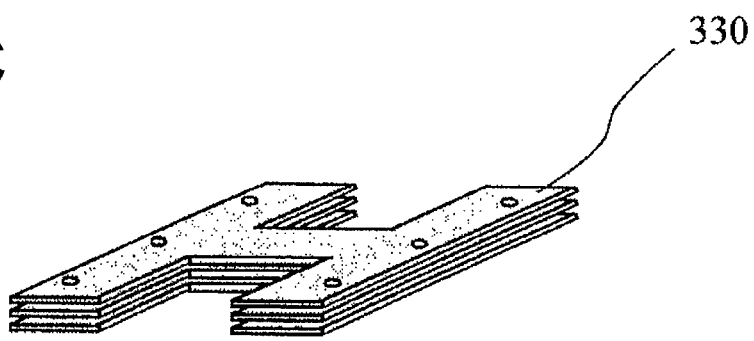

As each first area is in the approximately H shape in the fourth embodiment as described above, the rubber pad, rubber pad attachment plate and flat plate are formed to conform to the shape of the first area. Specifically, the rubber pad, rubber pad attachment plate and flat plate are formed as illustrated in FIGS. 36A to 36C. FIG. 36A illustrates the shape of the rubber pad 315 for use in the fourth embodiment. As illustrated in FIG. 36A, this rubber pad 315 includes an approximately H-shaped land 316 formed on the upper wall thereof, and the parts other than the land 316 are recesses 316. In the lower wall, on the other hand, a recess 27 is formed along the longitudinal direction.

When the rubber pad 315 is bonded to the bottom rail plate 12c such that the land 316 of the rubber pad 315 comes into registration with the first area of the bottom rail plate 12c, the bottom rail plate 12c receives a reaction force from the body frame 2 via the rubber pad 315, and the reaction force concentrates at the first area as described in the first embodiment. In other words, the reaction force is greater at the first area than at the second area. Therefore, the use of such rubber pads 315 can reduce bending deformations of the bottom rail plate 12c, and can decrease stresses at the high-stress parts of the rail 12.

As appreciated from the foregoing, the rubber pad 315 is in a preferred form when the structure of the rail 12 as described in the fourth embodiment is adopted in place of the structure of the rail 12 as described in the first embodiment.

FIG. 36B illustrates the shape of each rubber pad attachment plate 320 for use in the fourth embodiment. As illustrated in FIG. 36B, this rubber pad attachment plate 320 includes an approximately H-shaped land 321 formed on an upper wall thereof, and the parts other than the land 316 are recesses 322.

When the rubber pad attachment plate 320 is fixed on the bottom rail plate 12c by the bolts 18 and nuts 19 such that the land 321 of the rubber pad attachment plate 320 comes into registration with the first area of the bottom rail plate 12c, the bottom rail plate 12c receives a reaction force from the body frame 2 via the land 321 of the rubber pad attachment plate 320, and the reaction force concentrates at the first areas as described in the second embodiment. In other words, the reaction force is greater at the first area than at the second area. Therefore, the use of such rubber pad attachment plates 320 can reduce bending deformations of the bottom rail plate 12c, and can decrease stresses at the high-stress parts of the rail 12.

As appreciated from the foregoing, the rubber pad attachment plate 320 is in a preferred form when the structure of the rail 12 as described in the fourth embodiment is adopted in place of the structure of the rail 12 as described in the second embodiment.

FIG. 36C illustrates the shape of flat plates 330 for use in the fourth embodiment. As illustrated in FIG. 34, these flat plates 330 are inserted between the rubber pad attachment plate 220 and the bottom rail plate 12c. As illustrated in FIG. 36C, the flat plates 330 are approximately H-shaped. When the flat plates 330 are inserted to a predetermined position between the bottom rail plate 12c and the rubber pad attachment plate 220, the top flat plates 330 come into contact with the first areas of the bottom rail plate 12c. As described in the third embodiment, the bottom rail plate 12c receives a reaction force from the body frame 2 via the flat plates 330, and the reaction force concentrates at the first areas accordingly. In other words, the reaction force is greater at the first areas than at the second areas. Therefore, the use of the flat plates 330 can reduce bending deformations of the bottom rail plate 12c, and can decrease stresses at the high-stress parts of the rail 12.

As appreciated from the foregoing, the flat plates 330 are in a preferred form when the structure of the rail 12 as described in the fourth embodiment is adopted in place of the structure of the rail 12 as described in the third embodiment.

About preferred shapes (Modification Examples 4-1 to 4-4) of the flat plates 330, a description will next be made with reference to FIGS. 37 through 40. FIGS. 37 to 40 are plan views of flat plates according to Modification Examples 4-1 to 4-4 applicable in the fourth embodiment. The flat plates 330-1,2, flat plates 330-3,4, flat plates 330-5,6 and flat plate 330-7 illustrated in FIGS. 37 to 40 can be used in place of the flat plates 330 illustrated in FIG. 34.

Figure 37:
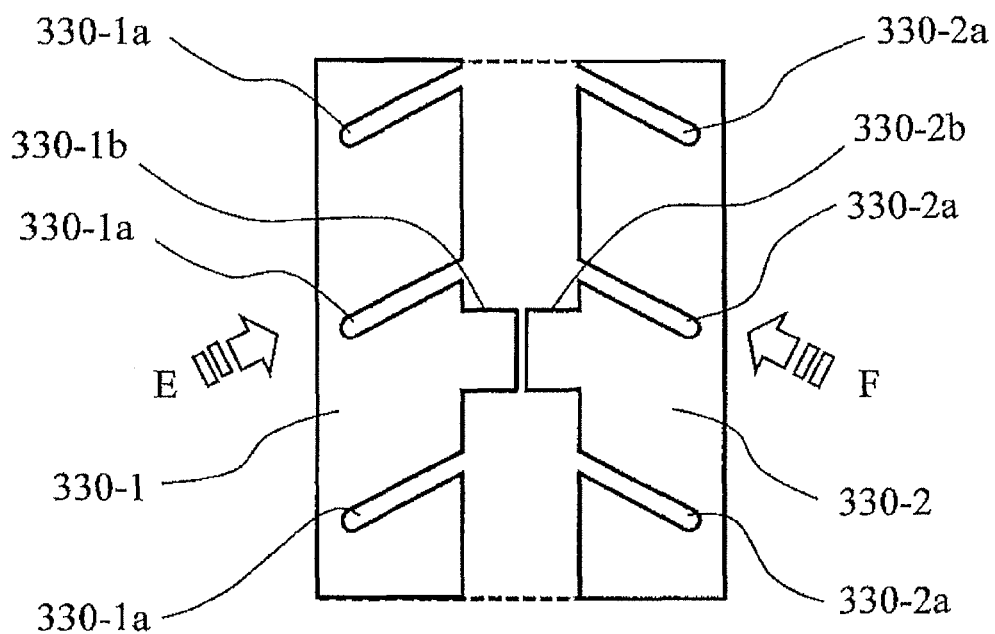
FIG. 37 is a plan view of a flat plate according to Modification Example 4-1 applicable in the fourth embodiment.

As illustrated in FIG. 37, the flat plate 330-1 according to Modification Example 4-1 includes three slits 330-1a obliquely extending along the direction of arrow E (first direction), which is the inserting direction, in a rectangular thin plate. These slits 330-1a are formed with a width slightly greater than the diameter of the bolts 18, and are configured to avoid interferences with the bolts 18 upon insertion of the flat plate 330-1. The flat plate 330-1 also includes a rectangular tab 330-1b at a central part thereof. On the other hand, the flat plate 330-2 is also configured including three slits 330-2a and a rectangular tab 330-2b like the flat plate 330-1. When the flat plate 330-1 and flat plate 330-2 are placed side by side such that their rectangular tabs 330-1b,330-2b face each other, an approximately H shape is formed with the two flat plates 330-1,2. In other words, it is the flat plate 330-1 and flat plate 330-2 that have been obtained by vertically cutting the flat plate 330, which is illustrated in FIG. 36C, into two halves and providing the two halves with slits.

When these flat plates 330-1,2 are used, the nuts 19 are loosened to provide a clearance between the rubber pad attachment plate 220 and the bottom rail plate 12c. In this state, the flat plates 330-1 can be inserted from the side of the side rail plate 12a in the direction of arrow E into the clearance, and the flat plates 330-2 can be inserted from the side of the side rail plate 12b in the direction of arrow F into the clearance. Accordingly, there is an advantage that the efficiency of attachment work of flat plates is improved compared with the case in which flat plates are attached by completely removing the bolts 18 and nuts 19.

Figure 38:
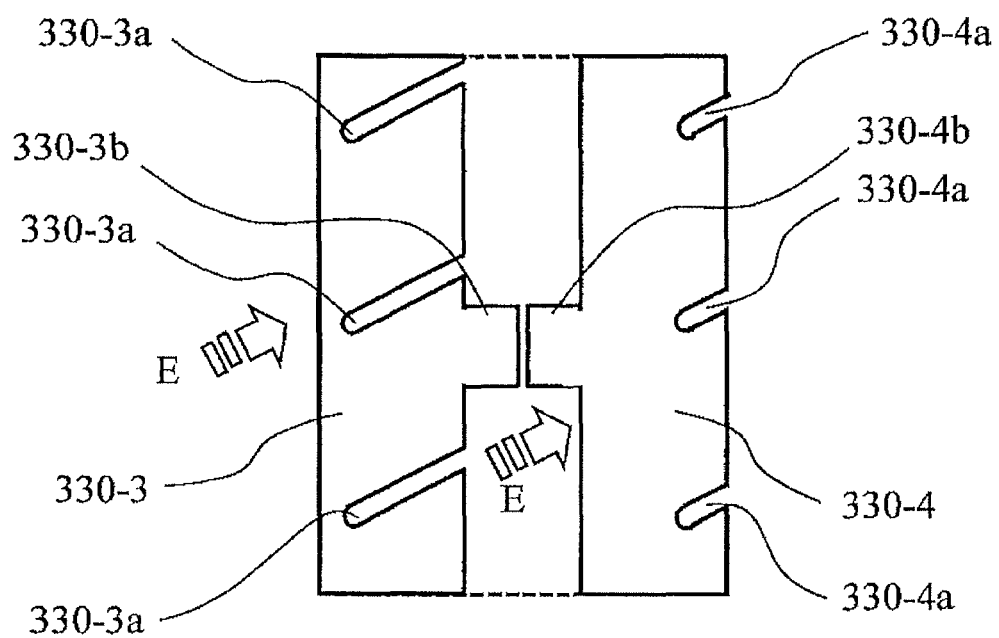
FIG. 38 is a plan view of a flat plate according to Modification Example 4-2 applicable in the fourth embodiment.

As illustrated in FIG. 38, the flat plate 330-3 according to Modification Example 4-2 includes three slits 330-3a obliquely extending along the direction of arrow E (first direction), which is the inserting direction, in a rectangular thin plate. These slits 330-3a are formed with a width slightly greater than the diameter of the bolts 18, and are configured to avoid interferences with the bolts 18 upon insertion of the flat plate 330-3. The flat plate 330-3 also includes a rectangular tab 330-3b formed at a central part thereof. On the other hand, the flat plate 330-4 is also configured including three slits 330-4a and a rectangular tab 330-4b like the flat plate 330-3, but the slits 330-4a are formed shorter in length than the slits 330-3a. When the flat plate 330-3 and flat plate 330-4 are placed side by side such that their rectangular tabs 330-3b, 330-4b face each other, an approximately H shape is formed with the two flat plates 330-3,4.

For the insertion of such flat plates 330-3, the nuts 19 are loosened to provide a clearance between the rubber pad attachment plate 220 and the bottom rail plate 12c. When the flat plates 330-3 are inserted from the side of the side rail plate 12a in the direction of arrow E into the clearance in this state, the flat plates 330-3 are set at a position substantially right below the side rail plate 12a. On the other hand, the flat plates 330-4 are set at a position substantially right below the side rail plate 12b by inserting them from the front or rear of the rail 12 into the clearance and then moving them in the direction of arrow E. As appreciated from the foregoing, it is unnecessary to completely remove the bolts 18 and nuts 19 upon attachment of the flat plates 330-3,4 underneath the bottom rail plate 12c. Accordingly, the efficiency of attachment work of flat plates is improved.

Figure 39:
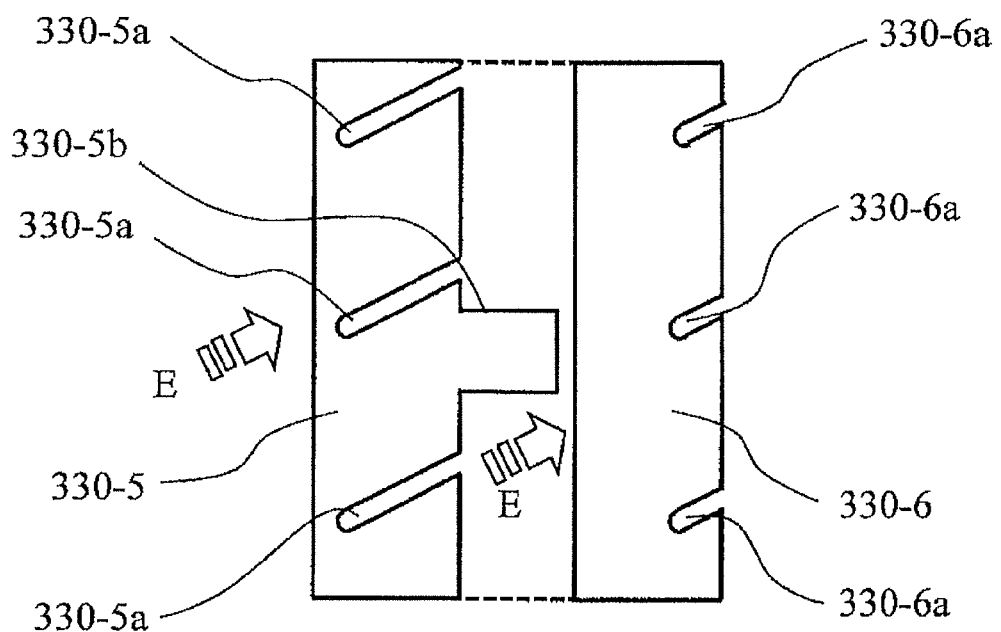
FIG. 39 is a plan view of a flat plate according to Modification Example 4-3 applicable in the fourth embodiment.

As illustrated in FIG. 39, the flat plate 330-5 according to Modification Example 4-3 includes three slits 330-5a obliquely extending along the direction of arrow E (first direction), which is the inserting direction, in a rectangular thin plate. These slits 330-5a are formed with a width slightly greater than the diameter of the bolts 18, and are configured to avoid interferences with the bolts 18 upon insertion of the flat plate 330-5. The flat plate 330-5 also includes a rectangular tab 330-5b formed at a central part thereof. On the other hand, the flat plate 330-6 is also configured including three slits 330-6a like the flat plate 330-5, but the slits 330-6a are formed shorter in length than the slits 330-5a. It is to be noted that no rectangular tab is formed on the flat plate 330-6. When the flat plate 330-5 and flat plate 330-6 are placed side by side such that the rectangular tab 330-5b of the flat plate 330-5 faces the flat plate 330-6, an approximately H shape is formed with the two flat plates 330-5,6.

For the insertion of such flat plates 330-5, the nuts 19 are loosened to provide a clearance between the rubber pad attachment plate 220 and the bottom rail plate 12c. When the flat plates 330-5 are inserted from the side of the side rail plate 12a in the direction of arrow E into the clearance in this state, the flat plates 330-5 are set at a position substantially right below the side rail plate 12a. On the other hand, the flat plates 330-6 are set at a position substantially right below the side rail plate 12b by inserting them from the front or rear of the rail 12 into the clearance and then moving them in the direction of arrow E. As appreciated from the foregoing, it is unnecessary to completely remove the bolts 18 and nuts 19 upon attachment of the flat plates 330-5,6 underneath the bottom rail plate 12c. Accordingly, the efficiency of attachment work of flat plates is improved.

Figure 40:
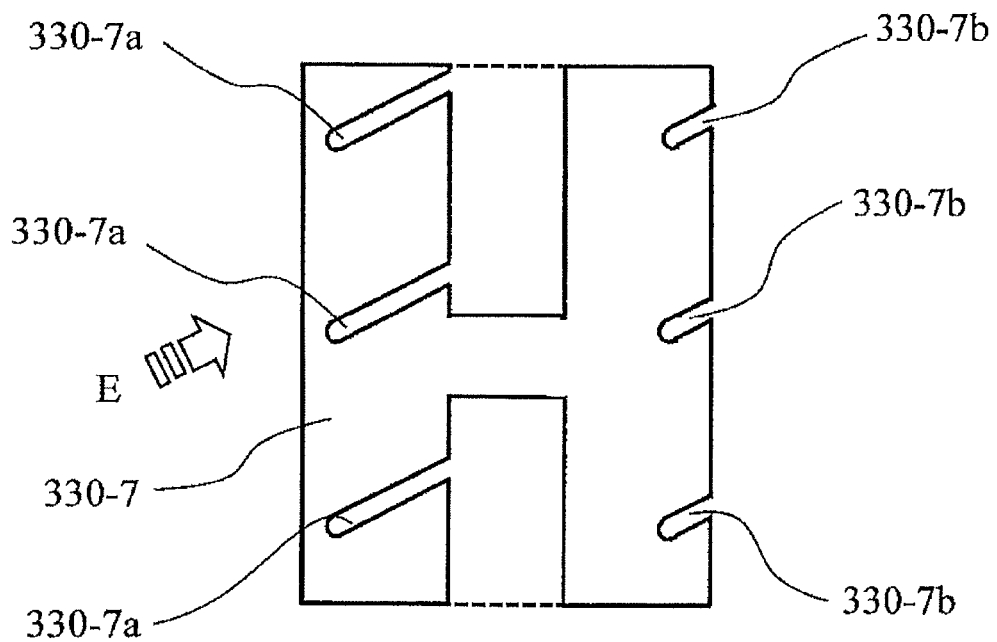
FIG. 40 is a plan view of a flat plate according to Modification Example 4-4 applicable in the fourth embodiment.

As illustrated in FIG. 40, the flat plate 330-7 according to Modification Example 4-4 includes three slits 330-7a and three slits 330-7b obliquely extending along the direction of arrow E (first direction), which is the inserting direction, in a substantially H-shaped thin plate. These slits 330-7a,7b are formed with a width slightly greater than the diameter of the bolts 18, and are configured to avoid interferences with the bolts 18 upon insertion of the flat plate 330-7. It is to be noted that the slits 330-7b are shorter in length than the slits 330-7a.

For the insertion of such flat plates 330-7, the nuts 19, for example, on the side of the side rail plate 12b are loosened to provide a clearance between the rubber pad attachment plate 220 and the bottom rail plate 12c, and the bolts 18 on the side of the side rail plate 12a are removed. In this state, the flat plates 330-7 are inserted into the clearance in the direction of arrow E from the side of the side rail plate 12a. The removed bolts 18 are attached again to set the flat plates 330-7 at a predetermined position. As the bolts to be removed are limited only to some of the bolts 18 even with the use of the flat plates 330-7 as described above, the efficiency of attachment work of flat plates is improved.

It is to be noted that the directions, widths and lengths of the above-described slits can obviously be designed as desired. Further, the slits may be provided with slots such as those described above. Furthermore, no limitation is imposed on the shape of each flat plate insofar as it can be inserted between the rubber pad attachment plate 220 and the bottom rail plate 12c.

Fifth Embodiment

With reference to drawings, a description will next be made about a dump truck according to a fifth embodiment. In the fifth embodiment, the elements corresponding to "the support structure" in the present invention are different from those in the first to fourth embodiments. Correspondingly, the shapes of rubber pads, rubber pad attachment plates and flat plates are different from those illustrated in the drawings of the first to fourth embodiments. Therefore, a description will hereinafter be made centering around these differences, and elements which are the same as the corresponding elements in the first to fourth embodiments are designated by the same reference signs and their description is omitted herein.

Figure 41:
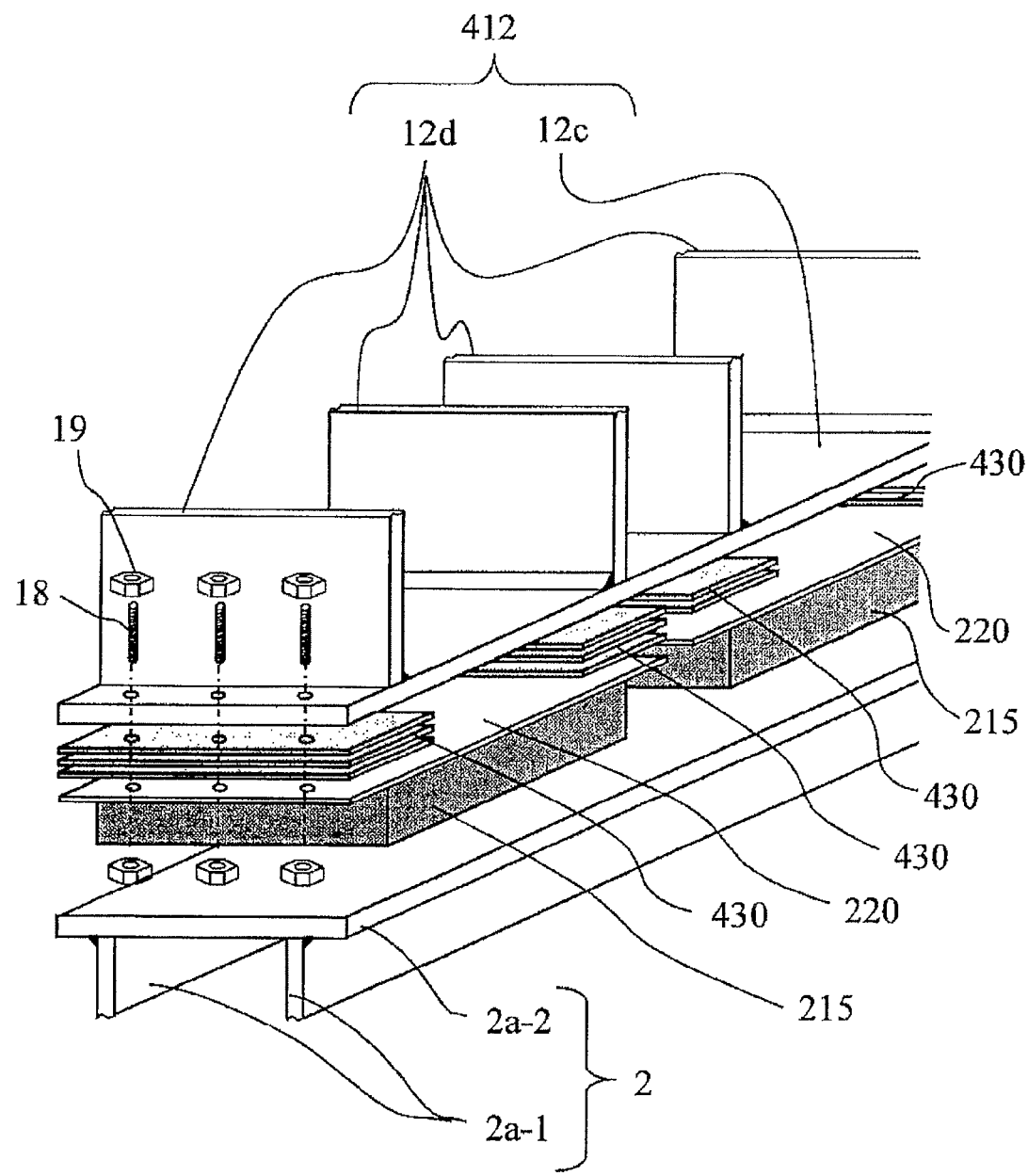
FIG. 41 is a perspective view illustrating parts of a rail, rubber pads, rubber pad attachment plates, flat plates and a body frame of a dump truck according to a fifth embodiment of the present invention.

FIG. 41 is a perspective view of a state that rubber pads, rubber pad attachment plates and flat plates are attached between a rail 412 and a body frame 2 according to the fifth embodiment. In the configurations of the fifth embodiment, a plurality of vertical rail plates 12d are arranged in place of both the side plates 12a, 12b. Described specifically, as illustrated in FIG. 41, the vertical rail plates 12d are welded at predetermined intervals in the front-and-rear direction to the floor board 11a of the body 5 such that their longitudinal directions coincide the lateral direction of the dump truck. In other words, the vertical rail plates 12d are secured to the floor board 11a of the body 5 in directions that the directions, which intersect their front and back surfaces at right angles, are parallel to the front-and-rear direction of the dump truck.

It is to be noted that, because the direction in which a reaction force is received from the body frame 2 is also primarily the up-and-down direction in the fifth embodiment, the vertical rail plates 12d can be considered to be arranged along the direction in which the reaction force is received from the body frame 2. In other words, the vertical rail plates 12 can be considered to correspond to "the vertical plates" in the present invention.

Figure 42:
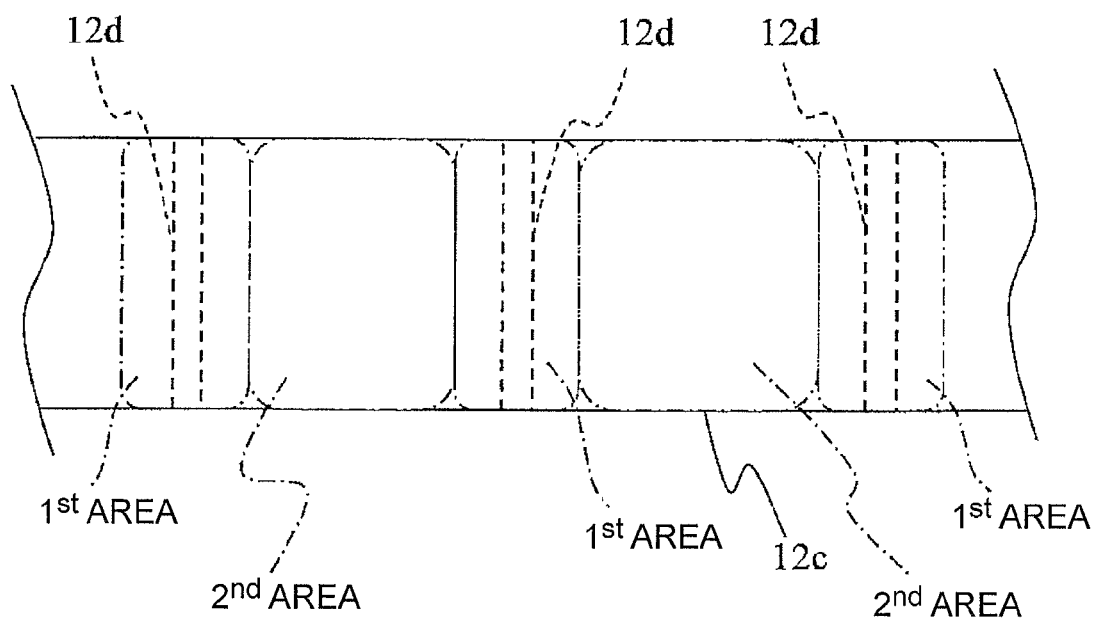
FIG. 42 is a bottom view of a bottom rail plate shown in FIG. 41 as viewed from below, and is a view illustrating, on a bottom surface of the bottom rail plate, the division of first areas and second areas in the fifth embodiment.

As described above, in the fifth embodiment, the rail 412 configured of the vertical rail plates 12d and bottom rail plate 12c is adopted as "the support structure" in the present invention. As the rail 412 is configured of the vertical rail plates 12d and bottom rail plate 12c in the fifth embodiment, the division of the bottom rail plate 12c into first areas and second areas is different from the divisions in the first to fourth embodiments. FIG. 42 is a view of the bottom rail plate 12c as viewed from below, and illustrates the division into the first areas and second areas in the fifth embodiment on a bottom surface of the bottom rail plate 12c. As illustrated in FIG. 42, formed on the bottom surface of the bottom rail plate 12c are the first areas, which are areas including parts maintained in contact with the vertical rail plates 12d, respectively, and the second areas which are parts excluding the first areas.

Figure 43A:
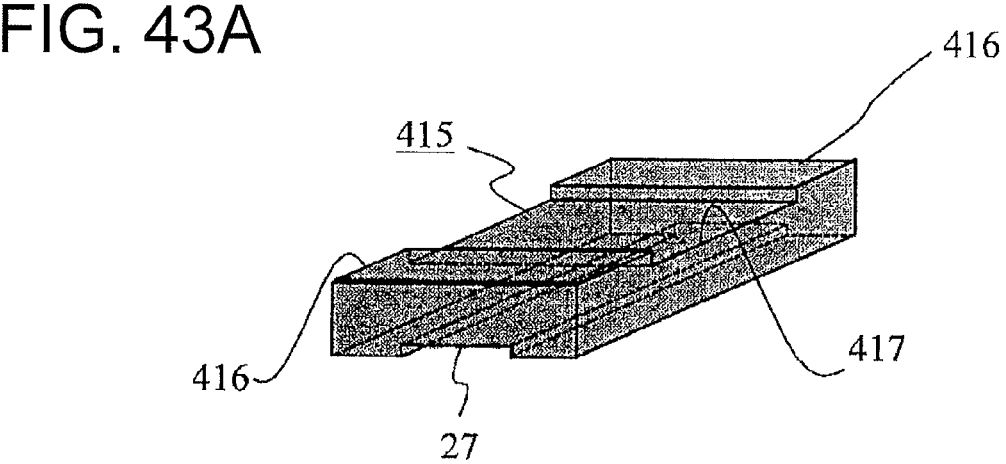
FIGS. 43A to 43C are views illustrating the respective configurations of the rubber pad, rubber pad attachment plate and flat plates applied to the fifth embodiment.
Figure 43B:
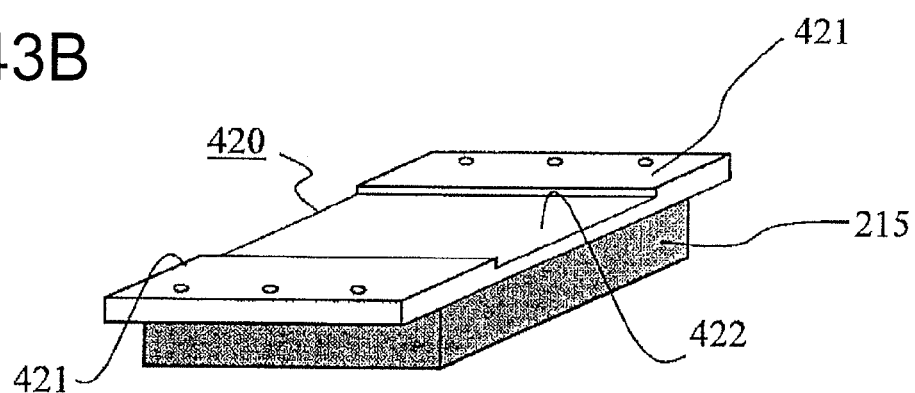
Figure 43C:
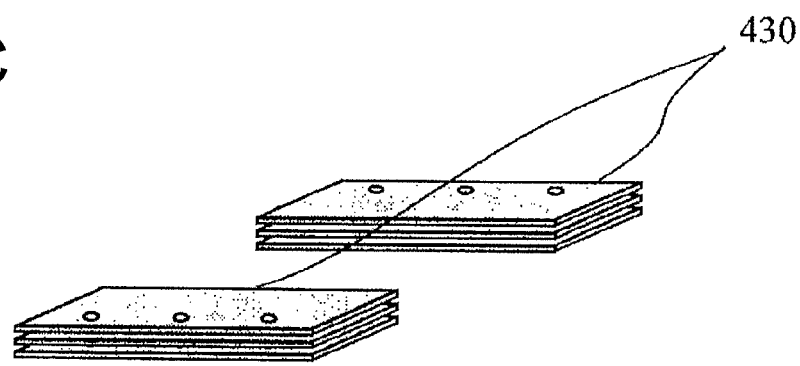

FIGS. 43A to 43C illustrate the shapes of a rubber pad, a rubber pad attachment plate and flat plates, which are suitable in the fifth embodiment. FIG. 43A illustrates the shape of each rubber pad 415 for use in the fifth embodiment. As illustrated in FIG. 43A, this rubber pad 415 includes a recess 417 formed along a width direction in an upper wall thereof, and lands 416 formed at opposite ends of the recess 417. In a lower wall, on the other hand, a recess 27 is formed along a longitudinal direction.

When such rubber pads 415 are bonded to the bottom rail plate 12c such that the lands 416 of the rubber pads 415 come into registration with the corresponding first areas of the bottom rail plate 12c, the bottom rail plate 12c receives a reaction force from the body frame 2 via the rubber pads 415, and the reaction force concentrates at the first areas as described in the first embodiment. In other words, the reaction force is greater at the first areas than at the second areas. Therefore, the use of the rubber pads 415 can reduce bending deformations of the bottom rail plate 12c, and can decrease stresses at the high-stress parts of the rail 412.

As appreciated from the foregoing, the rubber pad 415 is in a preferred form when the structure of the rail 412 as described in the fifth embodiment is adopted in place of the structure of the rail 12 as described in the first embodiment.

FIG. 43B illustrates the shape of each rubber pad attachment plate 420 for use in the fifth embodiment. As illustrated in FIG. 43B, this rubber pad attachment plate 420 includes a recess 422 formed along a width direction in an upper wall thereof, and lands 421 formed at opposite ends of the recess 422.

When such rubber pad attachment plates 420 are fixed on the bottom rail plate 12c by the bolts 18 and nuts 19 such that the lands 421 of the rubber pad attachment plates 420 come into registration with the corresponding first areas of the bottom rail plate 12c, the bottom rail plate 12c receives a reaction force from the body frame 2 via the lands 421 of the rubber pad attachment plates 420, and the reaction force concentrates at the first areas as described in the second embodiment. In other words, the reaction force is greater at the first areas than at the second areas. Therefore, the use of the rubber pad attachment plates 420 can reduce bending deformations of the bottom rail plate 12c, and can decrease stresses at the high-stress parts of the rail 412.

As appreciated from the foregoing, the rubber pad attachment plate 420 is in a preferred form when the structure of the rail 412 as described in the fifth embodiment is adopted in place of the structure of the rail 12 as described in the second embodiment.

FIG. 43C illustrates the shape of flat plates 430 for use in the fifth embodiment. As illustrated in FIG. 41, these flat plates 430 are inserted between the rubber pad attachment plate 220 and the bottom rail plate 12c. As illustrated in FIG. 43C, the flat plates 430 are in the form of rectangular strips.

When the flat plates 430 are inserted to predetermined positions between the bottom rail plate 12c and the rubber pad attachment plate 220, the top flat plates 430 come into contact with the first areas of the bottom rail plate 12c. As described in the third embodiment, the bottom rail plate 12c receives a reaction force from the body frame 2 via the flat plates 430, and the reaction force concentrates at the first areas accordingly. In other words, the reaction force is greater at the first areas than at the second areas. Therefore, the use of the flat plates 430 can reduce bending deformations of the bottom rail plate 12c, and can decrease stresses at the high-stress parts of the rail 412.

As appreciated from the foregoing, the flat plates 430 are in a preferred form when the structure of the rail 412 as described in the fifth embodiment is adopted in place of the structure of the rail 12 as described in the third embodiment.

Figure 44:
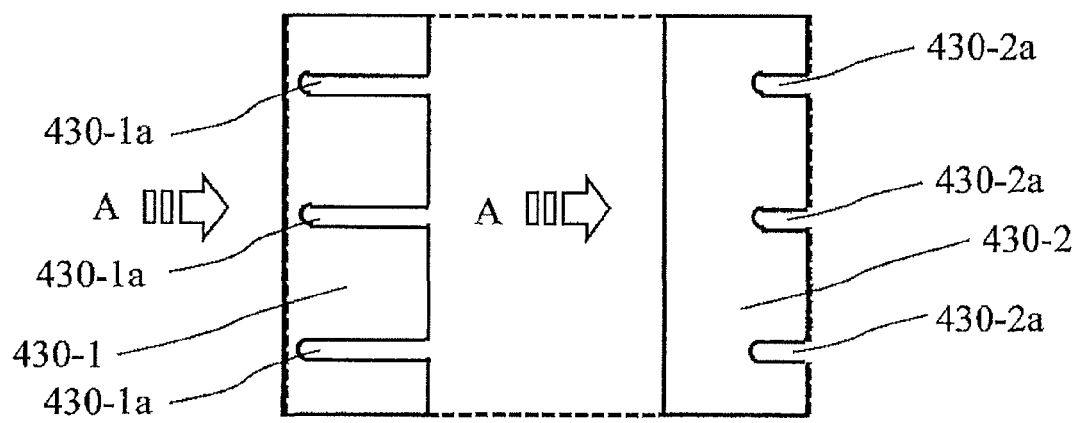
FIG. 44 is a plan view of a flat plate according to Modification Example 5-1 applicable in the fifth embodiment.
Figure 45:
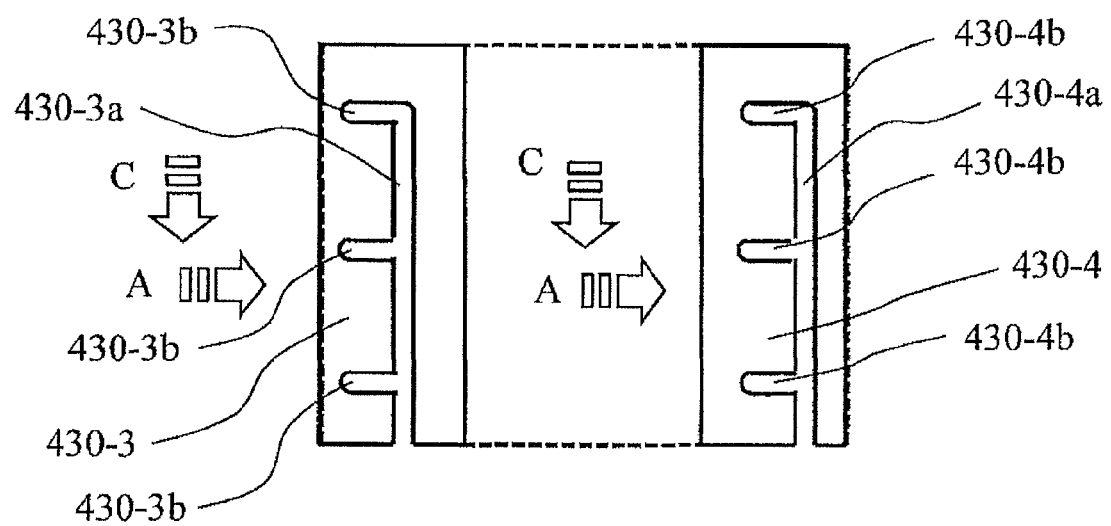
FIG. 45 is a plan view of a flat plate according to Modification Example 5-2 applicable in the fifth embodiment.

About preferred shapes (Modification Examples 5-1 to 5-2) of the flat plates 430, a description will next be made with reference to FIGS. 44 to 45. FIGS. 44 to 45 are plan views of flat plates according to Modification Examples 5-1 to 5-2 applicable in the fifth embodiment. The flat plates 430-1,2 and flat plates 430-3,4 illustrated in FIGS. 44 and 45 can be used in place of the flat plates 430 illustrated in FIG. 41.

As illustrated in FIG. 44, the flat plate 430-1 according to Modification Example 5-1 includes three slits 430-1a formed in a linear fashion along the direction of arrow A (first direction), which is the inserting direction, in a rectangular thin plate. These slits 430-1a are formed with a width slightly greater than the diameter of the bolts 18, and are configured to avoid interferences with the bolts 18 upon insertion of the flat plate 430-1. On the other hand, the flat plate 430-2 is also configured including three slits 430-2a like the flat plate 430-1, but the slits 430-2a are formed shorter than the slits 430-3a.

For the insertion of such flat plates 430-1, the nuts 19 are loosened to provide a clearance between the rubber pad attachment plate 220 and the bottom rail plate 12c. When the flat plates 430-3 are inserted from the front of the rail 12 in the direction of arrow A into the clearance in this state, the flat plates 430-1 are set at a position substantially right below the vertical rail plate 12d. On the other hand, such flat plates 430-2 are set at a position substantially right below the adjacent vertical rail plate 12d by inserting them from the side of the rail 412 into the clearance and then moving them in the direction of arrow A. As appreciated from the foregoing, it is unnecessary to completely remove the bolts 18 and nuts 19 upon attachment of the flat plates 430-1,2 underneath the bottom rail plate 12c. Accordingly, the efficiency of attachment work of flat plates is improved.

As illustrated in FIG. 45, the flat plate 430-3 according to Modification Example 5-2 includes three slits 430-3a formed in a linear fashion along the direction of arrow C (first direction), which is the inserting direction, in a rectangular thin plate, and in addition, slots 430-3b are provided from end portions of the slit 430-3a along the direction of arrow A (second direction) that intersects the direction of arrow C at right angles. These slots 430-3b are formed with a width slightly greater than the diameter of the bolts 18 so that the bolts 18 can enter them without interferences. Obviously, the width of the slit 430-3a has a dimension slightly greater than the diameter of the bolts 18. Similar to the flat plate 430-3, the flat plate 430-4 is also configured including one slit 430-4a and three slots 430-4b.

For the insertion of such flat plates 430-3, which have been formed as described above, between the rubber pad attachment plate 220 and the bottom rail plate 12c, the nuts 19 are first loosened to provide a clearance between the rubber pad attachment plate 220 and the bottom rail plate 12c. The flat plates 430-3 are then inserted in the direction of arrow C. When the flat plates 430-3 are progressively inserted in the direction of arrow C, the bolt 18 eventually comes into contact with end portions of the slits 430-3a. When the flat plates 430-3 are then moved in the direction of arrow A, the bolts 18 are received in the slots 430-3b. Subsequently, the nuts 19 are tightened to complete the attachment of the flat plates 430-3. It is to be noted that the flat plates 430-4 can also be attached in a similar manner as the flat plates 430-3.

With this configuration, the bolts 18 are received in the slots 430-3b,430-4b so that the flat plates 430-3,430-4 can be prevented from moving in a direction (detachment direction) opposite to the direction of arrow C even if the nuts 19 come loose due to vibrations that occur during running of the dump truck 1. The flat plates 430-3,430-4 according to Modification Example 5-2 are, therefore, excellent in that they are expected to make the attachment work efficient like the flat plates 430-1,430-2 according to Modification Example 5-1, and in addition, they can also exhibit fall-off prevention effect.

It is to be noted that the directions, widths and lengths of the slits and slots can obviously be designed as desired. Further, no limitation is imposed on the shape of each flat plate insofar as it can be inserted between the rubber pad attachment plate 220 and the bottom rail plate 12c.

Sixth Embodiment

With reference to drawings, a description will next be made about a dump truck according to a sixth embodiment. In the sixth embodiment, the elements corresponding to "the support structure" in the present invention are different from those in the first to fifth embodiments. Correspondingly, the shapes of rubber pads, rubber pad attachment plates and flat plates are different from those illustrated in the drawings of the first to fifth embodiments. Therefore, a description will hereinafter be made centering around these differences, and elements which are the same as the corresponding elements in the first to fifth embodiments are designated by the same reference signs and their description is omitted herein.

Figure 46:
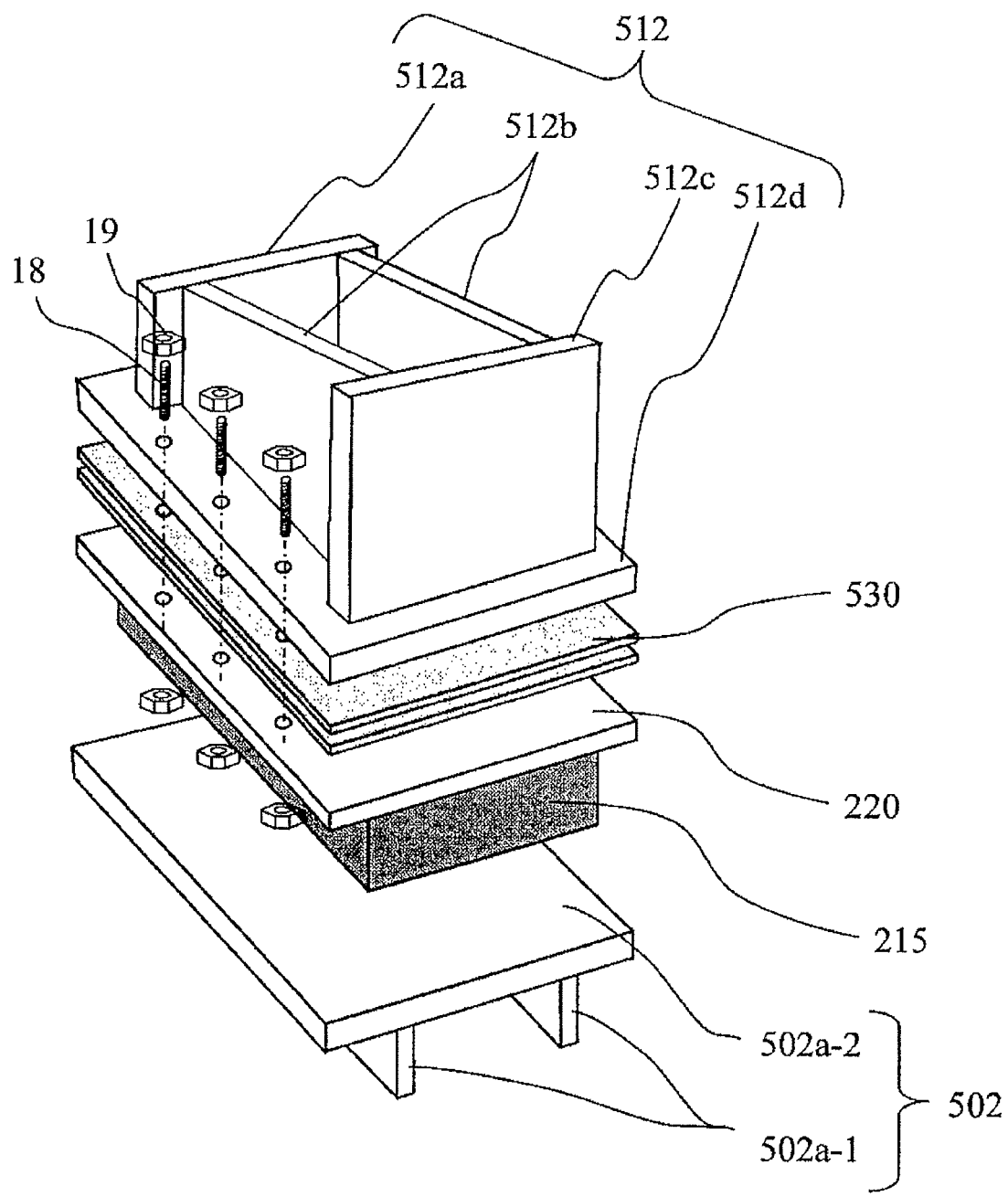
FIG. 46 is a perspective view illustrating parts of a body bracket, a rubber pad, a rubber pad attachment plate, flat plates and a seating of a dump truck according to a six embodiment of the present invention.

FIG. 46 is a perspective view of a state that a rubber pad, a rubber pad attachment plate and flat plates are attached between a body bracket 512 and a seating 502 according to the sixth embodiment. Adopted in the sixth embodiment is the configuration that the body bracket 512 is arranged in place of providing the body 5 with a rail and the body frame 2 is provided with the seating 502 that supports the body bracket 512. Upon resting of the body 5 on the body frame 2, the body bracket 512 rests on the seating 502, thereby forming the structure that a load from the body bracket 512 is supported at the seating 502. This body bracket 512 corresponds to the "support structure" in the present invention. Although not illustrated in any drawing, the body bracket 512 is attached to the front board 11b of the body 5, and the seating 502 is arranged at a position corresponding to the body bracket 512 on a front side of the body frame 2.

The body bracket 512 is a structure formed of a bottom bracket plate 512d and four bracket plates 512a-c arranged one by one upright along the respective sides of the bottom bracket plate 512d. The individual members of the body bracket 512 are joined together by welding. On the other hand, the seating 502 arranged on the body frame 2 is configured including a top seating plate 502a-2 and two side seating plates 502a-1 extending downwardly from the top seating plate 502a-2. The individual members of the seating 502 are also joined together by welding.

It is to be noted that, because the direction in which a reaction force is received from the body frame 2 is also primarily the up-and-down direction in the sixth embodiment, the bracket plates 512a-c can all be considered to be arranged along the direction in which the reaction force is received from the body frame 2. The bracket plates 512a-c, therefore, correspond to "the vertical plates" in the present invention. On the other hand, the bottom bracket plate 512d is in upward contact with the bracket plates 512a-c, and therefore, corresponds to "the bottom plate" in the present invention.

Figure 47:
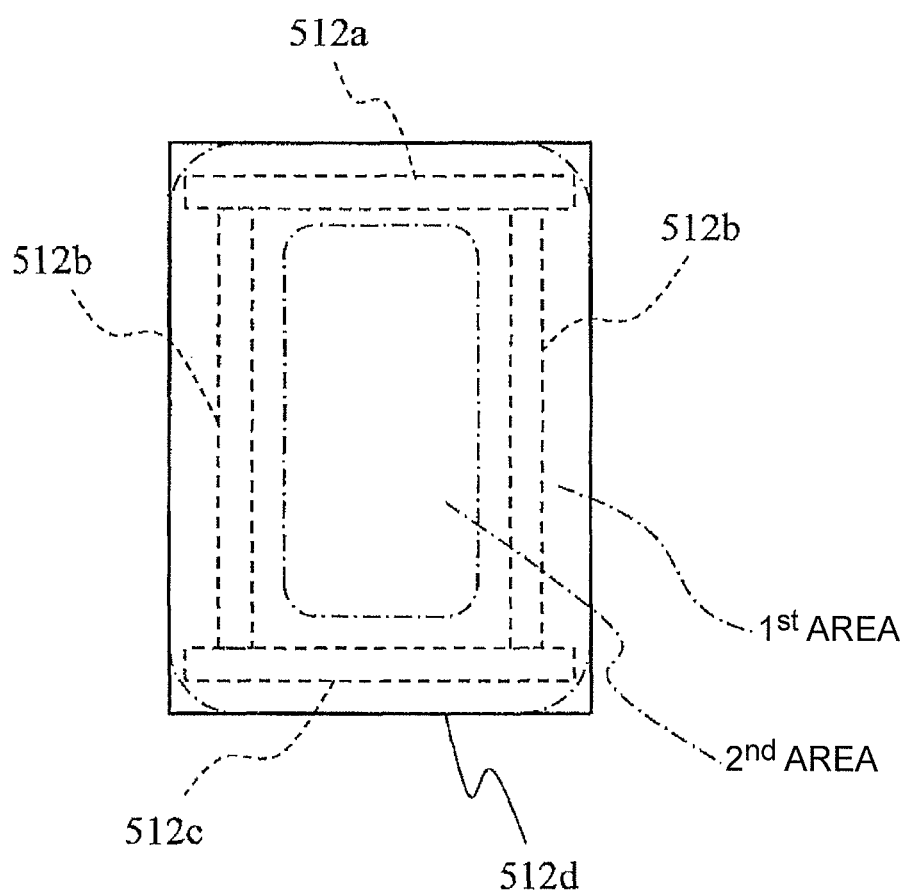
FIG. 47 is a bottom view of a bottom bracket plate shown in FIG. 46 as viewed from below, and is a view illustrating, on a bottom surface of the bottom bracket plate, the division of a first area and a second area in the sixth embodiment.

As described above, in the sixth embodiment, the body bracket 512 configured of the bracket plates 512a-c and bottom bracket plate 512d is adopted as "the support structure" in the present invention. As the body bracket 512 is configured of the bracket plates 512a-c and bottom bracket plate 512d in the sixth embodiment, the division of the bottom bracket plate 512d into a first area and a second area is different from the divisions in the first to fifth embodiments. FIG. 47 is a view of the bottom bracket plate 512d as viewed from below, and illustrates the division into the first area and second area in the sixth embodiment on a bottom surface of the bottom bracket plate 512d. As illustrated in FIG. 47, formed on the bottom surface of the bottom bracket plate 512d are the first area, which is an area including parts maintained in contact with the four bracket plates 512a-3, and the second area which is a part excluding the first area. More specifically, the area divided in a rectangular shape at a central part of the bottom bracket plate 512d is the second area, and a substantially rectangular frame-shaped part excluding the central part is the second area.

Figure 48A:
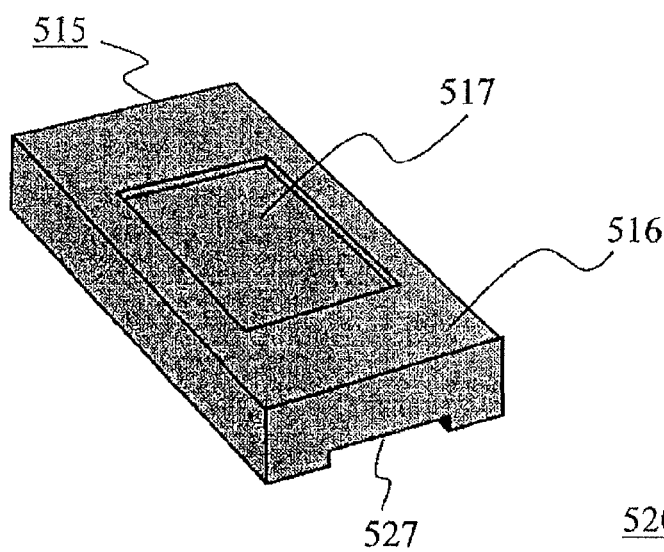
FIGS. 48A to 48C are views illustrating the respective configurations of the rubber pad, rubber pad attachment plate and flat plate applied to the sixth embodiment.
Figure 48B:
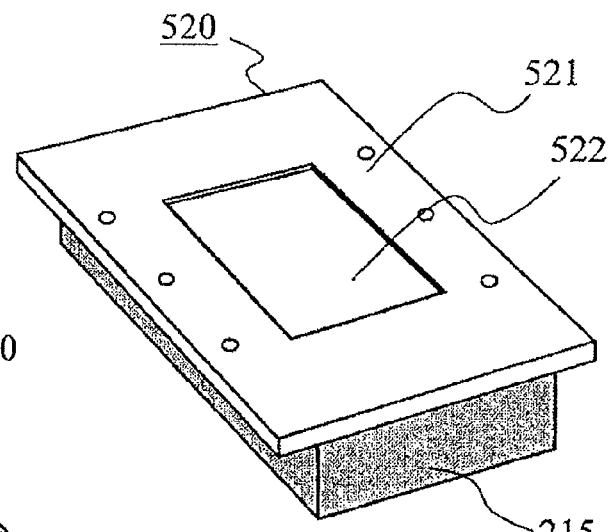
Figure 48C:
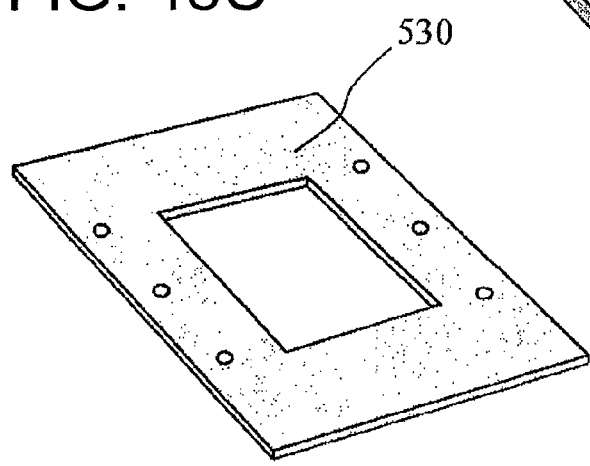

FIGS. 48A to 48C illustrate the shapes of a rubber pad, a rubber pad attachment plate and a flat plate, which are suitable in the sixth embodiment. FIG. 48A illustrates the shape of the rubber pad 515 for use in the sixth embodiment. As illustrated in FIG. 48A, this rubber pad 515 includes a rectangular recess 517 formed at a central part of an upper wall thereof, and a land 516 formed around of the recess 517. In a lower wall, on the other hand, a recess 527 is formed along a longitudinal direction. It is to be noted that the shape of the land 516 is substantially the same as the first area and the width of the recess 527 is slightly smaller than the width between the paired side seating plates 502a-1.

When the rubber pad 515 is bonded to the bottom bracket plate 512d such that the land 516 of the rubber pad 515 comes into registration with the first areas of the bottom bracket plate 512d, the bottom bracket plate 512d receives a reaction force from the seating 502 via the rubber pad 515, and the reaction force concentrates at the first area as described in the first embodiment. In other words, the reaction force is greater at the first areas than at the second area. Therefore, the use of the rubber pad 515 can reduce bending deformations of the bottom bracket plate 512d, and can decrease stresses at the high-stress parts of the body bracket 512. As appreciated from the foregoing, the rubber pad 515 is in a preferred form when the structure of the body bracket 512 as described in the sixth embodiment is adopted.

FIG. 48B illustrates the shape of a rubber pad attachment plate 520 used in the sixth embodiment. As illustrated in FIG. 48B, this rubber pad attachment plate 520 includes a rectangular recess 522 formed at a central part of its upper wall and a land 521 formed around the recess 522. It is to be noted that the shape of the land 521 is substantially the same as the first area.

When the rubber pad attachment plate 520 is fixed on the bottom bracket plate 512d by the bolts 18 and nuts 19 such that the land 521 of the rubber pad attachment plate 520 comes into registration with the first area of the bottom bracket plate 512d, the bottom bracket plate 512d receives a reaction force from the seating 502 via the land 521 of the rubber pad attachment plate 520, and the reaction force concentrates at the first area as described in the second embodiment. In other words, the reaction force is greater at the first area than at the second area. Therefore, the use of the rubber pad attachment plate 520 can reduce bending deformations of the bottom bracket plate 512d, and can decrease stresses at the high-stress parts of the body bracket 512. As appreciated from the foregoing, the rubber pad attachment plate 520 is in a preferred form when the structure of the body bracket 512 as described in the sixth embodiment is adopted.

FIG. 48C illustrates the shape of each flat plate 530 used in the sixth embodiment. As illustrated in FIG. 46, such flat plates 530 are inserted between the rubber pad attachment plate 220 and the bottom bracket plate 512d. As illustrated in FIG. 48C, each flat plate 530 is in the form of a rectangular frame. When the flat plates 530 are inserted to a predetermined position between the bottom bracket plate 512d and the rubber pad attachment plate 220, the top flat plate 530 comes into contact with the first area of the bottom bracket plate 512d. As described in the third embodiment, the bottom bracket plate 512d receives a reaction force from the seating 502 via the flat plates 530, and the reaction force concentrates at the first area accordingly. In other words, the reaction force is greater at the first area than at the second area. Therefore, the use of the flat plates 530 can reduce bending deformations of the bottom bracket plate 512d, and can decrease stresses at the high-stress parts of the body bracket 512. As appreciated from the foregoing, the flat plates 530 are in a preferred form when the structure of the body bracket 512 as described in the sixth embodiment is adopted.

Figure 49:
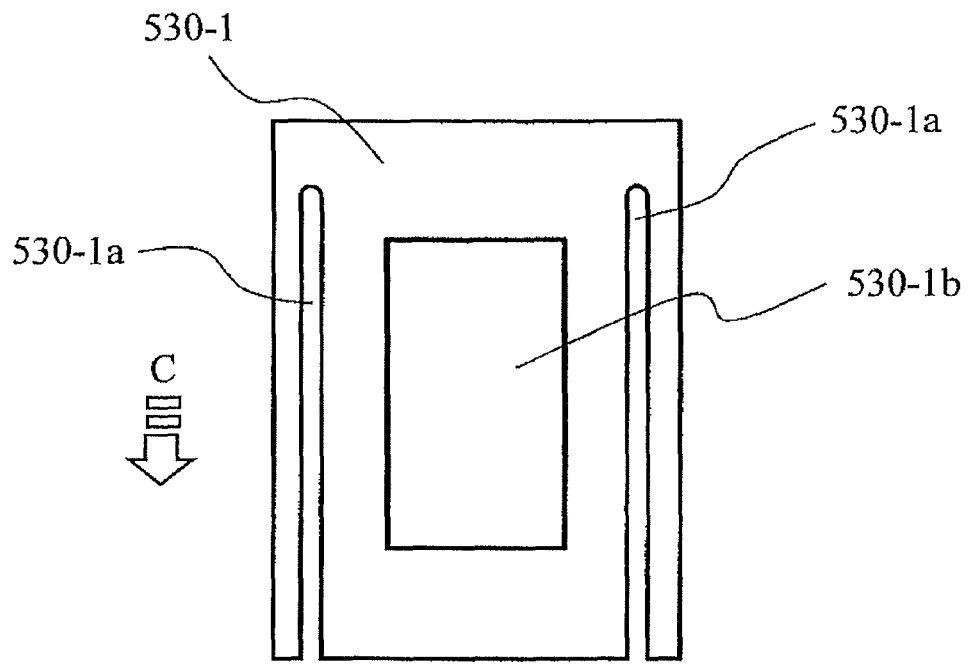
FIG. 49 is a plan view of a flat plate according to Modification Example 6-1 applicable in the sixth embodiment.
Figure 50:
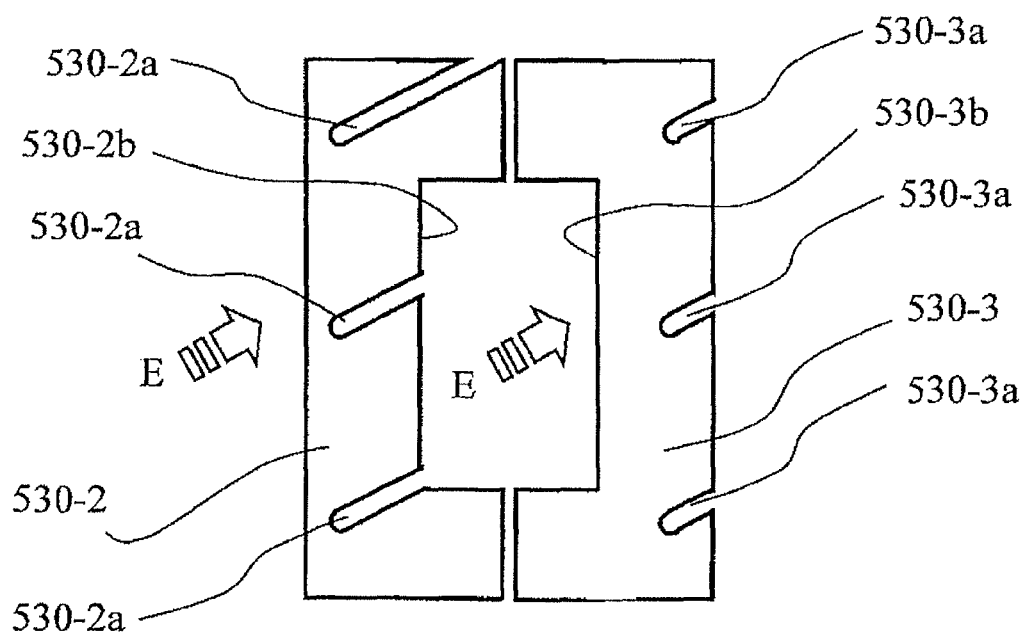
FIG. 50 is a plan view of a flat plate according to Modification Example 6-2 applicable in the sixth embodiment.
Figure 51:
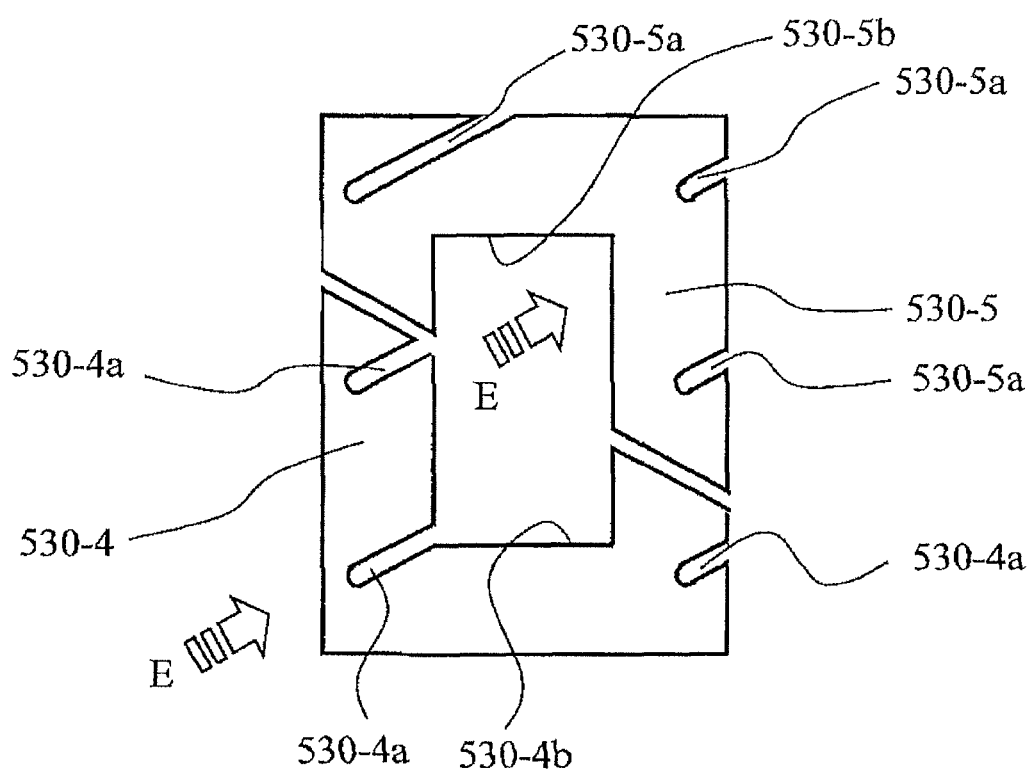
FIG. 51 is a plan view of a flat plate according to Modification Example 6-3 applicable in the sixth embodiment.
Figure 52:
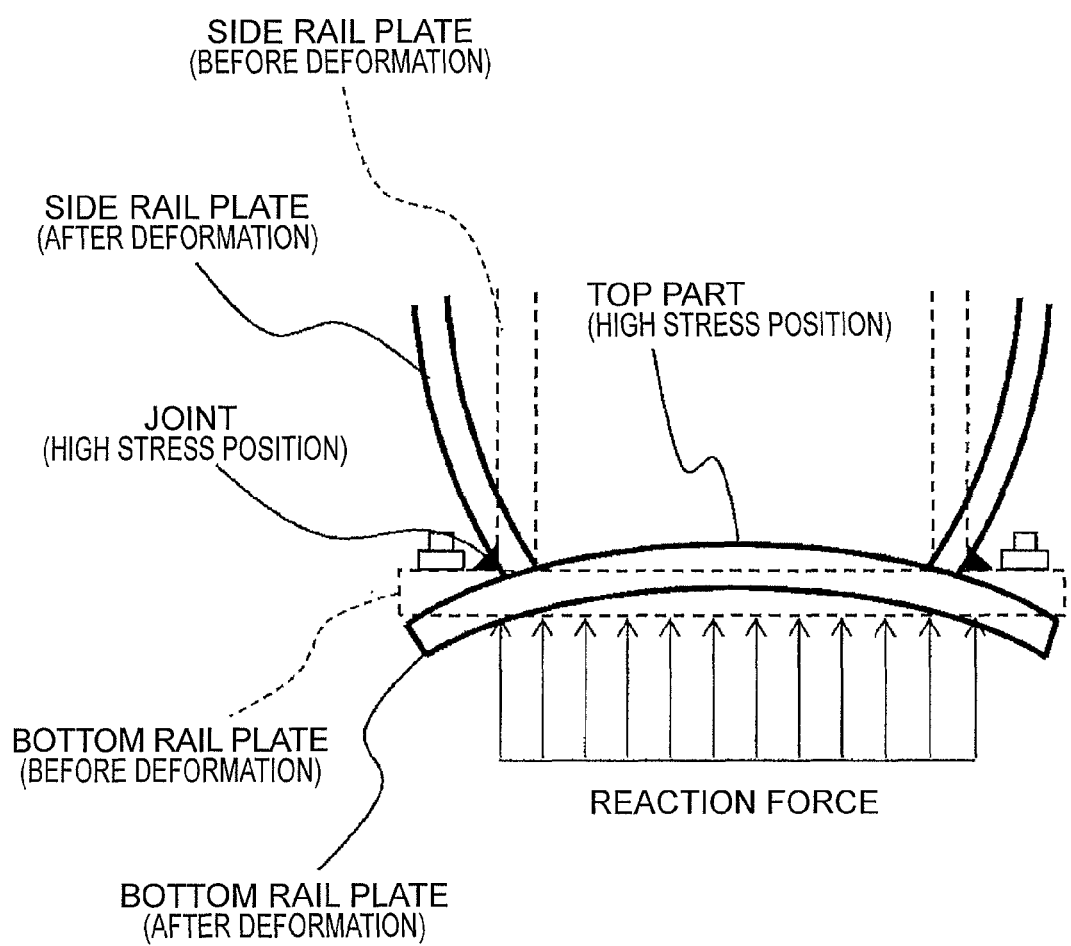
FIG. 52 is a view illustrating deformations of a rail according to a conventional example.
Figure 53:
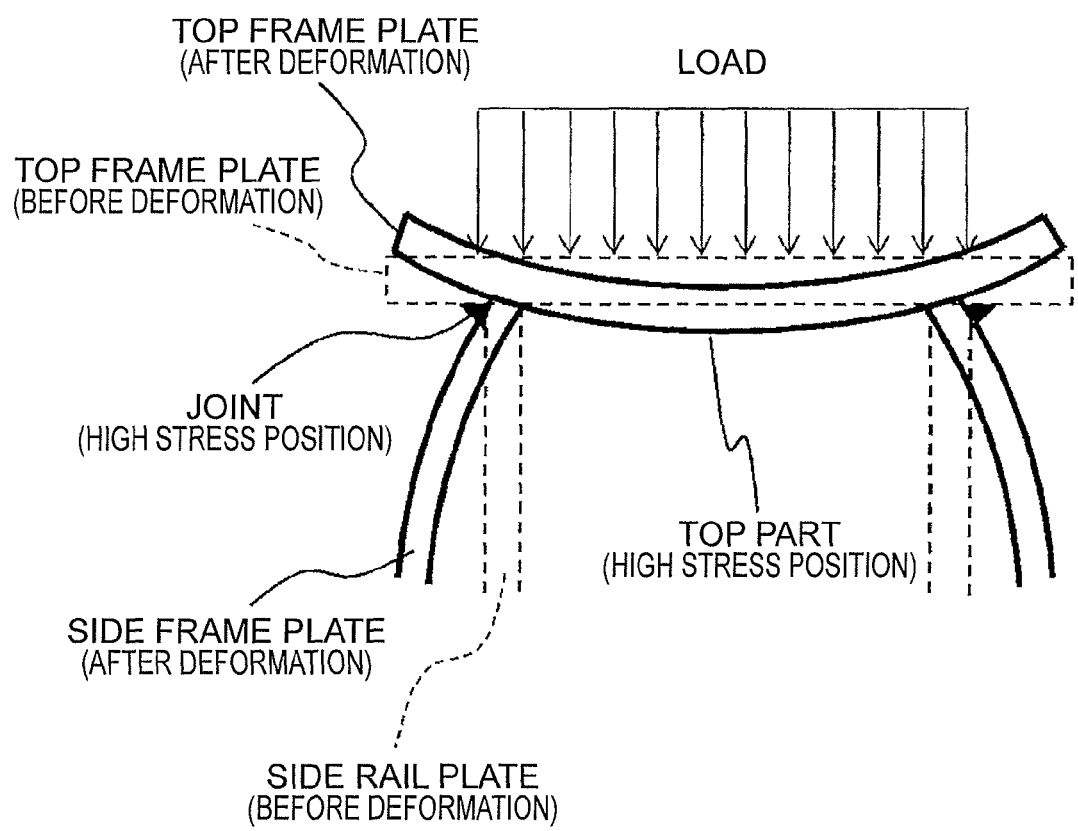
FIG. 53 is a view illustrating deformations of a body frame according to the conventional example.

About preferred shapes (Modification Examples 6-1 to 6-3) of the flat plates 530, a description will next be made with reference to FIGS. 49 to 51. FIGS. 49 to 51 are plan views of flat plates according to Modification Examples 6-1 to 6-3 applicable in the sixth embodiment. The flat plates 530-1, flat plates 530-2, 3 and flat plates 530-4,5 illustrated in FIGS. 49 to 51 can be used in place of the flat plates 530 illustrated in FIG. 46.

As illustrated in FIG. 49, the flat plate 530-1 according to Modification Example 6-1 includes two slits 530-1a formed along the direction of arrow C (first direction), which is the inserting direction, in a rectangular thin plate. These slits 530-1a are formed with a width slightly greater than the diameter of the bolts 18, and are configured to avoid interferences with the bolts 18 upon insertion of the flat plate 530-1. In addition, a rectangular opening 530-1b is formed through a central part of the flat plate 530-1.

When such flat plates 530-1 are used, the nuts 19 are loosened to provide a clearance between the rubber pad attachment plate 220 and the bottom bracket plate 512d. In this state, the flat plates 530-1 can be inserted in the direction of arrow C into the clearance. Accordingly, there is an advantage that the efficiency of attachment work of flat plates is improved compared with the case in which flat plates are attached by completely removing the bolts 18 and nuts 19.

As illustrated in FIG. 50, the flat plate 530-2 according to Modification Example 6-2 includes three slits 530-2a obliquely extending along the direction of arrow E (first direction), which is the inserting direction, in a rectangular thin plate. These slits 530-2a are formed with a width slightly greater than the diameter of the bolts 18, and are configured to avoid interferences with the bolts 18 upon insertion of the flat plate 530-2. The flat plate 530-2 also includes an indentation 530-2b formed at a central part thereof. On the other hand, the flat plate 530-3 is also configured including three slits 530-3a and an indentation 530-3b like the flat plate 530-2, but the slits 530-3a are formed shorter in length than the slits 530-2a. When the flat plate 530-2 and flat plate 530-3 are placed side by side such that their indentations 530-2b,530-3b face each other, a rectangular frame shape is formed by the two flat plates 530-2,3 with a central part having been cut off.

For the insertion of such flat plates 530-2, the nuts 19 are loosened to provide a clearance between the rubber pad attachment plate 220 and the bottom bracket plate 512d. When the flat plates 530-2 are inserted in the direction of arrow E into the clearance in this state, the flat plates 530-2 are set at a position substantially right below the bracket plates 512a-c. On the other hand, such flat plates 530-3 are set at a position substantially right below the bracket plates 512a-c by inserting them from the front of the body bracket 512 into the clearance and then moving them in the direction of arrow E. As appreciated from the foregoing, it is unnecessary to completely remove the bolts 18 and nuts 19 upon attachment of the flat plates 530-2,3 underneath the bottom bracket plate 512d. Accordingly, the efficiency of attachment work of flat plates is improved.

As illustrated in FIG. 51, the flat plate 530-4 according to Modification Example 6-3 includes three slits 530-4a obliquely extending along the direction of arrow E, which is the inserting direction, in a rectangular thin plate. These slits 530-4a are formed with a width slightly greater than the diameter of the bolts 18, and are configured to avoid interferences with the bolts 18 upon insertion of the flat plate 530-4. Further, an indentation 530-4b is formed at a central part of the flat plate 530-4. On the other hand, the flat plate 530-5 is also configured including three slits 530-5a and an indentation 530-5b like the flat plate 530-4. When the flat plate 530-4 and flat plate 530-5 are placed side by side such that their indentations 530-4b, 530-5b face each other, a rectangular frame shape is formed by the two flat plates 530-4,5 with a central part having been cut off. It is to be noted that the flat plate 530-2 and flat plate 530-3 according to Modification Example 6-2 are divided in a vertical direction but the flat plate 530-4 and flat plate 530-5 according to Modification Example 6-3 are divided in a substantially horizontal direction.

For the insertion of such flat plates 530-4, the nuts 19 are loosened to provide a clearance between the rubber pad attachment plate 220 and the bottom bracket plate 512d. When the flat plates 530-4 are inserted in the direction of arrow E into the clearance in this state, the flat plates 530-4 are set at a position substantially right below the bracket plates 512a-c. On the other hand, such flat plates 530-5 are set at a position substantially right below the bracket plates 512a-c by inserting them from the front of the body bracket 512 into the clearance and then moving them in the direction of arrow E. As appreciated from the foregoing, it is unnecessary to completely remove the bolts 18 and nuts 19 upon attachment of the flat plates 530-4,5 underneath the bottom bracket plate 512d. Accordingly, the efficiency of attachment work of flat plates is improved.

It is to be noted that the directions, widths and lengths of the above-described slits can obviously be designed as desired. Further, these slits may each be provided with one or more of such slots as described above. Furthermore, no limitation is imposed on the shape of the flat plates insofar as they can be inserted between the rubber pad attachment plate 220 and the bracket bottom plate 512*d*.

As has been described above, it is possible, according to each of the above-described embodiments, to reduce bending moments, which are to act on a bottom plate of a rail (or body bracket) and a top plate of a body frame (or seating), and bending deflection angles, which are to occur at joints between a bottom plate (or top plate) and side plates, under a reaction force, which is to occur at a contact position between a body and the body frame, and to decrease stresses at such locations by changing the structures of rubber pads, rubber pad attachment plates, flat plates and the like, which are consumable, without performing substantial modifications or surface treatment of the body and body frame. As a consequence, peak stresses and stress variations, which would occur during an actual operation, can be reduced at the same time, thereby enabling to extend the lives of the body and body frame. It is also possible to reduce, at an evaluation site, stress variations that would be caused by an error in the adjustment of the contact pressure distribution of rubber pads in field assembly. Therefore, a high robust design becomes feasible.

It is to be noted that the above-mentioned embodiments are illustrative for the description of the present invention and are not intended to limit the scope of the present invention only to the embodiments. Those of ordinary skill in the art can practice the present invention in various other modes without departing from the spirit of the present invention.

LEGENDS

1 Dump truck
2 Body frame
2*a* Frame member
2*a*-1 Side frame plate (vertical frame plate)
2*a*-2 Top frame plate
3 Front wheel
4 Rear wheel
5 Body
6 Hinge pin
7 Hoist cylinder
8 Cab
9 Guide
10 Power unit
11 Payload section of the body
11*a* Floor board (floor) of the body
11*b* Front board (front wall) of the body
11*c* Side board (sidewall) of the body
11*d* Canopy (canopy) of the body
12 Rail
12*a*,12*b* Side rail plate (vertical plate)
12*c* Bottom rail plate (bottom plate)
12*d* Vertical rail plate
13 Hinge pin bracket
15 Rubber pad (pad)
15*a*,15*c* Side pad (first pad)
15*b* Center pad (second pad)
15-1,2,3,4,5 Rubber pad (pad)
16 Plate
17 Adjustment plate
17-1,2,3,4,5,6 Adjustment plate
17-1*a*,2*a*,3*a*,4*a*,5*a*,6*a* Slit
17-2*b*,3*b*,5*b*,5*c*,6*b*,6*c* Slot
18 Bolt
19 Nut
20,21,22 Hollow bore
23 Reinforcement member
24 Side parts (first pads)
25 Central part (second pad)
26 Land
27 Recess
40 Rib
115 Rubber pad (pad)
120 Rubber pad attachment plate (pad attachment plate)
120-1,2,3,4,5 Rubber pad attachment plate (pad attachment plate)
121 Land (first pad attachment plate)
122 Recess
122-1 Recess
123 Protruding part
123-1 Protruding part
124 Reinforcement rib
125 Insert (second pad attachment plate)
215 Rubber pad (pad)
220 Rubber pad attachment plate (pad attachment plate)
230 Flat plate
230-1,2,3,4,5,6,7,8 Flat plate
230-1*a*,2*a*,3*a*,4*a*,5*a*,6*a*,7*a*,8*a* Slit
230-7*b*,8*b* Slot
235 Connecting member
315 Rubber pad (pad)
316 Land
317 Recess
320 Rubber pad attachment plate (pad attachment plate)
321 Land
322 Recess
330 Flat plate
330-1,2,3,4,5,6,7 Flat plate
330-1*a*,2*a*,3*a*,4*a*,5*a*,6*a*,7*a*,7*b* Slit
412 Rail (support structure)
415 Rubber pad (pad)
417 Recess
416 Land
420 Rubber pad attachment plate (pad attachment plate)
421 Land
422 Recess
430 Flat plate
430-1,2,3,4 Flat plate
430-1*a*,2*a*,3*a*,4*a* Slit
430-3*b*,4*b* Slot
502 Seating
502*a*-1 Side seating plate (vertical frame plate)
502*a*-2 Top seating plate (top frame plate)
512 Body bracket (support structure)
512*a*,*b*,*c* Bracket plate (vertical plate)
512*d* Bottom bracket plate (bottom plate)
515 Rubber pad (pad)
516 Land
517 Recess
520 Rubber pad attachment plate (pad attachment plate)
521 Land
522 Recess
530 Flat plate
530-1,2,3,4,5 Flat plate
530-1*a*,2*a*,3*a*,4*a*,5*a* Slit

The invention claimed is:
1. A load transmission structure applicable to a dump truck, which includes a body frame, a body mounted tiltably in an up-and-down direction on the body frame, and a support structure provided on the body and supportable by the body frame, such that, when the body is in a state of resting on the body frame, the load transmission structure transmits a load from the support structure to the body frame and at the same time, transmits a reaction force from the body frame to the support structure, wherein:

the load transmission structure is configured to transmit the reaction force from the body frame to first areas, which are parts of the support structure, receive reaction forces from the body frame and include areas configured to transmit the reaction forces to the body, and a second area, which is a part of the support structure other than the first areas, receives a reaction force from the body frame and does not include any area configured to transmit the reaction force to the body, respectively; and is configured to transmit a reaction force of a predetermined magnitude to each of the first areas and to transmit a reaction force, which is smaller than that to each of the first areas, to the second area.

2. A dump truck including a body frame, a body mounted tiltably in an up-and-down direction on the body frame, a support structure disposed on the body and supported by the body frame, and load transmission structures held between the support structure and the body frame when the body is in a state of resting on the body frame, whereby the load transmission structures transmit a load from the support structure to the body frame, and at the same time, transmit a reaction force from the body frame to the support structure, wherein:

the support structure has a plurality of vertical plates, which are arranged along a direction in which the reaction force is received from the body frame, and a bottom plate maintained in upward contact with the plurality of vertical plates, the bottom plate is divided into first areas, which include areas where the bottom plate is in contact with the plurality of vertical plates, and a second area that is an area other than the first areas, the load transmission structures transmit the reaction force from the body frame such that a reaction force to be transmitted to each of the first areas becomes greater than a reaction force to be transmitted to the second area, the load transmission structures have pads, each per every load transmission structure, which are made of an elastic material and act to cushion an impact to be applied to the body frame by the body, the pads are each formed of first pads, which come into contact with the first areas of the bottom plate, respectively, and a second pad, which comes into contact with the second area of the bottom plate, integrated together, and the first pads are higher in rigidity than the second pad, the load transmission structures each further include a pad attachment plate located between the pad and the bottom plate and an adjustment plate inserted between the pad attachment plate and the bottom plate, the bottom plate and pad attachment plate are fastened together with bolts and nuts, and the adjustment plate has slits formed therein, and the slits extend in a first direction, in which the adjustment plate is inserted between the pad attachment plate and the bottom plate, and are in a shape that the adjustment plate avoids interferences with the bolts upon insertion of the adjustment plate in the first direction.

3. The dump truck according to claim 2, wherein:
the slits are each provided with a slot extending in a second direction that intersects the first direction, and the slot is in a shape that the adjustment plate avoids interferences with the bolts upon moving the adjustment plate in the second direction after the insertion of the adjustment plate in the first direction between the pad attachment plate and the bottom plate.

4. A dump truck including a body frame, a body mounted tiltably in an up-and-down direction on the body frame, a support structure disposed on the body and supported by the body frame, and load transmission structures held between the support structure and the body frame when the body is in a state of resting on the body frame, whereby the load transmission structures transmit a load from the support structure to the body frame, and at the same time, transmit a reaction force from the body frame to the support structure, wherein:

the support structure has a plurality of vertical plates, which are arranged along a direction in which the reaction force is received from the body frame, and a bottom plate maintained in upward contact with the plurality of vertical plates, the bottom plate is divided into first areas, which include areas where the bottom plate is in contact with the plurality of vertical plates, and a second area that is an area other than the first areas, the load transmission structures transmit the reaction force from the body frame such that a reaction force to be transmitted to each of the first areas becomes greater than a reaction force to be transmitted to the second area, the load transmission structures have pads, each per every load transmission structure, which are made of an elastic material and act to cushion an impact to be applied to the body frame by the body, the pads are each provided at upper surfaces thereof with a concave/convex structure, the pads are arranged at positions that, with the body resting on the body frame, each pad is in contact at lands thereof with the first areas of the bottom plate, respectively, and is out of contact at a recess thereof with the second area of the bottom plate, the load transmission structures each further include a pad attachment plate located between the pad and the bottom plate and an adjustment plate inserted between the pad attachment plate and the bottom plate, the bottom plate and pad attachment plate are fastened together with bolts and nuts, and the adjustment plate has slits formed therein, and the slits extend in a first direction, in which the adjustment plate is inserted between the pad attachment plate and the bottom plate, and are in a shape that the adjustment plate avoids interferences with the bolts upon insertion of the adjustment plate in the first direction.

5. The dump truck according to claim 4, wherein:
the slits are each provided with a slot extending in a second direction that intersects the first direction, and the slot is in a shape that the adjustment plate avoids interferences with the bolts upon moving the adjustment plate in the second direction after the insertion of the adjustment plate in the first direction between the pad attachment plate and the bottom plate.

6. A dump truck including a body frame, a body mounted tiltably in an up-and-down direction on the body frame, a support structure disposed on the body and supported by the body frame, and load transmission structures held between the support structure and the body frame when the body is in a state of resting on the body frame, whereby the load transmission structures transmit a load from the support structure to the body frame, and at the same time, transmit a reaction force from the body frame to the support structure, wherein:

the support structure has a plurality of vertical plates, which are arranged along a direction in which the reaction force is received from the body frame, and a bottom plate maintained in upward contact with the plurality of vertical plates, the bottom plate is divided into first areas, which include areas where the bottom plate is in contact with the plurality of vertical plates, and a second area that is an area other than the first areas, the load transmission structures transmit the reaction force from the body frame such that a reaction force to be transmitted to each of the first areas becomes greater than a reaction force to be transmitted to the second area, the load transmission structures have pads, each per every load transmission structure, which are made of an elastic material and are located on a side of the body frame to cushion an impact to be applied to the body frame by the body, and pad attachment plates, which are located on a side of the bottom plate and carry the pads attached thereto, the pads are each provided at upper surfaces thereof with a concave/convex structure, the pad attachment plates are arranged at positions that, with the body resting on the body frame, each pad is in contact at lands thereof with the first areas of the bottom plate, respectively, and is out of contact at a recess thereof with the second area of the bottom plate, the load transmission structures each further include a flat plate inserted between the pad attachment plate and the bottom plate, the bottom plate and pad attachment plate are fastened together with bolts and nuts, and the flat plate has slits formed therein, and the slits extend in a first direction, in which the flat plate is inserted between the pad attachment plate and the bottom plate, and are in a shape that the flat plate avoids interferences with the bolts upon insertion of the flat plate in the first direction.

7. The dump truck according to claim 6, wherein:

the slits are each provided with a slot extending in a second direction that intersects the first direction, and the slot is in a shape that the flat plate avoids interferences with the bolts upon moving the flat plate in the second direction after the insertion of the flat plate in the first direction between the pad attachment plate and the bottom plate.

8. A dump truck including a body frame, a body mounted tiltably in an up-and-down direction on the body frame, a support structure disposed on the body and supported by the body frame, and load transmission structures held between the support structure and the body frame when the body is in a state of resting on the body frame, whereby the load transmission structures transmit a load from the support structure to the body frame, and at the same time, transmit a reaction force from the body frame to the support structure, wherein:

the support structure has a plurality of vertical plates, which are arranged along a direction in which the reaction force is received from the body frame, and a bottom plate maintained in upward contact with the plurality of vertical plates, the bottom plate is divided into first areas, which include areas where the bottom plate is in contact with the plurality of vertical plates, and a second area that is an area other than the first areas, the load transmission structures transmit the reaction force from the body frame such that a reaction force to be transmitted to each of the first areas becomes greater than a reaction force to be transmitted to the second area, the load transmission structures have pads, each per every load transmission structure, which are made of an elastic material and are located on a side of the body frame to cushion an impact to be applied to the body frame by the body, and pad attachment plates, which are located on a side of the bottom plate and carry the pads attached thereto, the pad attachment plates are each formed of first pad attachment plates, which come into contact with the first areas, respectively, and a second pad attachment plate, which comes into contact with the second area, integrated together, and the first pad attachment plates are higher in rigidity than the second pad attachment plate, the load transmission structures each further include a flat plate inserted between the pad attachment plate and the bottom plate, the bottom plate and pad attachment plate are fastened together with bolts and nuts, and the flat plate has slits formed therein, and the slits extend in a first direction, in which the flat plate is inserted between the pad attachment plate and the bottom plate, and are in a shape that the flat plate avoids interferences with the bolts upon insertion of the flat plate in the first direction.

9. The dump truck according to claim 8, wherein:

the slits are each provided with a slot extending in a second direction that intersects the first direction, and the slot is in a shape that the flat plate avoids interferences with the bolts upon moving the flat plate in the second direction after the insertion of the flat plate in the first direction between the pad attachment plate and the bottom plate.

10. A dump truck including a body frame, a body mounted tiltably in an up-and-down direction on the body frame, a support structure disposed on the body and supported by the body frame, and load transmission structures held between the support structure and the body frame when the body is in a state of resting on the body frame, whereby the load transmission structures transmit a load from the support structure to the body frame, and at the same time, transmit a reaction force from the body frame to the support structure, wherein:

the support structure has a plurality of vertical plates, which are arranged along a direction in which the reaction force is received from the body frame, and a bottom plate maintained in upward contact with the plurality of vertical plates, the bottom plate is divided into first areas, which include areas where the bottom plate is in contact with the plurality of vertical plates, and a second area that is an area other than the first areas, the load transmission structures transmit the reaction force from the body frame such that a reaction force to be transmitted to each of the first areas becomes greater than a reaction force to be transmitted to the second area, the load transmission structures have pads, each per every load transmission structure, which are made of an elastic material and are located on a side of the body frame to cushion an impact to be applied to the body frame by the body, flat plates located on a side of the bottom plate, and pad attachment plates, which are located between the pads and the flat plates and carry the pads attached thereto, the flat plates are in a shape that, with the body resting on the body frame, each flat plate is in contact with only the first areas, the bottom plate and pad attachment plate are fastened together with bolts and nuts, and the flat plate has slits formed therein, and the slits extend in a first direction, in which the flat plate is inserted between the pad attachment plate and the bottom plate, and are in a shape that the flat plate avoids interferences with the bolts upon insertion of the flat plate in the first direction.

11. The dump truck according to claim 10, wherein:

the slits are each provided with a slot extending in a second direction that intersects the first direction, and the slot is in a shape that the flat plate avoids interferences with the bolts upon moving the flat plate in the second direction after the insertion of the flat plate in the first direction between the pad attachment plate and the bottom plate.

* * * * *